(12) United States Patent
Williams et al.

(10) Patent No.: US 12,199,260 B2
(45) Date of Patent: Jan. 14, 2025

(54) DEVICES, SYSTEMS, AND METHODS FOR CONTROLLING VENT GASES AND EJECTA FROM THERMAL RUNAWAY EVENTS IN ENERGY STORAGE SYSTEMS

(71) Applicant: Aspen Aerogels, Inc., Northborough, MA (US)

(72) Inventors: John Williams, Groton, MA (US); Owen Evans, Chelmsford, MA (US); David Baur, Ashland, MA (US); George Gould, Mendon, MA (US); Kathryn deKrafft, Hudson, MA (US); David Mihalcik, Northborough, MA (US); Brian Cahill, Inverin (IE); Younggyu Nam, Medford, MA (US)

(73) Assignee: Aspen Aerogels, Inc., Northborough, MA (US)

( * ) Notice: Subject to any disclaimer, the term of this patent is extended or adjusted under 35 U.S.C. 154(b) by 0 days.

(21) Appl. No.: 18/571,175

(22) PCT Filed: Jul. 1, 2022

(86) PCT No.: PCT/US2022/073359
§ 371 (c)(1),
(2) Date: Dec. 15, 2023

(87) PCT Pub. No.: WO2023/279089
PCT Pub. Date: Jan. 5, 2023

(65) Prior Publication Data
US 2024/0313301 A1 Sep. 19, 2024

Related U.S. Application Data

(60) Provisional application No. 63/275,261, filed on Nov. 3, 2021, provisional application No. 63/273,845, filed
(Continued)

(51) Int. Cl.
*H01M 10/658* (2014.01)
*F16L 59/02* (2006.01)
(Continued)

(52) U.S. Cl.
CPC ........... *H01M 10/658* (2015.04); *F16L 59/02* (2013.01); *H01M 10/653* (2015.04);
(Continued)

(58) Field of Classification Search
CPC ............. H01M 10/658; H01M 10/653; H01M 10/6555; H01M 50/30; H01M 50/293; H01M 50/291; H01M 50/204
See application file for complete search history.

(56) References Cited

U.S. PATENT DOCUMENTS

| 3,513,114 A | 5/1970 | Hahn et al. |
| 4,532,316 A | 7/1985 | Henn |

(Continued)

FOREIGN PATENT DOCUMENTS

| CN | 210161719 U | 3/2020 |
| CN | 210296447 U | 4/2020 |

(Continued)

OTHER PUBLICATIONS

"U.S. Appl. No. 18/571,172, Preliminary Amendment filed May 16, 2024", 8 pgs.
(Continued)

*Primary Examiner* — Jimmy Vo
(74) *Attorney, Agent, or Firm* — Schwegman Lundberg & Woessner, P.A.

(57) ABSTRACT

The present disclosure relates to materials and systems to manage thermal runaway issues in battery modules. In exemplary embodiments, a battery module includes battery cells separated by spacer elements. To mitigate thermal runaway issues, spacer elements may be extended to the
(Continued)

interior surface of the enclosure. A seal is formed between the spacer elements and the interior wall to form a thermal barrier between adjacent battery cells.

18 Claims, 30 Drawing Sheets

Related U.S. Application Data on Oct. 29, 2021, provisional application No. 63/231,617, filed on Aug. 10, 2021, provisional application No. 63/218,205, filed on Jul. 2, 2021.

(51) Int. Cl.
*H01M 10/653* (2014.01)
*H01M 10/6555* (2014.01)
*H01M 50/204* (2021.01)
*H01M 50/291* (2021.01)
*H01M 50/293* (2021.01)
*H01M 50/30* (2021.01)

(52) U.S. Cl.
CPC ..... *H01M 10/6555* (2015.04); *H01M 50/204* (2021.01); *H01M 50/291* (2021.01); *H01M 50/293* (2021.01); *H01M 50/30* (2021.01); *H01M 2200/20* (2013.01)

(56) References Cited

U.S. PATENT DOCUMENTS

| | | | |
|---|---|---|---|
| 5,229,429 A | 7/1993 | Hahn et al. | |
| 5,399,422 A | 3/1995 | Dijkema et al. | |
| 5,487,946 A | 1/1996 | McGinniss et al. | |
| 5,591,791 A | 1/1997 | Deogon | |
| 5,723,515 A | 3/1998 | Gottfried | |
| 5,814,405 A | 9/1998 | Branca et al. | |
| 5,889,071 A | 3/1999 | Biesmans et al. | |
| 6,083,619 A | 7/2000 | Frank et al. | |
| 6,143,400 A | 11/2000 | Schwertfeger et al. | |
| 6,147,134 A | 11/2000 | Eling | |
| 6,187,831 B1 | 2/2001 | Miller et al. | |
| 6,790,893 B2 | 9/2004 | Nguyen et al. | |
| 7,635,411 B2 | 12/2009 | Rouanet et al. | |
| 8,021,583 B2 | 9/2011 | Rouanet et al. | |
| 9,399,864 B2 | 7/2016 | Samanta et al. | |
| 2005/0192367 A1 | 9/2005 | Ou et al. | |
| 2007/0173157 A1 | 7/2007 | Trifu et al. | |
| 2012/0009455 A1* | 1/2012 | Yoon | H01M 10/6554 429/120 |
| 2015/0090728 A1 | 4/2015 | Lubart et al. | |
| 2019/0264381 A1 | 8/2019 | Joung et al. | |
| 2021/0057788 A1* | 2/2021 | Melack | H01M 10/658 |
| 2021/0163303 A1* | 6/2021 | Evans | B32B 15/046 |
| 2021/0167438 A1 | 6/2021 | Evans et al. | |
| 2022/0131208 A1 | 4/2022 | Zhang et al. | |
| 2024/0308180 A1 | 9/2024 | Williams et al. | |
| 2024/0313291 A1 | 9/2024 | Williams et al. | |
| 2024/0313300 A1 | 9/2024 | Williams et al. | |
| 2024/0313302 A1 | 9/2024 | Williams et al. | |

FOREIGN PATENT DOCUMENTS

| | | | |
|---|---|---|---|
| CN | 210733453 U | 6/2020 | |
| CN | 111463519 A | 7/2020 | |
| CN | 116998045 A | 11/2023 | |
| CN | 117015899 A | 11/2023 | |
| CN | 117042954 A | 11/2023 | |
| CN | 117157806 A | 12/2023 | |
| CN | 117546342 A | 2/2024 | |
| CN | 118056317 A | 5/2024 | |
| DE | 3225767 A1 * | 1/1984 | ..... H01M 50/204 |
| DE | 202019101682 U1 | 6/2020 | |
| EP | 2617761 B1 | 3/2016 | |
| EP | 3611790 A1 | 2/2020 | |
| JP | 6916976 B1 | 7/2021 | |
| JP | 2024522042 A | 6/2024 | |
| JP | 2024525260 A | 7/2024 | |
| JP | 2024526007 A | 7/2024 | |
| JP | 2024528358 | 7/2024 | |
| JP | 2024529209 | 8/2024 | |
| JP | 7578847 B2 | 10/2024 | |
| KR | 20120004322 A | 1/2012 | |
| KR | 20170005117 A | 1/2017 | |
| KR | 20170108156 A | 9/2017 | |
| KR | 20200100639 A | 8/2020 | |
| KR | 102641941 B1 | 2/2024 | |
| TW | 202319232 A | 5/2023 | |
| TW | 202319245 A | 5/2023 | |
| TW | 202320390 A | 5/2023 | |
| TW | 202339341 A | 10/2023 | |
| WO | WO-9417142 A1 | 8/1994 | |
| WO | WO-9804639 A1 | 2/1998 | |
| WO | WO-2020077334 A1 | 4/2020 | |
| WO | WO-2020186495 A1 | 9/2020 | |
| WO | WO-2020194929 A1 | 10/2020 | |
| WO | WO-2023279084 A2 | 1/2023 | |
| WO | WO-2023279089 A2 | 1/2023 | |
| WO | WO-2023279090 A1 | 1/2023 | |
| WO | WO-2023279094 A1 | 1/2023 | |
| WO | WO-2023279096 A2 | 1/2023 | |
| WO | WO-2023279090 A4 | 2/2023 | |
| WO | WO-2023100117 A2 | 6/2023 | |
| WO | WO-2023279084 A3 | 8/2023 | |
| WO | WO-2023279089 A3 | 8/2023 | |
| WO | WO-2023279096 A3 | 10/2023 | |
| WO | WO-2023100117 A3 | 11/2023 | |

OTHER PUBLICATIONS

"U.S. Appl. No. 18/571,178, Supplemental Preliminary Amendment filed May 16, 2024", 7 pgs.
"U.S. Appl. No. 18/571,180, Preliminary Amendment filed May 22, 2024", 12 pgs.
"U.S. Appl. No. 18/716,106 Preliminary Amendment filed Jun. 3, 2024", 8 pgs.
"Chinese Application Serial No. 202280021942.0, Voluntary Amendment filed May 9, 2024", with English claims, 30 pgs.
"Japanese Application Serial No. 2024519934, Voluntary Amendment Filed May 1, 2024", with English claims, 11 pgs.
"Korean Application Serial No. 10-2024-7010947, Voluntary Amendment Filed Apr. 1, 2024", w/ English Claims, 19 pgs.
"U.S. Appl. No. 18/571,178, Preliminary Amendment filed Mar. 29, 2024", 8 pgs.
"U.S. Appl. No. 18/571,182 Preliminary Amendment filed Mar. 26, 2024", 8 pgs.
"Brazil Application Serial No. BR112023018332-4, Office Action mailed Jan. 17, 2024", with machine translation, 6 pgs.
"Chinese Application Serial No. 202280021856.X, Voluntary Amendment filed Dec. 15, 2023", with machine translation, 29 pgs.
"Chinese Application Serial No. 202280021942.0, Office Action mailed Oct. 13, 2023", with machine translation, 2 pgs.
"Chinese Application Serial No. 202280021962.8, Voluntary Amendment mailed Feb. 20, 2024", w/ English Claims, 10 pgs.
"Chinese Application Serial No. 202280022036.2, Voluntary Amendment filed Dec. 6, 2023", w/ English claims, 17 pgs.
"European Application Serial No. 22747919.3, Communication Pursuant to Article 94(3) EPC mailed Nov. 10, 2023", 5 pgs.
"European Application Serial No. 22747919.3, Response filed Dec. 14, 2023 to Communication Pursuant to Article 94(3) EPC mailed Nov. 10, 2023", 13 pgs.
"European Application Serial No. 22748696.6, Third Party Observation mailed Jan. 8, 2024", 3 pgs.
"German Application Serial No. 202022002799.0, Office Action mailed Jun. 16, 2023", with machine translation, 5 pgs.
"German Application Serial No. 202022002839.3, Office Action mailed Sep. 23, 2023", with machine translation, 2 pgs.

(56) References Cited

OTHER PUBLICATIONS

"German Application Serial No. 202022002863.6, Office Action mailed Oct. 6, 2023", with machine translation, 3 pgs.
"German Application Serial No. 202022002887.3, Office Action mailed Nov. 27, 2023", with machine translation, 4 pgs.
"German Application Serial No. 202022002887.3, Response filed Dec. 27, 2023 to Office Action mailed Nov. 27, 2023", with machine translation, 39 pgs.
"German Application Serial No. 202023102588.9, Office Action mailed May 31, 2023", with machine translation, 3 pgs.
"International Application Serial No. PCT/IB2022/061618, International Search Report mailed Oct. 11, 2023", 5 pgs.
"International Application Serial No. PCT/IB2022/061618, Written Opinion mailed Oct. 11, 2023", 4 pgs.
"International Application Serial No. PCT/US2022/073350, International Preliminary Report on Patentability mailed Jan. 11, 2024", 7 pgs.
"International Application Serial No. PCT/US2022/073350, International Search Report mailed Jun. 29, 2023", 4 pgs.
"International Application Serial No. PCT/US2022/073350, Written Opinion mailed Jun. 29, 2023", 5 pgs.
"International Application Serial No. PCT/US2022/073359, International Preliminary Report on Patentability mailed Jan. 11, 2024", 11 pgs.
"International Application Serial No. PCT/US2022/073359, International Search Report mailed Jul. 27, 2023", 7 pgs.
"International Application Serial No. PCT/US2022/073359, Invitation to Pay Additional Fees mailed Jun. 5, 2023", 5 pgs.
"International Application Serial No. PCT/US2022/073359, Written Opinion mailed Jul. 27, 2023", 9 pgs.
"International Application Serial No. PCT/US2022/073360 Written Opinion mailed Nov. 16, 2022", 4 pgs.
"International Application Serial No. PCT/US2022/073360, Article 19 Amendment filed Jan. 14, 2023", 11 pgs.
"International Application Serial No. PCT/US2022/073360, International Preliminary Report on Patentability mailed Jan. 11, 2024", 6 pgs.
"International Application Serial No. PCT/US2022/073360, International Search Report mailed Nov. 16, 2022", 3 pgs.
"International Application Serial No. PCT/US2022/073369, International Preliminary Report on Patentability mailed Jan. 11, 2024", 6 pgs.
"International Application Serial No. PCT/US2022/073369, International Search Report mailed Oct. 25, 2022", 3 pgs.
"International Application Serial No. PCT/US2022/073369, Written Opinion mailed Oct. 25, 2022", 4 pgs.
"International Application Serial No. PCT/US2022/073372, International Preliminary Report on Patentability mailed Jan. 11, 2024", 10 pgs.
"International Application Serial No. PCT/US2022/073372, International Search Report mailed Sep. 4, 2023", 7 pgs.
"International Application Serial No. PCT/US2022/073372, Invitation to Pay Additional Fees mailed Jul. 12, 2023", 5 pgs.
"International Application Serial No. PCT/US2022/073372, Written Opinion mailed Sep. 4, 2023", 8 pgs.
"Korean Application Serial No. 10-2023-7031638, Voluntary Amendment filed Feb. 22, 2024", with machine translation, 10 pgs.
U.S. Appl. No. 18/571,172, filed Dec. 15, 2023, Materials, Systems, and Methods for Mitigation of Electrical Energy Storage Thermal Events.
U.S. Appl. No. 18/571,178, filed Dec. 15, 2023, Systems and Methods for Mitigating Thermal Propagation in Battery-Based Energy Storage Systems.
U.S. Appl. No. 18/571,180, filed Dec. 15, 2023, Materials, Systems, and Methods for Encapsulating Thermal Barrier Materials.
U.S. Appl. No. 18/571,182, filed Dec. 15, 2023, Venting and Filtering Components for Encapsulated Thermal Barriers.
"U.S. Appl. No. 18/571,178, Non Final Office Action mailed Jul. 30, 2024", 7 pgs.
"International Application Serial No. PCT/IB2022/061618, International Preliminary Report on Patentability mailed Jun. 13, 2024", 6 pgs.
"Japanese Application Serial No. 2023-556785, Voluntary Amendment Filed Jun. 10, 2024", w/ English Claims, 21 pgs.
"Japanese Application Serial No. 2023-556785, Voluntary Amendment Filed Jun. 10, 2024", with English claims, 18 pgs.
"Japanese Application Serial No. 2023-558786, Notice of Reasons for Rejection mailed Jul. 16, 2024", w/ English translation, 8 pgs.
"Japanese Application Serial No. 2023-558786, Voluntary Amendment filed Jun. 27, 2024", w/ English claims, 13 pgs.
"U.S. Appl. No. 18/571,178, Notice of Allowance mailed Sep. 3, 2024", 8 pages.
"U.S. Appl. No. 18/571,178, Corrected Notice of Allowability mailed Sep. 16, 2024", 4 pgs.
"Japanese Application Serial No. 2023-558786, Response filed Sep. 10, 2024 to Notice of Reasons for Rejection mailed Jul. 16, 2024", w/ English claims, 9 pgs.

\* cited by examiner

830

840

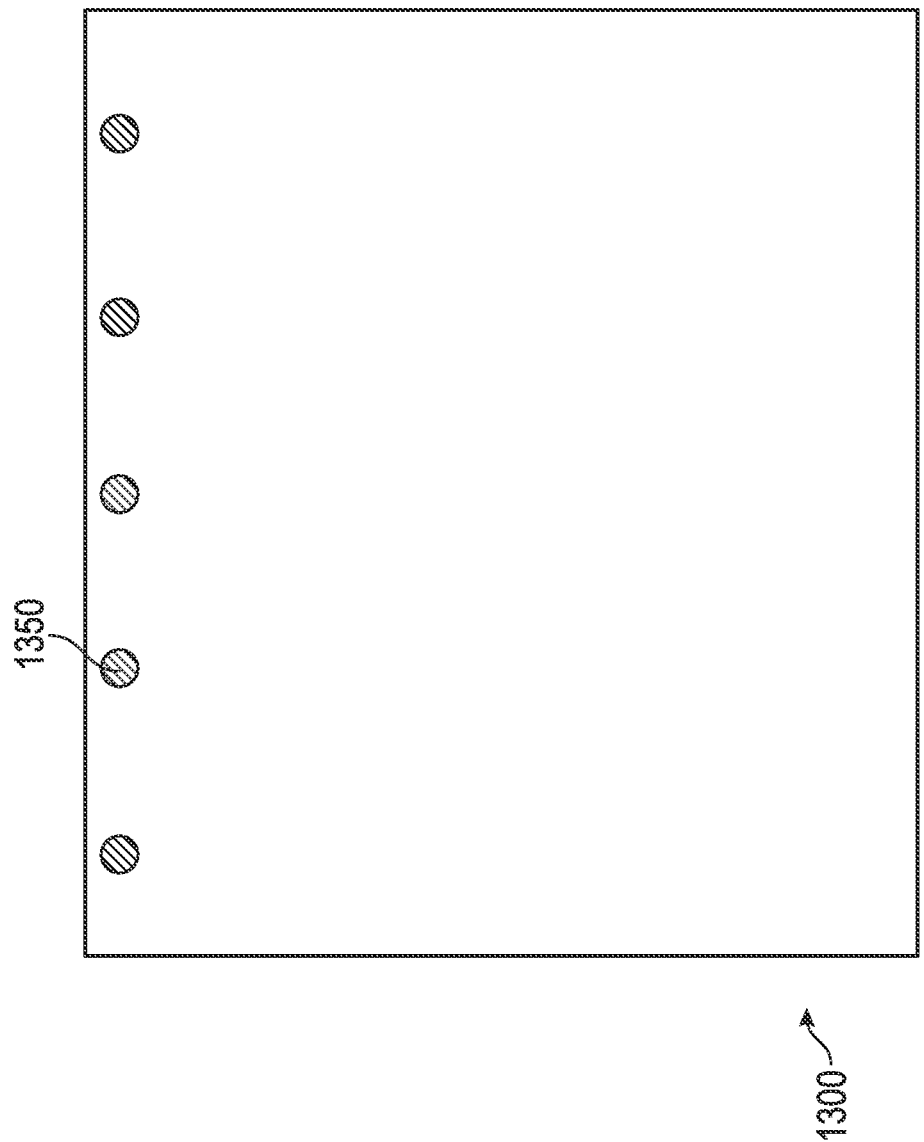

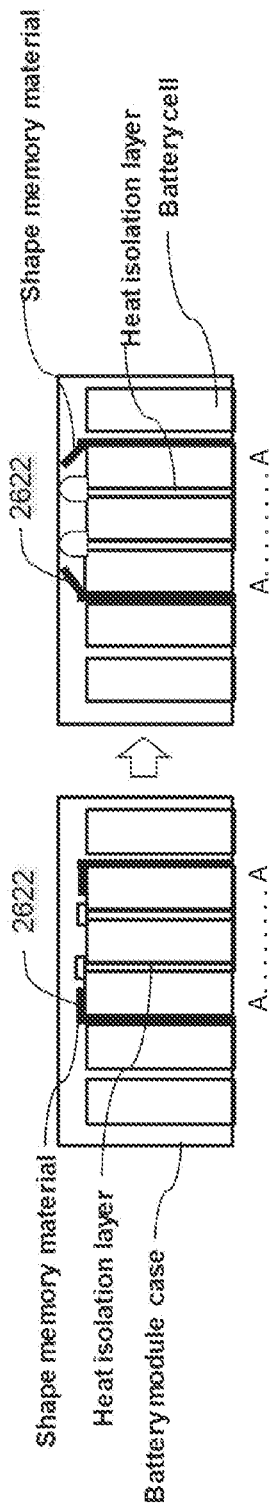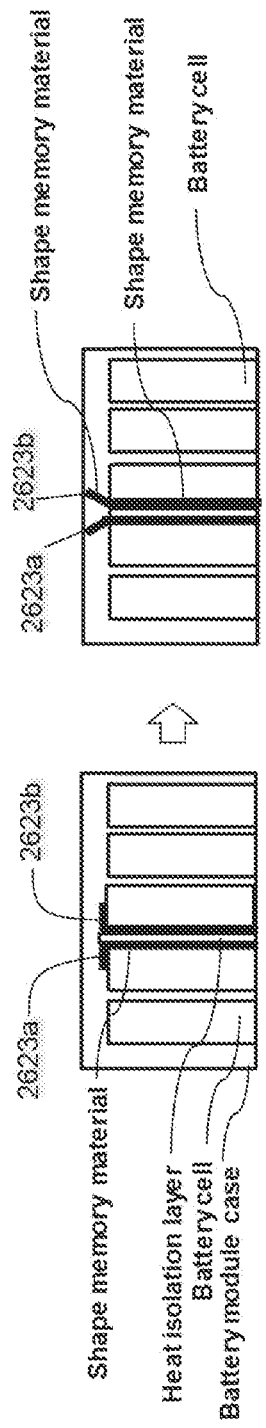
FIG. 26A  FIG. 26B  FIG. 26C  FIG. 26D

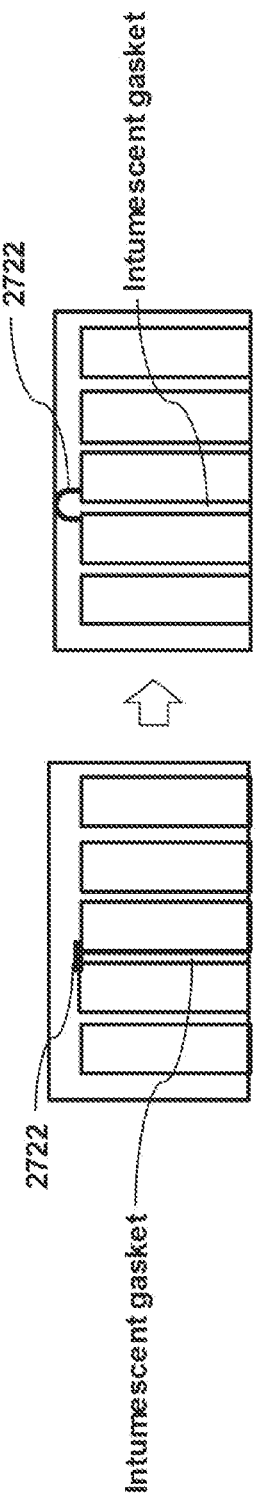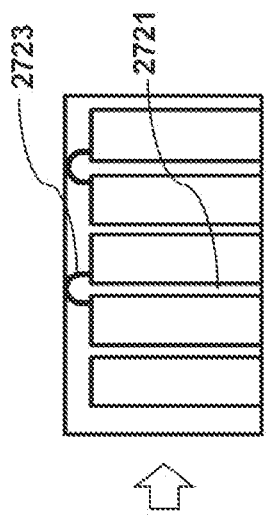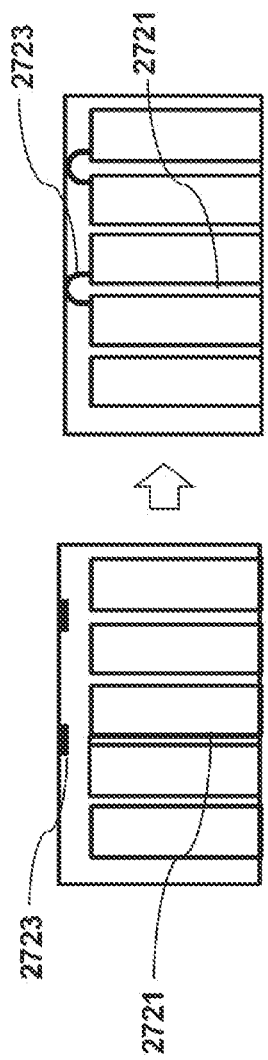

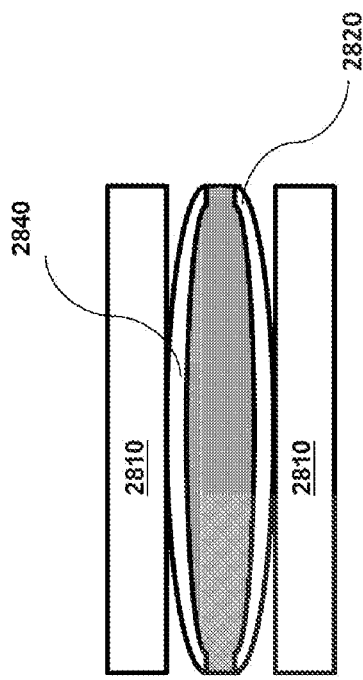
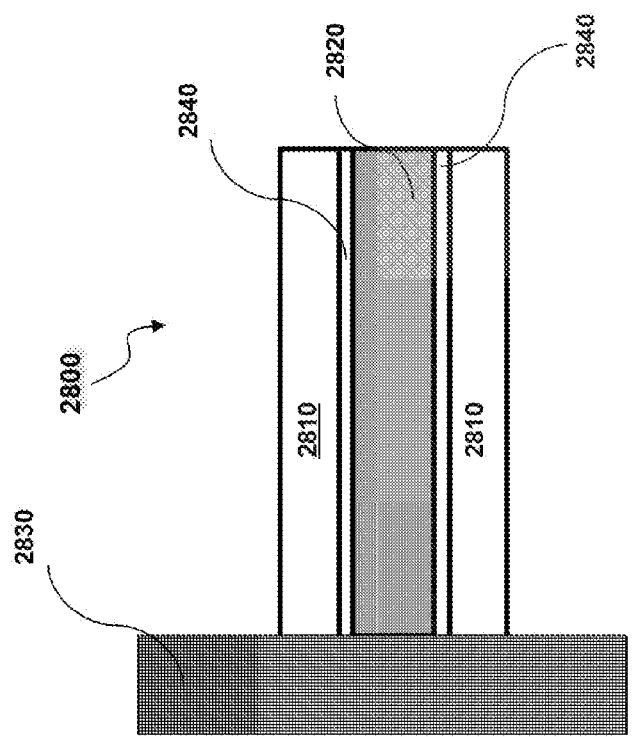
FIG. 28A
FIG. 28B

DEVICES, SYSTEMS, AND METHODS FOR CONTROLLING VENT GASES AND EJECTA FROM THERMAL RUNAWAY EVENTS IN ENERGY STORAGE SYSTEMS

CROSS-REFERENCE TO RELATED APPLICATIONS

The present application is a 371 National Stage of PCT Application Serial No. PCT/US2022/073359, filed Jul. 1, 2022, and published as WO 2023/279089 A2 on Jan. 5, 2023, entitled "Devices, Systems, and Methods for Controlling Vent Gases and Ejecta from Thermal Runaway Events in Energy Storage Systems", which claims benefit of and priority to U.S. Provisional Application No. 63/218,205, filed Jul. 2, 2021, and entitled "Materials, System, and Methods for Mitigation of Electrical Energy Storage Thermal Events", the entire contents of which are incorporated herein by reference. The present application also claims benefit of and priority to U.S. Provisional Application No. 63/231,617, filed Aug. 10, 2021, and entitled "Devices, Systems, and Methods for Controlling Vent Gases and Ejecta from Thermal Runaway Events in Energy Storage Systems", the entire contents of which are incorporated herein by reference. The present application also claims benefit of and priority to U.S. Provisional Application No. 63/273,845, filed Oct. 29, 2021, and entitled "Devices, Systems, and Methods for Controlling Vent Gases and Ejecta from Thermal Runaway Events in Energy Storage Systems", the entire contents of which are incorporated herein by reference. The present application also claims benefit of and priority to U.S. Provisional Application No. 63/275,261, filed Nov. 3, 2021, and entitled "Devices, Systems, and Methods for Controlling Vent Gases and Ejecta from Thermal Runaway Events in Energy Storage Systems", the entire contents of which are incorporated herein by reference.

FIELD OF THE TECHNOLOGY

The present disclosure relates generally to materials and systems for preventing or mitigating thermal events, such as thermal runaway issues, in energy storage systems. In particular, the present disclosure provides multilayer thermal barrier materials including at least one insulation layer, at least one compressible pad, and optionally one or more layers that have favorable heat-dissipating properties, have favorable fire, flame and/or abrasion-resistance properties, and/or have favorable performance for use as thermal barriers. The present disclosure further relates to a battery module or pack with one or more battery cells that includes the multilayer thermal barrier materials, as well as systems including those battery modules or packs.

BACKGROUND

Rechargeable batteries such as lithium-ion batteries have found wide application in the power-driven and energy storage systems. Lithium-ion batteries (LIBs) are widely used in powering portable electronic devices such as cell phones, tablets, laptops, power tools and other high-current devices such as electric vehicles because of their high working voltage, low memory effects, and high energy density compared to traditional batteries. However, safety is a concern as LIBs are susceptible to catastrophic failure under "abuse conditions" such as when a rechargeable battery is overcharged (being charged beyond the designed voltage), overdischarged, operated at or exposed to high temperature and high pressure. As a consequence, narrow operational temperature ranges and charge/discharge rates are limitations on the use of LIBs, as LIBs may fail through a rapid self-heating or thermal runaway event when subjected to conditions outside of their design window.

As shown in FIG. 1, the electrochemical cell of a LIB is primarily comprised of positive electrode, negative electrode, electrolyte capable of conducting lithium-ions, separator separating positive electrode and negative electrode, and current collectors. $LiCoO_2$, $LiFePO_4$, $LiMn_2O_4$, $Li_2TiO_3$, $LiNi_{0.8}Co_{0.15}Al_{0.05}O_2$ (NCA) and $LiNi_{1/3}Co_{1/3}Mn_{1/3}O_2$ (NMC) are six types of cathode material widely used in Li-ion batteries. These six kinds of batteries occupy a majority of market share in battery market today. The electrolyte is composed of a lithium salt dissolved in a specific solvent (mainly including ethylene carbonate (EC), diethyl carbonate (DEC), dimethyl carbonate (DMC), propylene carbonate (PC). The lithium salt is typically selected from $LiClO_4$, $LiPF_6$, $LiBF_4$, LiBOB etc. Separator materials are generally polyolefin based resin materials. Polypropylene (PP) and polyethylene (PE) micro-porous membranes are commonly used as separators in commercial lithium-ion battery. Aluminum foil is usually used as current collector for the positive electrode and copper foil for the negative electrode. Carbon based materials, including hard carbon, carbon nanotubes and graphene are currently the primary choice of most negative electrodes of commercial lithium-ion battery; other novel negative electrode materials, such as titanium based oxides, alloy/de-alloy materials and conversion materials also have been investigated and show good thermal and electrochemical performance.

Operation of LIBs Under Normal Conditions

Under normal operations, lithium ions move via diffusion and migration from one electrode to the other through the electrolyte and separator.

Charging a LIB causes lithium ions in the electrolyte solution to migrate from the cathode through a separator and insert themselves in the anode (FIG. 2). Charge balancing electrons also move to the anode but travel through an external circuit in the charger. Upon discharge, the reverse process occurs, and electrons flow through the device being powered (FIG. 2). During this process, heat is generated within the cell via three primary mechanisms. The first is reversible heat, caused by the entropy change associated with redox reactions that occur during lithiation process (discharge) and de-lithiation process (charging process). Reversible heat is also called entropic heat. The second mechanism is irreversible heat associated with the electrode polarization caused by the overpotential in the cell. Lastly, there is irreversible heat associated with ohmic losses, called Joule heating. Joule heating is due to the movement of the lithium ions and electrons within the cell. Under normal conditions, the self-generated heat is very low and typically inconsequential and can be dissipated via a good battery design or a battery thermal management system, with ease. However, under abuse conditions, several side reactions can occur that cause a thermal runaway. Understanding the causes of thermal runaway can guide the design of functional materials to improve the safety and reliability of LIBs.

Overview of Thermal Runaway and Thermal Runaway Propagation

Thermal runaway may occur when the internal reaction rate increases to the point that more heat is being generated than can be withdrawn, leading to a further increase in both reaction rate and heat generation. During thermal runaway, high temperatures trigger a chain of exothermic reactions in a battery, causing the battery's temperature to increase rapidly. In many cases, when thermal runaway occurs in one battery cell, the generated heat quickly heats up the cells in close proximity to the cell experiencing thermal runaway. Each cell that is added to a thermal runaway reaction contains additional energy to continue the reactions, causing thermal runaway propagation within the battery pack (FIG. 3), eventually leading to a catastrophe with fire or explosion. Prompt heat dissipation and effective block of heat transfer paths can be effective countermeasures to reduce the hazard caused by thermal runaway propagation.

Inducements of Thermal Runaway—Abuse Conditions

Thermal runaway can be triggered by various kinds of abuse, including mechanical abuse, electrical abuse, and thermal abuse (FIG. 3). Each type of abuse may induce an internal short circuit (ISC) in batteries resulting in elevated temperatures. Abuse conditions can be initiated externally or internally. For example, service induced stress, aging, errors in design e.g. configurational parameters such as cell spacing, cell interconnecting style, cell form factor, manufacturing, operation, and maintenance are internal factors that can cause various kinds of abuse. External factors include damage or injury to a LIB, such as from a fall or from a penetration of the cell.

Mechanical Abuse

Mechanical abuse is mainly caused by mechanical force and commonly occurs due to external factors such as, a severe car crash, including collision, crush, penetration and bend. When the battery or battery pack is impacted or involved in a collision, potential damages inside batteries may occur, including rupture of separator and the leakage of flammable electrolyte, initiating ISC and then resulting in thermal runaway. Destructive deformation and displacement caused by applied force are the two common features of the mechanical abuse. Deformation of the battery pack is quite possible during car collision. The layout of the battery pack onboard an electric vehicle affects the crash response of the battery pack. The deformation of the battery pack may result in dangerous consequences: the battery separator may get torn and the internal short circuit (ISC) occurs; the flammable electrolyte leaks and potentially causes consequent fire. Penetration is another common phenomenon that may occur during the vehicle collision. Comparing with the crush conditions, fierce ISC can be instantaneously triggered when penetration starts. The mechanical destruction and electrical short occur simultaneously, and the abuse condition of penetration might be more severe than that of simple mechanical or electric abuse.

Electrical Abuse

Electrical abuse mainly includes internal or external short-circuiting of a LIB, overcharge, and over discharge.

The internal short circuit occurs in more than 90% of the abuse conditions. Broadly speaking, the internal short circuit occurs when the cathode and the anode encounter each other due to the failure of the battery separator. The internal short circuit can be caused by (1) mechanical abuse, when the separator is broken by penetration or crush; (2) electrical abuse, when the separator is pierced by dendrite growth (FIG. 4); and (3) thermal abuse, when the separator collapses at a high temperature.

The external short circuit forms when the electrodes with voltage difference are connected by conductors. The external short circuit of the battery pack can be caused by deformation during car collision, water immersion, contamination with conductors, or electric shock during maintenance, etc. Comparing with penetration, generally, the heat released on the circuit of external short does not heat the cell. The external short circuit can result in large current and high heat generation in battery, which is primarily caused by ohmic heat generation. As the temperature starts to exceed around 70° C., the cell starts to rupture. As a consequence, venting and electrolyte leakage may be triggered.

Overcharging can be defined as charging a battery beyond its designed voltage. Overcharging can be triggered by high specific current densities, aggressive charging profiles, etc., which can bring about a series of problems, including deposition of Li metal on the anode, which seriously affects the battery's electrochemical performance and safety; decomposition of the cathode material, releasing oxygen; and decomposition of the organic electrolyte, releasing heat and gaseous products ($H_2$, hydrocarbons, CO, etc.). An overcharge process can be divided into three phases. In the first phase, (1) voltage and temperature are not affected and remain substantially unchanged. In the second phase, (2) the lithium dendrite deposition will occur at the voltage platform. And in the third phase, (3) the voltage will drop dramatically as heat and gas are generated, causing thermal runaway in battery.

The overdischarge is another possible electrical abuse condition. Generally, the voltage inconsistency among the cells within the battery pack is unavoidable. Therefore, once the battery management system fails to monitor the voltage of any single cell, the cell with the lowest voltage will be overdischarged. The mechanism of the overdischarge abuse is different from others, and the potential hazard may be underestimated. The cell with the lowest voltage in the battery pack can be forcibly discharged by the other cells connected in series during overdischarge. During the forcible discharge, the pole reverses and the voltage of the cell becomes negative, leading to abnormal heat generation at the overdischarged cell.

Thermal Abuse

Thermal abuse is typically triggered by overheating. Overheating in a lithium ion battery may be caused by mechanical abuse, electrical abuse and contact loss of the connector. Typically, at normal operating temperatures, LIBs are stable; however, above a certain temperature, LIB stability becomes less predictable, and at elevated temperatures, chemical reactions within the battery case will produce gases resulting in an increase in the internal pressure within the battery case. These gases can react further with the cathode, liberating more heat and producing temperatures within or adjacent to the battery that can ignite the electrolyte in the presence of oxygen. When the electrolyte burns, oxygen is produced, further fueling combustion. At some point, build-up of pressure within the battery case results in the battery case rupturing. The escaping gas may ignite and combust.

Thermal runaway caused by mechanical, electric and thermal abuse conditions may induce continuous heat generation and consequently arise in temperature inside battery. A series of chain reactions may occur in different stages with the increasing temperature. The thermal runaway follows a mechanism of chain reactions e.g. physical and/or chemical processes, during which the decomposition reaction of the battery component materials occurs one after another (FIG. 3).

Overview of the Chain Reactions During Thermal Runaway

Understanding the evolution of these physical and/or chemical processes helps to develop the mitigation strategies for the thermal runaway of LIBs. LIBs can have different inducements for thermal runaway at different temperature states or regimes (FIG. 5), including State I: low temperature (<0° C.), State II: normal temperature (0~90° C.) and State III: high temperature (>90° C.).

In State I, LIBs cannot work efficiently as low temperatures result in reduced electrochemical reaction rates. At lower temperature, the battery performance dramatically declines as a result of the reduction of the activity of electrode material and lithium-ion diffusion rate in the electrolyte. Consequences of the decelerated chemical reactions at low temperatures include unwanted Li deposition, plating and dendrite growth. Dendrites are tree-like structures that can form on the lithium plating in a battery. They can quickly penetrate a battery's separator, a porous plastic film between the anode and cathode of the battery (FIG. 4). Li deposition and dendrite growth within a cell are regarded as the main contributing factors for inducing thermal runaway at low temperature. Without wishing to be bound by theory, it is believed that the unwanted Li deposits and dendrites may cause ISC in the battery, which leads to thermal runaway.

In state II (normal temperature operation), heat generation is minimal compared to the heat generated in a thermal runaway process. Heat generation during this state of operation is mainly caused by Li ion diffusion in solid and liquid phase, electrochemical reactions at the solid-liquid interface and side reactions. The heat generation can cause a temperature rise and temperature difference inside the battery, these temperature difference may influence the life and safety of the lithium ion battery. During stage II, the initial overheating can occur as a result of at least one internal or external inducements mentioned above such as battery being overcharged, exposure to excessive temperatures, external short circuits due to faulty wiring, or internal short circuits due to cell defects. When initial overheating starts, the battery operation changes from a normal to an abnormal state as the temperature rises towards 90° C. As the temperature gets higher than 40° C., the lifespan of lithium ion battery may shorten due to the speeding side reactions, and when the temperature is near 90° C. or even higher, the decomposition of solid electrolyte interphase (SEI) film can be triggered, which is defined as the beginning of thermal runaway. SEI is generated on the anode of lithium-ion batteries during the first few charging cycles. The SEI provides a passivation layer on the anode surface, which inhibits further electrolyte decomposition and affords the long calendar life required for many applications. The initial decomposition of SEI is regarded as the first side reaction that occurs during the full thermal runaway process. The initial decomposition of SEI occurs at 80~120° C., with a peak locates at approximately 100° C. The onset temperature can be lower than 80° C., as Wang et al. (Thermochim. Acta 437 (2005) 12-16) reported that the SEI decomposition might start from a temperature as low as 57° C.

Decomposition of SEI

As stage III begins, the internal temperature quickly rises resulting in the decomposition of SEI film. The SEI layer primarily consists of stable (such as LiF and $Li_2CO_3$) and metastable (such as polymers, $ROCO_2Li$, $(CH_2OCO_2Li)_2$, and ROLi) components. However, the metastable components can decompose exothermically at roughly >90° C., releasing flammable gases and oxygen. Decomposition of SEI film is considered as the beginning of thermal runaway, and after that, a series of exothermic reactions will be triggered.

With the decomposition of SEI, the temperature builds up, and the lithium metal or intercalated lithium in the anode will react with the organic solvents in the electrolyte, releasing flammable hydrocarbon gases (ethane, methane, and others). This is an exothermic reaction that drives the temperature up further.

Decomposition of Separator

When T>~130° C., the polyethylene (PE)/polypropylene (PP) separator starts to melt, which further deteriorates the situation and causes a short circuit between the cathode and the anode. Although the melting of PE/PP separator is a heat adsorption process, the ISC caused by separator melt will further deteriorate the thermal runaway process.

Gas Emission and Decomposition of Electrolyte

As T>~180° C., heat generated by ISC causes the decomposition of the lithium metal oxide cathode material and results in release of oxygen. The breakdown of the cathode is also highly exothermic, further increasing the temperature and pressure and, as a result, further speeding up the reactions. The heat accumulation and gases release (oxygen and flammable gases) will then induce combustion and explosion of lithium ion battery.

In thermal runaway process, heat generation caused by ISC is only 2%, and chemical reactions are 98%, including the decomposition of SEI layer, decomposition of electrolyte, etc. The largest proportion of heat generation is caused by rapid oxidation-reduction reaction between the cathode and anode, about 48%, while the heat generation of other chemical reactions in anode, cathode and electrolyte is much smaller. The smallest heat generation is decomposition of SEI film.

Need for Mitigation Strategies for Thermal Runaway

Based on the understanding of the mechanisms leading to battery thermal runaway, many approaches are being studied, with the aim of reducing safety hazards through the rational design of battery components. To prevent such cascading thermal runaway events from occurring, LIBs are typically designed to either keep the energy stored sufficiently low, or employ enough insulation material between cells within the battery module or pack to insulate them from thermal events that may occur in an adjacent cell, or a combination thereof. The former severely limits the amount of energy that could potentially be stored in such a device. The latter limits how close cells can be placed and thereby limits the effective energy density. There is a need for effective insulation and heat dissipation strategies to mitigate the thermal runaway possibilities of LIBs.

Current Heat Dissipation Methodologies Used for LIBs

There are currently a number of different methodologies employed to maximize energy density while guarding against cascading thermal runaway. One approach is to incorporate a sufficient amount of insulation between cells or clusters of cells. This approach is generally thought to be desired from a safety vantage; however, in this approach the ability of the insulating material to contain the heat, combined with the volume of insulation required dictate the upper limits of the energy density that can be achieved. Another approach is through the use of phase change materials. These materials undergo an endothermic phase change upon reaching a certain elevated temperature. The endothermic phase change absorbs a portion of the heat being generated and thereby cools the localized region. Typically, for electrical storage devices these phase change materials rely on hydrocarbon materials such as waxes and fatty acids for example. These systems are effective at cooling, but are themselves combustible and therefore are not beneficial in preventing thermal runaway once ignition within the storage device does occur. Incorporation of intumescent materials is another strategy for preventing cascading thermal runaway. These materials expand above a specified temperature producing a char that is designed to be lightweight and provide thermal insulation when needed. These materials can be effective in providing insulating benefits, but the expansion of the material must be accounted for in the design of the storage device.

Need for Novel Thermal Barriers that Meets Mechanical Requirements of LIBs' Systems The swelling of the anode and cathode during charge and discharge can lead to change in dimensions (swelling) of the cell. Silicon, for instance, has a typical volume change of up to 300% during intercalation and graphite has a volume expansion of approximately 10%. This change has both a reversible and irreversible component, with the magnitude dependent on the exact cell chemistry. The reversible change in cell thickness depends solely on the state of charge (SOC) of the cell and can result in an increase in thickness of greater than 2%. The irreversible swelling of the cell is associated with an increase in pressure inside the cell and is caused by the formation of the SEI. The largest component of this change occurs during the first charge cycle, when the SEI is initially formed, but the swelling continues during the life of the cell.

Whilst extensive research has been conducted to create novel materials possessing favorable thermal properties to prevent thermal runaway issues, the mechanical properties of those materials have not received as much attention despite their importance. For example, there is a need for effective thermal barriers used between cells within a battery module or battery pack that can provide resistance to compression deformation to accommodate swelling of the cells that continues during the life of the cell. In addition, during initial assembly of a battery module, a relatively low load of 1 MPa or lower is typically applied to the materials between cells. When the cells within a battery module or battery pack expand or swell during charge/discharge cycles, a load of up to about 5 MPa may be applied to the materials between cells. Accordingly, compressibility, compressional resilience and compliance of the materials e.g. thermal barriers between cells are important properties.

Thermal insulation sheets with superior properties in compression may be useful in addressing these needs, for example as separators between battery cells in battery modules. However, while thermal insulation sheets between battery cells can address direct conduction of heat between battery cells, they may not address the containment or direction of hot gases and other materials. Conventional insulation sheets typically do not extend beyond the edges of the battery cells and/or to the walls of the module. In cases where the insulation sheets do extend to the walls, they do not provide a seal or barrier against the wall. As a result, hot gases and other materials released from a battery cell can pass around the edges of the insulation sheets and transfer heat to other battery cells in the module. There is, therefore, a need for insulation sheets that can block the transfer of hot gasses and particulate matter ("ejecta") from one cell to another cell by containment or redirection of these materials.

Conventional types of insulation, such as foam or fiber sheets, can tolerate high temperatures but have a relatively low capacity for insulation or thermal containment. For such materials, the thickness of the insulation must be increased in order to provide effective thermal management. However, the space requirements for battery modules limit the size of the module, as well as the space between cells within the module. Similarly, it is desirable to limit the overall weight of the battery module. Furthermore, there are mechanical requirements required to accommodate the expansion and contraction of battery cells during charge/discharge cycles and over the lifetime of the cells. Thus, resistance to heat propagation and fire propagation need to be achieved while minimizing the thickness and weight of materials used to provide the necessary compression and resilience, and thermal properties. Moreover, it can be difficult to achieve the manufacturing tolerances required to provide separator sheets that extend to the side walls of the module when sheet insulation materials are used, particularly when encapsulation is required to contain the separator sheets. A different type of insulation system, material, and method to provide effective insulation, thermal and gas containment, and fire propagation protection is needed.

SUMMARY

It is an object of the present disclosure to obviate or mitigate at least one disadvantage of previous methods and materials mentioned above for preventing or mitigating thermal runaway in rechargeable batteries e.g. lithium-ion batteries.

In particular, an object of the present disclosure is to provide a multilayer material for use as a thermal barrier in an electrical energy storage system to solve the problem of thermal propagation in a battery module or battery pack, and to stop or mitigate the thermal propagation when one cell has thermal runaway. Unique configurations of the multilayer materials of the present disclosure can help solving the problem of thermal propagation between cells.

The mitigation strategies can work at the material level, cell level, and system level, guaranteeing the overall safety of an energy storage system that uses rechargeable batteries such as lithium-ion batteries. The multilayer material according to the present disclosure can carry out at least one of the following mitigation steps: (1) reduce the possibility of abuse conditions, (2) eliminate the abuse conditions once they occur, (3) enhance the thermal stability of battery cell against abuse conditions, (4) diminish the energy released under normal operation conditions and a thermal runaway case, and (5) mitigate the propagation hazard and restrict the damage in a limited area.

Another object of the present disclosure is to provide a battery module or pack comprising the multilayer material according to the present invention, which can protect the battery pack from thermal damage due to thermal runaway of one cell and ensure a safe design of the battery pack or module.

In one general aspect, the present disclosure provides novel multilayer materials that include aerogel compositions, e.g., reinforced aerogel compositions, that are durable and easy to handle, which have favorable resistance to heat propagation and fire propagation while minimizing thickness and weight of materials used, and that also have favorable properties for compressibility, compressional resilience, and compliance. For example, the multilayer material according to aspects disclosed herein can include at least one insulation layer including aerogel composition or reinforced aerogel composition.

In one general aspect, the multilayer materials disclosed herein are useful for separating, insulating and protecting battery cells or battery components of batteries of any configuration, e.g., pouch cells, cylindrical cells, prismatic cells, as well as packs and modules incorporating or including any such cells. The multilayer materials disclosed herein are useful in rechargeable batteries e.g. lithium-ion batteries, solid state batteries, and any other energy storage device or technology in which separation, insulation, and protection are necessary.

In one general aspect, the present disclosure aims to provide a battery module and a battery pack, which are used for simultaneously improving the heat dissipation performance and the thermal runaway protection performance of a power battery. In power-driven and energy storage systems, it is common that a number of cells are packed together in a preselected configuration (e.g., in parallel, in series or in combination) to form a battery module. A number of such battery modules may, in turn, be combined or joined to form various battery packs such as are known in the art. During operation and discharge, such cells, battery modules or battery packs commonly produce or generate quantities of heat which can significantly detrimentally impact the performance that results therefrom. Thus, in order to maintain desired or optimal performance by such cells or resulting battery modules or battery packs, it is generally important to maintain the temperature of such cells, battery modules or battery packs within fairly narrow prescribed ranges. It is the aim of this disclosure to keep the temperature of such cells, battery modules or battery packs within optimum ranges.

In addition to maintaining the temperature of the cells within the prescribed ranges, it is also an objective to maintain structural integrity of the cells. The materials within the cells need to be both compliant and resilient to accommodate changes in volume during operation of the batteries. In some embodiments, the materials must be flame-retardant or fire resistant to maintain structural integrity after or during a thermal event.

In one aspect, provided herein is a multilayer material for use as a thermal barrier in an electrical energy storage system including: a core portion including a layered assembly of at least one insulation layer and at least one thermal capacitive layer, which are alternately piled in a direction normal to their largest surface; and an exterior portion disposed outside of the core portion, the exterior portion including at least one sacrificial material layer including a compressible pad having a 25% compression force deflection at about 27 kPa to about 55 kPa and at least one encapsulating material layer selected from a polymer, an elastomer or combination thereof.

In another aspect, provided herein is a multilayer material for use as a thermal barrier in an electrical energy storage system including: a core portion including a layered assembly of at least one insulation layer and at least one thermally conductive layer, which are alternately piled in a direction normal to their largest surface; and an exterior portion disposed on the outside of the core portion, the exterior portion including at least one sacrificial material layer having a 25% compression force deflection at about 27 kPa to about 55 kPa and at least one encapsulating material layer selected from at least one of a polymer, an elastomer or combination thereof.

In one aspect, provided herein is a multilayer material for use as a thermal barrier in an electrical energy storage system including: a core portion including at least one insulation layer; and an exterior portion disposed on the outside of the core portion, the exterior portion including at least one sacrificial material layer including a compressible pad having a compression modulus of about 1 MPa to about 12 MPa and at least one encapsulating material layer selected from a polymer, an elastomer or combination thereof, wherein the encapsulating material layer is sandwiched between the core portion and the sacrificial material layer of the exterior portion. In some embodiments, the core portion further includes at least one thermally capacitive layer having specific thermal capacity of at least about 200 J/(kg-K). In some embodiments, the core portion includes a layered assembly of at least one insulation layer and at least one thermally capacitive layer, which are alternately piled in a direction normal to their largest surface. In some embodiments, the core portion further includes at least one thermally conductive layer having thermal conductivity along an in-plane dimension of said thermally conductive layer of at least about 200 mW/m-K. In some embodiments, the core portion includes a layered assembly of at least one insulation layer and at least one thermally conductive layer, which are alternately piled in a direction normal to their largest surface.

In another aspect, provided herein is a multilayer material for use as a thermal barrier in an electrical energy storage system including: a core layer having two sides including at least one compressible material layer having a compression modulus of about 1 MPa to about 12 MPa and optionally at least one thermally conductive layer and/or at least one thermally capacitive layer; two insulation layers having thermal conductivity through a thickness dimension of said insulation layer less than about 50 mW/m-K at 25° C. and less than about 60 mW/m-K at 600° C., wherein the core layer is sandwiched by two insulation layers, wherein the optional at least one thermally conductive layer has an in-plane thermal conductivity of at least about 200 mW/m-K and wherein the optional at least one thermally capacitive layer has a specific thermal capacity of at least about 200 J/(kg-K), and wherein the multilayer material is optionally encapsulated in an encapsulating material selected from at least one of a polymer, an elastomer or combination thereof. In some embodiments, the core layer further includes a flame resistant layer. In some embodiments, the core layer lacks the optional at least one thermally conductive layer and lacks the optional at least one thermally capacitive layer. In some embodiments, the core layer includes the optional at least one thermally conductive layer and lacks the at least one thermally capacitive layer. In some embodiments, the core layer includes two thermally conductive layers and one compressible material layer, wherein the compressible material layer is sandwiched by the two thermally conductive layers. In some embodiments, the core layer includes the optional at least one thermally capacitive layer and lacks the at least one thermally conductive layer. In some embodiments, the core layer includes two thermally capacitive layers and one compressible material layer, wherein the compressible material layer is sandwiched by the two thermally capacitive layers. In some embodiments, the core layer includes one thermally capacitive layer and two compressible material layers, wherein the thermally capacitive layer is sandwiched by two compressible material layers. In some embodiments, the multilayer material further includes two thermally capacitive layers, wherein each thermally capacitive layer is disposed onto outer surface of each insulation layer.

Embodiments of any of the above aspects can include one or more of the following features. For example, in some embodiments, the encapsulating material layer is sandwiched between the core portion and the sacrificial material layer. In some embodiments, the sacrificial material layer is sandwiched between the core portion and the encapsulating material layer. In some embodiments, the sacrificial material layer includes a material selected from the group consisting of siloxanes, polyolefins, polyurethanes, phenolics, melamine, cellulose acetate, and polystyrene. In some embodiments, the sacrificial material layer is in the form of foam. In one or more embodiments, the onset temperature of chemical decomposition of the sacrificial material layer is in the range of about 200° C. to about 400° C.

In some embodiments, the exterior portion further includes layers made of materials selected from the group of abrasion resistant materials, intumescent materials, fire-retardant materials, flame-resistant materials or combination thereof.

In some embodiments, the thermal capacitive layer has specific thermal capacity of at least about 200 J/(kg-K). In some embodiments, the thermally capacitive layer is a phase change material. In some embodiments, the thermally capacitive layer includes stainless steel.

In some embodiments, the encapsulating material layer is polyethylene terephthalate layer.

In some embodiments, the encapsulating material layer further includes a metal layer disposed between encapsulation layer and the core portion.

In some embodiments, the insulation layer has a thermal conductivity through a thickness dimension of said insulation layer of less than about 50 mW/m-K at 25° C. and less than about 60 mW/m-K at 600° C. In some embodiments, the insulation layer includes aerogel. In some embodiments, the insulation layer further include a material selected from the group consisting of mica, microporous silica, ceramic fiber, mineral wool, and combinations thereof. In some embodiments, the insulation layer lacks aerogel and the insulation layer includes a material selected from the group consisting of mica, microporous silica, ceramic fiber, mineral wool, and combinations thereof.

In some embodiments, the thermally conductive layer has a thermal conductivity along an in-plane dimension of said thermally conductive layer of at least about 200 mW/m-K. In some embodiments, the thermally conductive layer includes at least one-layer including metal, carbon, conductive polymer, or combinations thereof. In some embodiments, thermally conductive layer is a phase change material. In some embodiments, the thermally conductive layer is a metal selected from aluminum, copper and steel. In some embodiments, the thermally conductive layer conducts heat away from a localized heat load, preferably to the environment. In some embodiments, the thermally conductive layer is in a form selected from the group consisting of mesh, sheet, perforated sheet, foil, and perforated foil. In some embodiments, wherein the thermal conductivity through a thickness dimension of said insulation layer e.g. aerogel at 25° C. remains same or increase insubstantial amounts under the load of up to about 5 MPa. In some embodiments, the thermal conductivity through a thickness dimension of said insulation layer is less than about 50 mW/m-K at 25° C. under the load of up to about 5 MPa. In some embodiments, wherein the thermally conductive layer includes aluminum.

In some embodiments, the insulation layer including an aerogel further includes a reinforcement material. In some embodiments, the reinforcement material is a fiber selected from organic polymer-based fibers, inorganic fibers, carbon-based fibers or a combination thereof. In some embodiments, the fibers are in the form of discrete fibers, woven materials, dry laid non-woven materials, wet laid non-woven materials, needled nonwovens, battings, webs, mats, felts, and/or combinations thereof. In some embodiments, the inorganic fibers are selected from glass fibers, rock fibers, metal fibers, boron fibers, ceramic fibers, basalt fibers, or combination thereof. In one or more embodiments, the aerogel includes a silica-based aerogel. In one or more embodiments, the aerogel includes one or more additives, the additives being present at a level of at least about 5 to 40 percent by weight of the aerogel, preferably, at a level of at least about 5 to 20 percent by weight of the aerogel, more preferably, at a level of at least about 10 to 20 percent by weight of the aerogel. In some embodiments, the one or more additives include fire-class additives. In some embodiments, the one or more additives include opacifiers selected from B4C, Diatomite, Manganese ferrite, MnO, NiO, SnO, $Ag_2O$, $Bi_2O_3$, TiC, WC, carbon black, titanium oxide, iron titanium oxide, zirconium silicate, zirconium oxide, iron (I) oxide, iron (III) oxide, manganese dioxide, iron titanium oxide (ilmenite), chromium oxide, or mixtures thereof. In some embodiments, the one or more additives include opacifiers including silicon carbide. In some embodiments, the one or more additives include a combination of fire-class additives and opacifiers. In one or more embodiments, the aerogel has a density in the range of about 0.25 g/cc to about 1.0 g/cc. In some embodiments, the aerogel has a flexural modulus of about 2 MPa to about 8 MPa. In some embodiments, the aerogel has a compression set at about 70° C. in the range of about 10% to about 25%. In some embodiments, the aerogel exhibits a compressive resistance, and the compressive resistance at 25% strain is between about 40 kPa to about 180 kPa. In one or more embodiments, the aerogel is in the form of a monolith, beads, particles, granules, a powder, a thin film, a sheet, or combination thereof.

In some embodiments, the thermally conductive layer includes at least one-layer including metal, carbon, conductive polymer, or combinations thereof. In some embodiments, thermally conductive layer is a phase change material. In some embodiments, the thermally conductive layer is a metal selected from aluminum, copper and steel. In some embodiments, the thermally conductive layer conducts heat away from a localized heat load, preferably to the environment. In some embodiments, the thermally conductive layer is in a form selected from the group consisting of mesh, sheet, perforated sheet, foil, and perforated foil. In some embodiments, wherein the thermal conductivity through a thickness dimension of said insulation layer e.g. aerogel at 25° C. remains same or increase insubstantial amounts under the load of up to about 5 MPa. In some embodiments, the thermal conductivity through a thickness dimension of said insulation layer is less than about 50 mW/m-K at 25° C. under the load of up to about 5 MPa.

In one aspect, provided herein is the use of the multilayer material according to various embodiments of any of the above aspects in a battery pack including a plurality of single battery cells or of groups of battery cells for separating said single battery cells or groups of battery cells thermally from one another. In some embodiments, a runaway event occurring in one or more battery cell or groups of battery cells of one part of the battery does not cause damage of battery cells or groups of battery cells in parts of said battery which are separated by the multilayer material according to any one of the above aspects from the part of the battery, wherein the runaway event occurs.

In another aspect, provided herein is the multilayer material according to various embodiments of any of the above aspects claims in a battery pack including a plurality of single battery cells or of groups of battery cells for separating said single battery cells or groups of battery cells thermally from one another.

In one aspect, provided herein is a battery module, including: a first battery cell having a first surface; a second battery cell having a second surface, the second surface being in opposing relation to the first surface; and the multilayer material according to various embodiments of any of the above aspects disposed between the first and second surfaces. In some embodiments, the multilayer material covers at least about 80% of the surface area of the opposing first and second surfaces.

In another aspect, provided herein is a battery module including: at least one battery cell, and the multilayer material according to various embodiments of any of the above aspects, wherein the multilayer material is disposed on a surface of the at least one battery cell or on a surface of the battery module.

In one aspect, provided herein is a battery pack including a plurality of cells and spacers disposed between the two neighbor cells or two neighboring modules, wherein the spacer contains the multilayer material according to various embodiments of any of the above aspects.

The battery module or pack according to any of the above aspects, further include a cooling system configured to remove heat from the battery pack. In some embodiments, at least one layer of the multilayer material is in thermal communication with the cooling system. In some embodiments, the thermally conductive layer is in thermal communication with the cooling system.

In another aspect, provided herein is a device or vehicle including the battery module or pack according to any one of the above aspects. In some embodiments, said device is a laptop computer, PDA, mobile phone, tag scanner, audio device, video device, display panel, video camera, digital camera, desktop computers military portable computers military phones laser range finders digital communication device, intelligence gathering sensor, electronically integrated apparel, night vision equipment, power tool, calculator, radio, remote controlled appliance, GPS device, handheld and portable television, car starters, flashlights, acoustic devices, portable heating device, portable vacuum cleaner or a portable medical tool. In some embodiments, the vehicle is an electric vehicle.

In one or more embodiments, the multilayer material according to any of the above aspects has an average thickness in a range of between about 2 mm to about 10 mm in uncompressed state.

The multilayer material described herein can provide one or more advantages over existing thermal runaway mitigation strategies. The multilayer material described herein can minimize or eliminate cell thermal runaway propagation without significantly impacting the energy density of the battery module or pack and assembly cost. The multilayer material of the present disclosure can provide favorable properties for compressibility, compressional resilience, and compliance to accommodate swelling of the cells that continues during the life of the cell while possessing favorable thermal properties under normal operation conditions as well as under thermal runaway conditions. The multilayer materials described herein are durable and easy to handle, have favorable resistance to heat propagation and fire propagation while minimizing thickness and weight of materials used, and also have favorable properties for compressibility, compressional resilience, and compliance.

In another aspect, a battery module includes: an enclosure comprising an interior surface, the interior surface defined by a first endplate and a second endplate extending between a first side wall and a second side wall and a top plate and a bottom plate; two or more battery cells disposed in the interior space of the enclosure; and one or more spacer elements disposed between adjacent battery cells, each of the spacer elements comprising at least one thermal capacitive layer and at least one insulation layer. Each of the spacer elements contacts the interior surface of the enclosure such that a thermal barrier is formed between the adjacent battery cells. In one embodiment, the two or more battery cells are oriented longitudinally between the first side wall and the second side wall, parallel to the end plates, and wherein the spacer elements contact the bottom surface, top surface, first side wall and second side wall to form the thermal barrier between adjacent battery cells. In one embodiment, the spacer elements are formed from a multilayer material, as described herein.

In one embodiment, each of the spacer elements contact one or more channels formed on and/or in the interior surface. The one or more channels may protrude from one or more of the first endplate, the second endplate, the first side wall, the second side wall, the top plate and the bottom plate. Alternatively, the one or more channels are indentations in one or more of the first endplate, the second endplate, the first side wall, the second side wall, the top plate and the bottom plate. Each of the spacer elements contacts a portion of one or more of the channels forming a seal between the spacer element and the interior surface. In one embodiment, the one or more channels are substantially U-shaped having opposing sidewalls and a bottom surface. The spacer elements contact the sidewalls of the U-shaped channels. A gap may be present between the spacer elements and the bottom surface of the U-shaped channels to account for manufacturing variations.

In an embodiment, the one or more spacer elements and the interior surface of the enclosure together are configured to define a plurality of separate compartments, wherein one battery cell is disposed in each compartment. In an embodiment, the one or more spacer elements and the interior surface of the enclosure together are configured to define a plurality of separate compartments, wherein a plurality of battery cells are disposed in each compartment. In an embodiment, at least a portion of the enclosure comprises one or more vent ports, the one or more vent ports are fluidically coupled to one or more of the plurality of separate compartments. The one or more vent ports may be positioned in a side wall or top plate of the enclosure, in communication with one or more of the compartments. The vent ports may be openings or a pressure relief valve. Vent ports, in conjunction with various gas deflection elements, channels and other components can be used to create a gas flow management pathway that can conduct hot gas and particles away from the battery cells.

In another aspect, a battery module includes: an enclosure comprising an interior surface, the interior surface defined by a first endplate and a second endplate extending between a first side wall and a second side wall and a top plate and a bottom plate; two or more battery cells disposed in the interior space of the enclosure; one or more spacer elements disposed between adjacent battery cells, each of the spacer elements comprising at least one thermal capacitive layer and at least one insulation layer; and one or more edge elements disposed along an interior surface of the enclosure, wherein the edge element comprises a material that is compressible and has an onset temperature of chemical decomposition of about 100° C. or more, about 130° C. or more, about 200° C. or more, about 230° C. or more, about 240° C. or more, about 330° C. or more, 350° C. or more, about 400° C. or more, about 415° C. or more, about 425° C. or more, about 450° C. or more, about 500° C. or more, about 550° C. or more, about 600° C. or more, about 650° C. or more, about 700° C. or more, about 750° C. or more, about 800° C. or more, or in a range between any two of these values. Each of the spacer elements contacts at least one or more of the edge elements such that a seal is formed by the edge elements between the spacer element and the interior surface of the enclosure thermally isolating the adjacent battery cells. In an embodiment, the two or more battery cells are oriented between the first side wall and the second side wall, parallel to the end plates, and wherein the spacer elements contact the bottom surface, and wherein one of the one or more edge elements are disposed between the spacer elements and the top surface. In one embodiment, one of the one or more edge elements are disposed between the first side wall and the spacer elements and/or the second side wall and the spacer elements.

In an embodiment, the edge element comprises an intumescent material. In another embodiment, the edge element comprises a shape memory material. In another embodiment, the edge element comprises a combination of an intumescent material and a shape memory material. In another embodiment, the edge element comprises a silicone polymer. In another embodiment, the edge element comprises a multilayer material having one or more capacitive layers and one or more insulating layers. A multilayer material, as described herein, may be used as an edge element.

In an embodiment, the one or more spacer elements, the edge element, and the interior surface of the enclosure together are configured to define a plurality of separate compartments, wherein one battery cell is disposed in each compartment. In an embodiment, the one or more spacer elements, the edge element, and the interior surface of the enclosure together are configured to define a plurality of separate compartments, wherein a plurality of battery cells are disposed in each compartment. In an embodiment, at least a portion of the enclosure comprises one or more vent ports, the one or more vent ports are fluidically coupled to one or more of the plurality of separate compartments. The one or more vent ports may be positioned in a side wall or top plate of the enclosure, in communication with one or more of the compartments. The vent ports may be openings or a pressure relief valve.

In another aspect, a battery module includes: an enclosure comprising an interior surface, the interior surface defined by a first endplate and a second endplate extending between a first side wall and a second side wall and a top plate and a bottom plate; two or more battery cells disposed in the interior space of the enclosure; one or more spacer elements disposed between adjacent battery cells, each of the spacer elements comprising at least one thermal capacitive layer and at least one insulation layer; and one or more caps, in contact with the interior surface, surrounding at least a portion of the one or more of the spacer elements. The one or more caps are configured to form a seal between the one or more spacer elements and the interior surface of the enclosure to thermally isolate the adjacent battery cells. In an embodiment, the two or more battery cells are oriented between the first side wall and the second side wall, parallel to the end plates, and wherein the spacer elements contact the bottom surface, and wherein one of the one or more edge elements are disposed between the spacer elements and the top surface. In one embodiment, one of the one or more edge elements are disposed between the first side wall and the spacer elements and/or the second side wall and the spacer elements.

In an embodiment, one or more of the caps are formed from a polymer. The polymer has an onset temperature of chemical decomposition of about 100° C. or more, about 130° C. or more, about 200° C. or more, about 230° C. or more, about 240° C. or more, about 330° C. or more, about 350° C. or more, about 400° C. or more, about 415° C. or more, about 425° C. or more, about 450° C. or more, about 500° C. or more, about 550° C. or more, about 600° C. or more, about 650° C. or more, about 700° C. or more, about 750° C. or more, about 800° C. or more, or in a range between any two of these values. In an embodiment, a space is defined within the one or more caps which can receive one of the one or more spacer elements. At least one of the one or more caps may be configured such that, during use, a gap exists between a spacer element disposed in the cap and an inner wall of the cap. In an embodiment, at least one of the one or more caps have a substantially U-shaped opening running along a first longitudinal side of the cap, wherein the one or more spacer elements fit within the U-shaped opening. In an embodiment, at least one of the one or more caps has an outer surface that is in a shape that is complementary with the shape of a portion of the interior surface of the enclosure. In an embodiment, at least one of the one or more caps has an opening at an end of the cap, wherein, the opening is configured to allow the cap to be slid over one of the one or more spacer elements. In an embodiment, at least one of the one or more caps completely covers an end of one of the one or more spacer elements. In an embodiment, at least one of the one or more caps has a bottom surface that contacts the bottom plate of the enclosure and a top surface that contacts the top plate of the enclosure. In an embodiment, at least one of the caps has a second longitudinal side that contacts a first side wall or a second side wall of the interior surface of the enclosure.

In an embodiment, at least one of the one or more caps contacts a channel formed in the first side wall or the second side wall. In one embodiment, the channel is an indentation in the first side wall and/or the second side wall. In another embodiment, the channel protrudes from the first side wall and/or the second side wall. In an embodiment, at least one of the one or more caps contact a portion of one or more of the channels forming a seal between the cap and the interior surface. The one or more channels in the interior surface may be substantially U-shaped having opposing sidewalls and a bottom surface. The caps, in one embodiment, contact the sidewalls of the U-shaped channels. In some embodiments, a gap is present between the cap and the bottom surface of the U-shaped channels.

In an embodiment, the one or more spacer elements, the caps, and the interior surface of the enclosure together are configured to define a plurality of separate compartments, wherein one battery cell is disposed in each compartment. In an embodiment, the one or more spacer elements, the caps, and the interior surface of the enclosure together are configured to define a plurality of separate compartments, wherein a plurality of battery cells are disposed in each compartment. In an embodiment, at least a portion of the enclosure comprises one or more vent ports, the one or more vent ports are fluidically coupled to one or more of the plurality of separate compartments. The one or more vent ports may be positioned in a side wall or top plate of the enclosure, in communication with one or more of the compartments. The vent ports may be openings or a pressure relief valve.

In another aspect, provided herein is a battery module including: an enclosure comprising an interior surface and enclosing an interior space within; two or more battery cells disposed in the interior space of the enclosure; one or more spacer elements disposed between adjacent battery cells, each of the spacer elements comprising at least one insulation layer; and one or more extension portions that extend from the spacer elements, wherein the one or more extension portions are formed of a heat activated material, wherein the one or more extension portions deflect and form a seal between the spacer element and the enclosure.

In embodiments, the heat activated material comprises a shape memory material, such as for example a shape memory alloy (e.g., Al—Cu—Ni alloy or Ni—Ti alloy). In embodiments, the heat activated material comprises an intumescent material. And in some embodiments, the heat activated material comprises a combination of a shape memory material and an intumescent material. In embodiments, when heat activated (e.g., one or more extension portions are deflected), the one or more deflected extension portions create a region within the battery module that is sealed from a remainder portion of the battery module (e.g., area outside of sealed region A-A). In some embodiments, the one or more extension portions comprise a first extension portion and a second extension portion; the first extension portion deflecting in an orientation opposite the second extension portion.

In another aspect, provided herein is a battery module including: an enclosure comprising an interior surface and enclosing an interior space within; two or more battery cells disposed in the interior space of the enclosure; one or more spacer elements disposed between adjacent battery cells, each of the spacer elements comprising at least one insulation layer; and one or more extension portions that extend from the interior surface of the enclosure, wherein the one or more extension portions are formed of a heat activated material, wherein the one or more extension portions deflect and form a seal between the spacer element and the enclosure.

In an embodiment, the heat activated material is a shape memory material, such as a Ni—Ti alloy. In some embodiments, the heat activated material is a combination of a shape memory material and an intumescent material. For example, an element that has a base formed of intumescent material and an attached layer or cap formed of shape memory material. In an embodiment, the one or more spacer elements comprise an aerogel (e.g., the at least one insulation layer is formed of an aerogel). In embodiments, the one or more spacer element can include an intumescent material. For example, the one or more spacer element can be formed of intumescent material. In some embodiments the one or more spacer element includes the intumescent material together with an aerogel.

In another aspect, provided herein is a battery module including: an enclosure comprising an interior surface and enclosing an interior space within; two or more battery cells disposed in the interior space of the enclosure; and one or more spacer elements disposed between adjacent battery cells, each of the spacer elements comprising at least one insulation layer in physical contact with at least one heat conducting layer comprising a shape memory material; wherein the shape memory material of the at least one conducting layer defects upon heat activation to form a gap between the one or more spacer element and the at least one of the two or more battery cells.

In an embodiment, the shape memory material is nitinol. In an embodiment, the shape memory material is in plate form. In another embodiment, the shape memory material is dispersed throughout the at least one heat conducting layer. When heat activated, in an embodiment, the dispersed shape memory material is in an expanded spring form. Some embodiments of this aspect further include a cooling system in thermal contact with the two or more battery cells. The cooling system can include a cooling plate.

In another aspect, provided herein is a device or vehicle including the battery module according to any one of the above aspects. In some embodiments, said device is a laptop computer, PDA, mobile phone, tag scanner, audio device, video device, display panel, video camera, digital camera, desktop computers military portable computers military phones laser range finders digital communication device, intelligence gathering sensor, electronically integrated apparel, night vision equipment, power tool, calculator, radio, remote controlled appliance, GPS device, handheld and portable television, car starters, flashlights, acoustic devices, portable heating device, portable vacuum cleaner or a portable medical tool. In some embodiments, the vehicle is an electric vehicle.

BRIEF DESCRIPTION OF THE DRAWINGS

Figure 1:
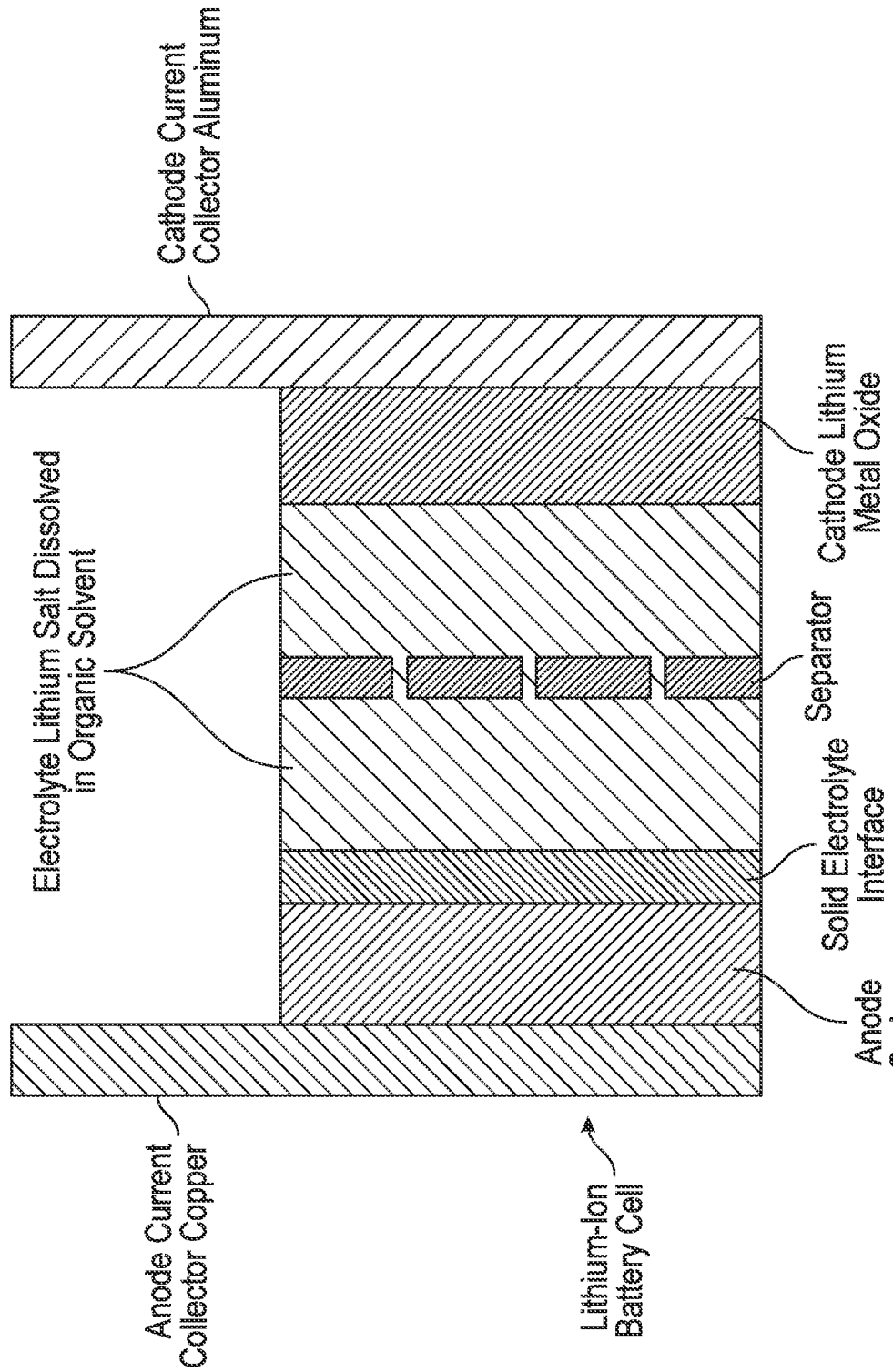

Having thus described the disclosure in general terms, reference will now be made to the accompanying drawings, which are not necessarily drawn to scale, and wherein:

FIG. 1 is a schematic representation of electrochemical cell of a Li-ion battery.

Figure 2:
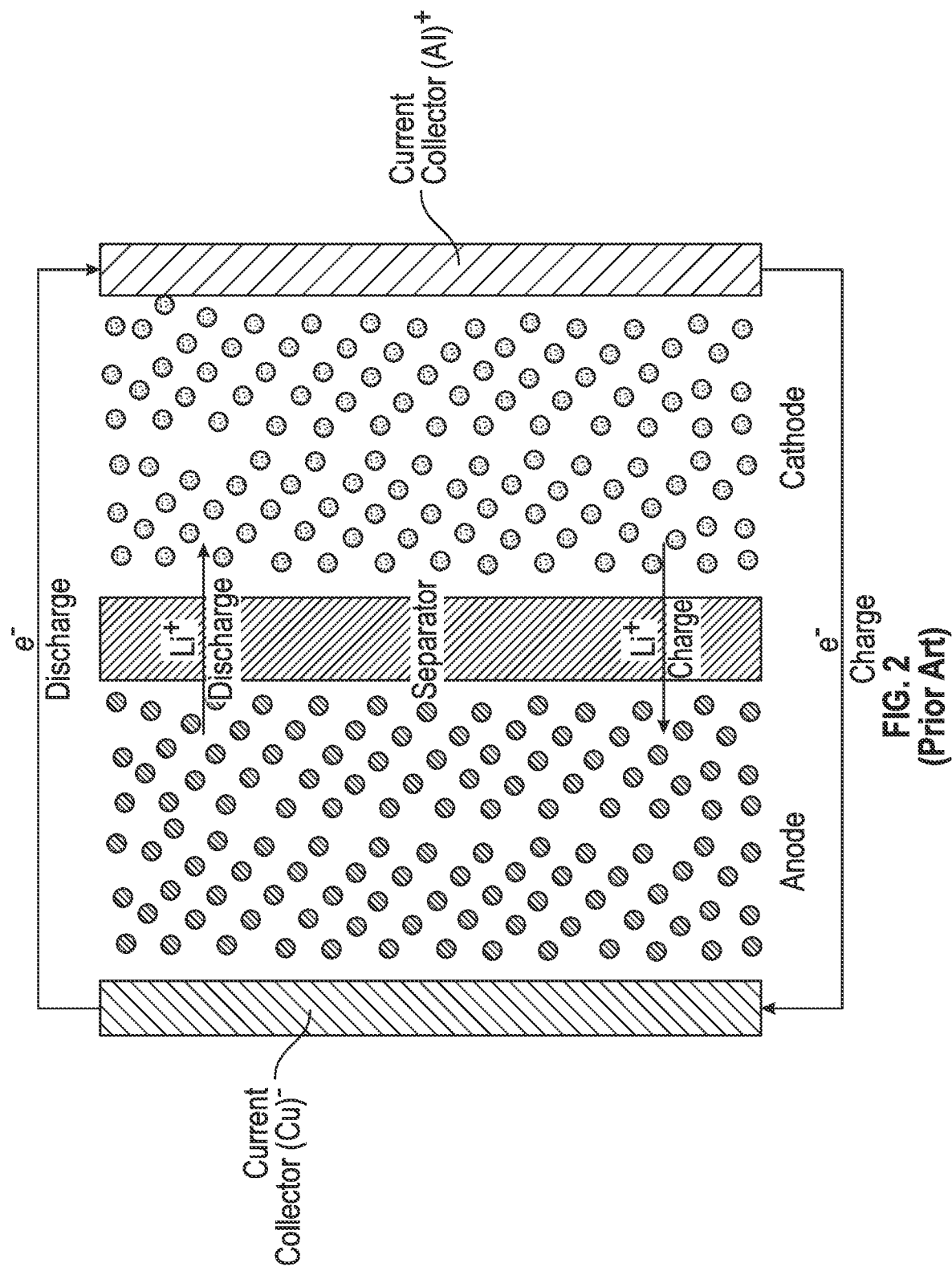

FIG. 2 is a schematic diagram of the charging-discharging process in a Li-ion battery.

Figure 3:
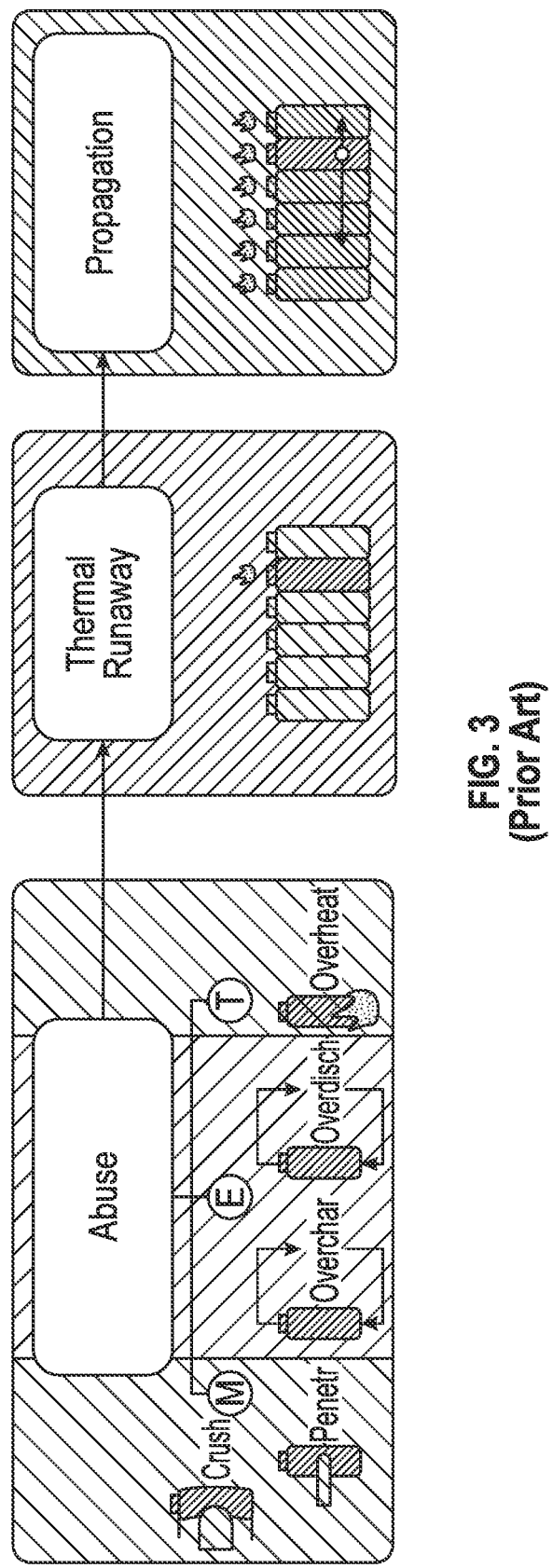

FIG. 3 schematically illustrates thermal runaway abuse conditions and thermal runaway propagation process within a battery module.

Figure 4:
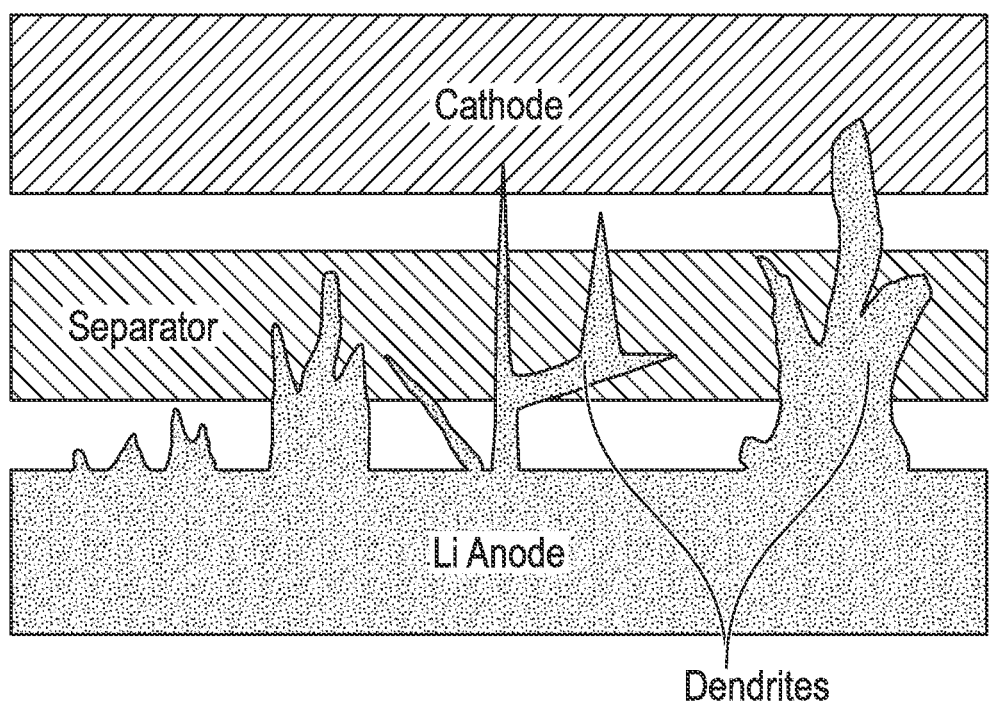

FIG. 4 is a schematic representation of dendrite growth on the lithium plating in a battery.

Figure 5:
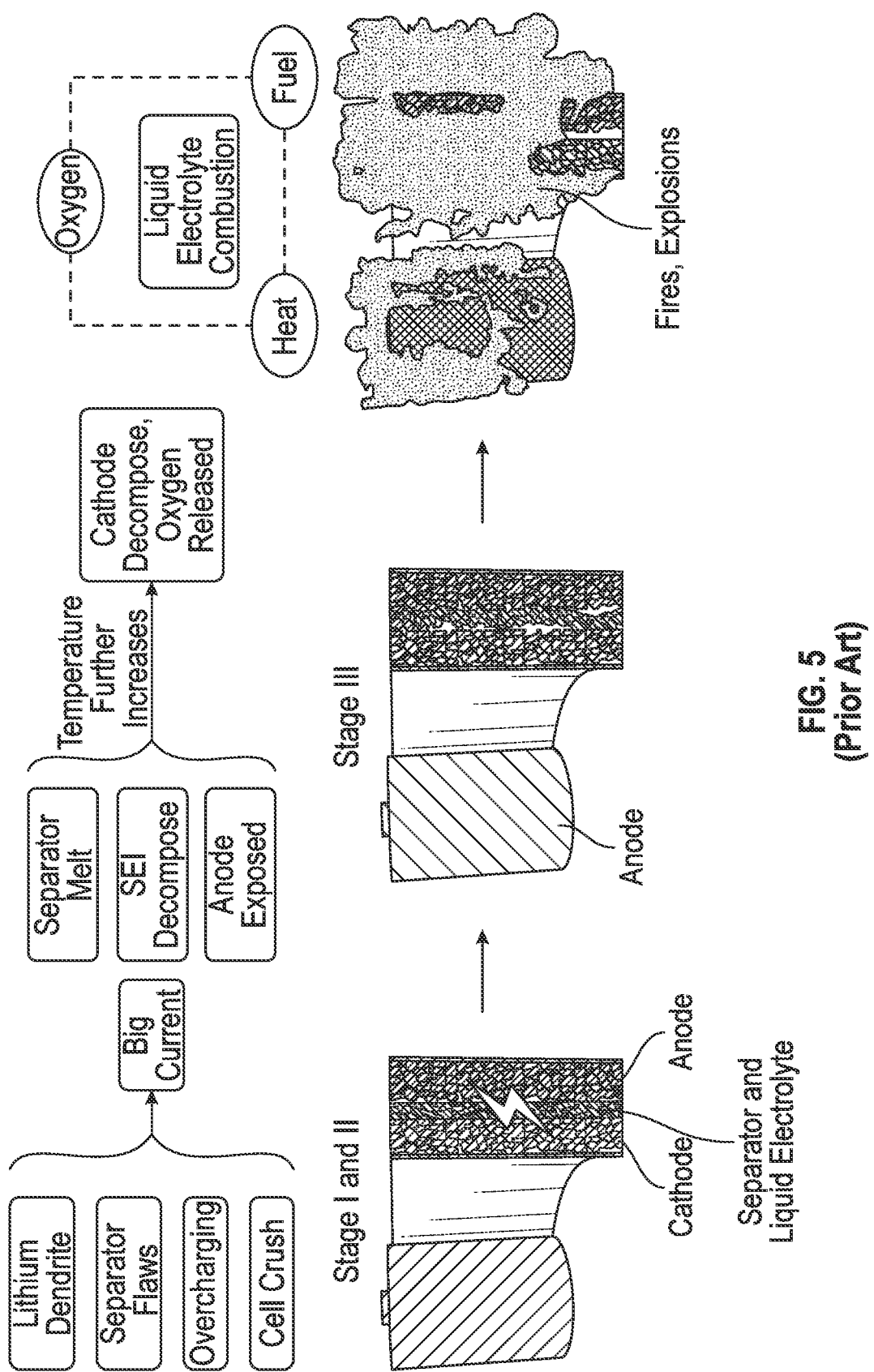

FIG. 5 schematically illustrates three stages that leads to the thermal runaway process.

Figure 6:
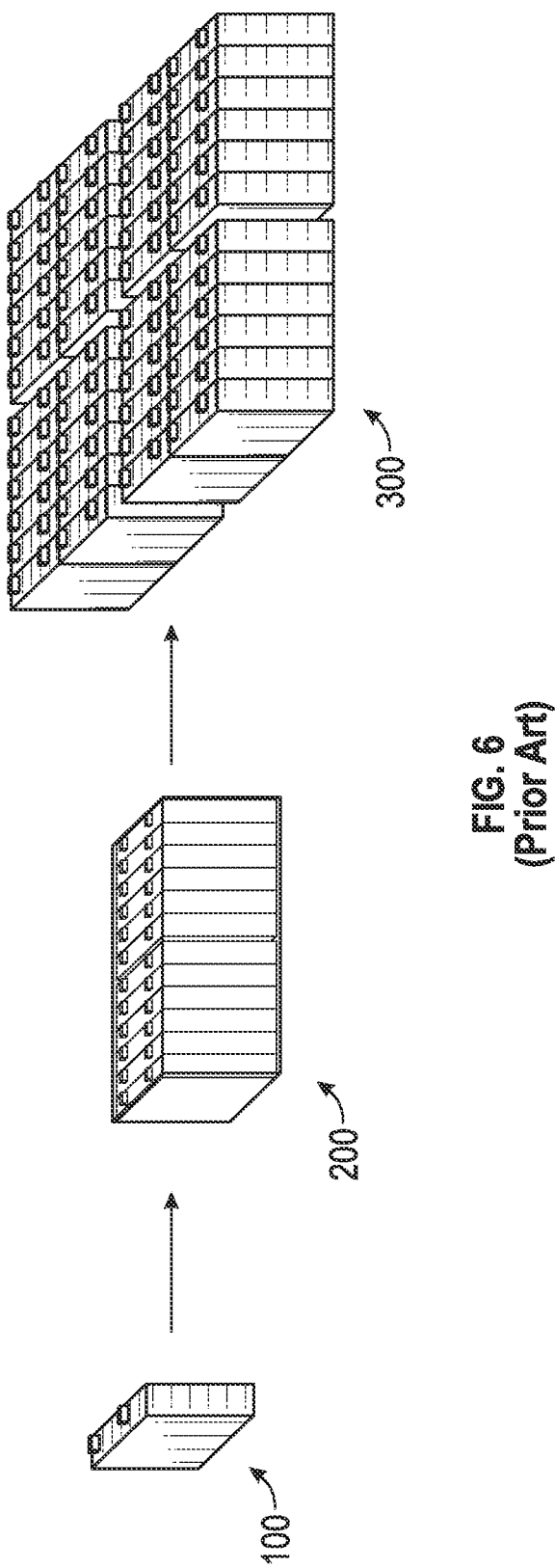

FIG. 6 schematically illustrates battery cell, battery module and battery pack.

Figure 7:
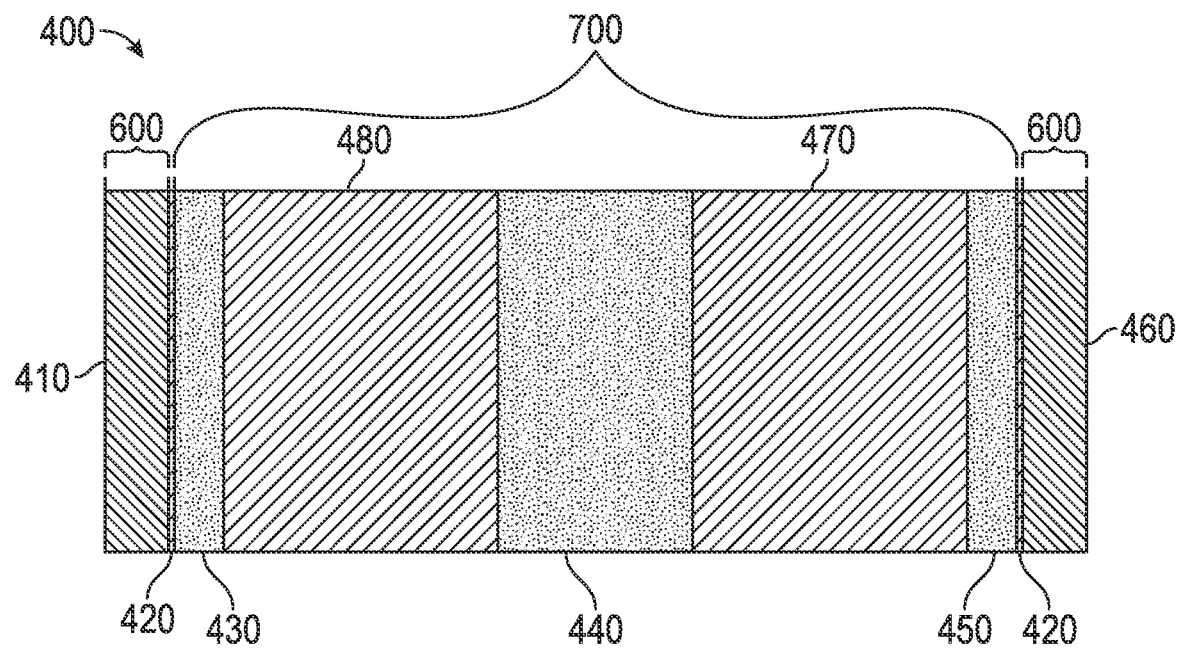

FIG. 7 schematically illustrates a multilayer material according to certain embodiments disclosed herein.

Figure 8:
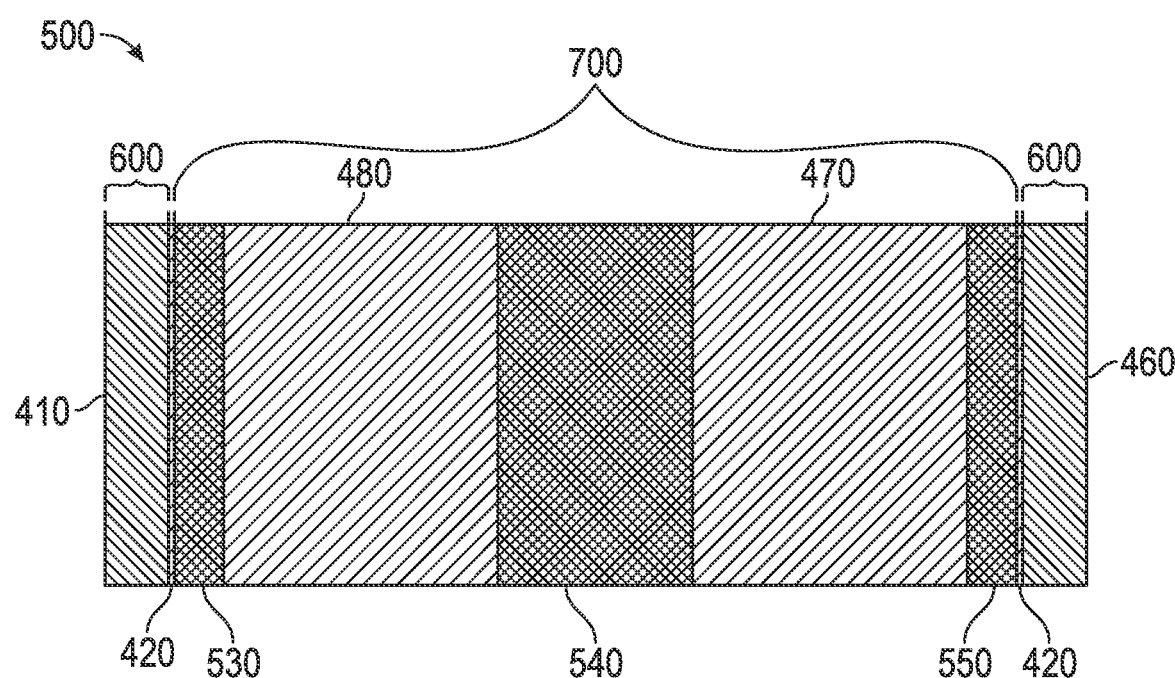

FIG. 8 schematically illustrates a multilayer material according to certain embodiments disclosed herein.

Figure 9A:
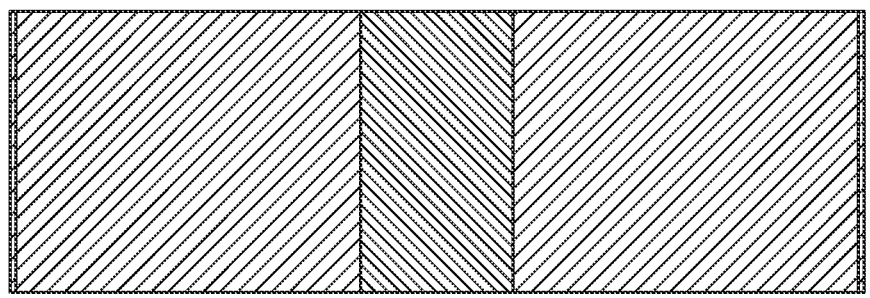

FIG. 9A schematically illustrates a multilayer material for use as a thermal barrier in an electrical energy storage system according to an embodiment disclosed herein.

Figure 9B:
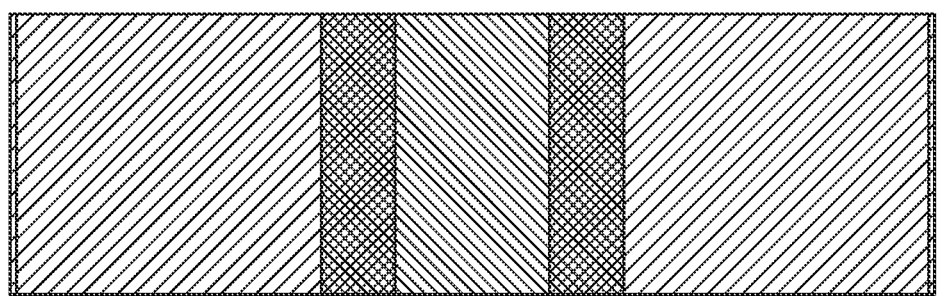

FIG. 9B schematically illustrates another multilayer material for use as a thermal barrier in an electrical energy storage system according to an embodiment disclosed herein.

Figure 9C:
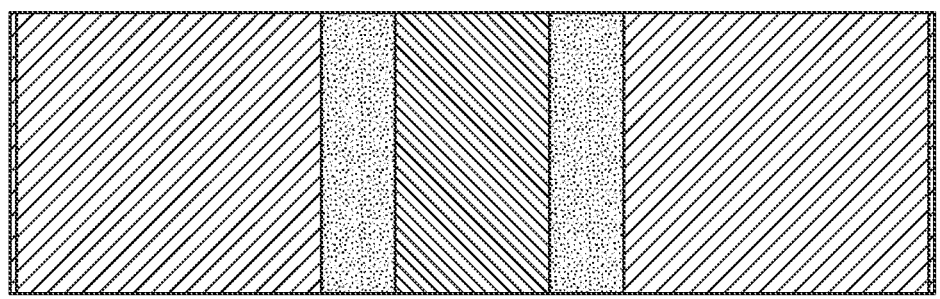

FIG. 9C schematically illustrates a multilayer material for use as a thermal barrier in an electrical energy storage system according to an embodiment disclosed herein.

Figure 9D:
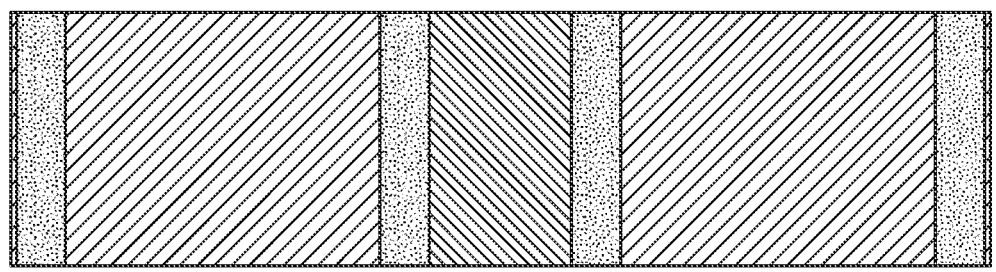

FIG. 9D schematically illustrates a multilayer material for use as a thermal barrier in an electrical energy storage system according to an embodiment disclosed herein.

Figure 9E:
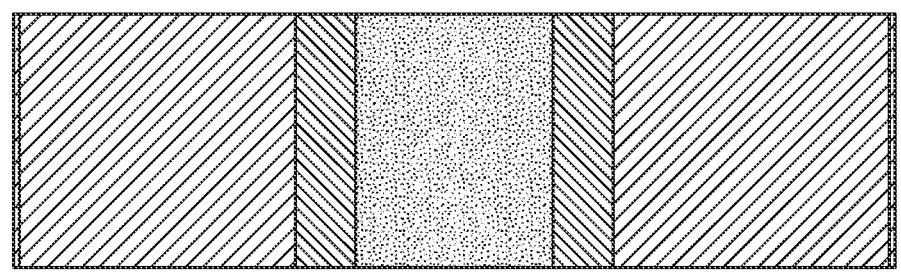

FIG. 9E schematically illustrates a multilayer material for use as a thermal barrier in an electrical energy storage system according to an embodiment disclosed herein.

Figure 10:
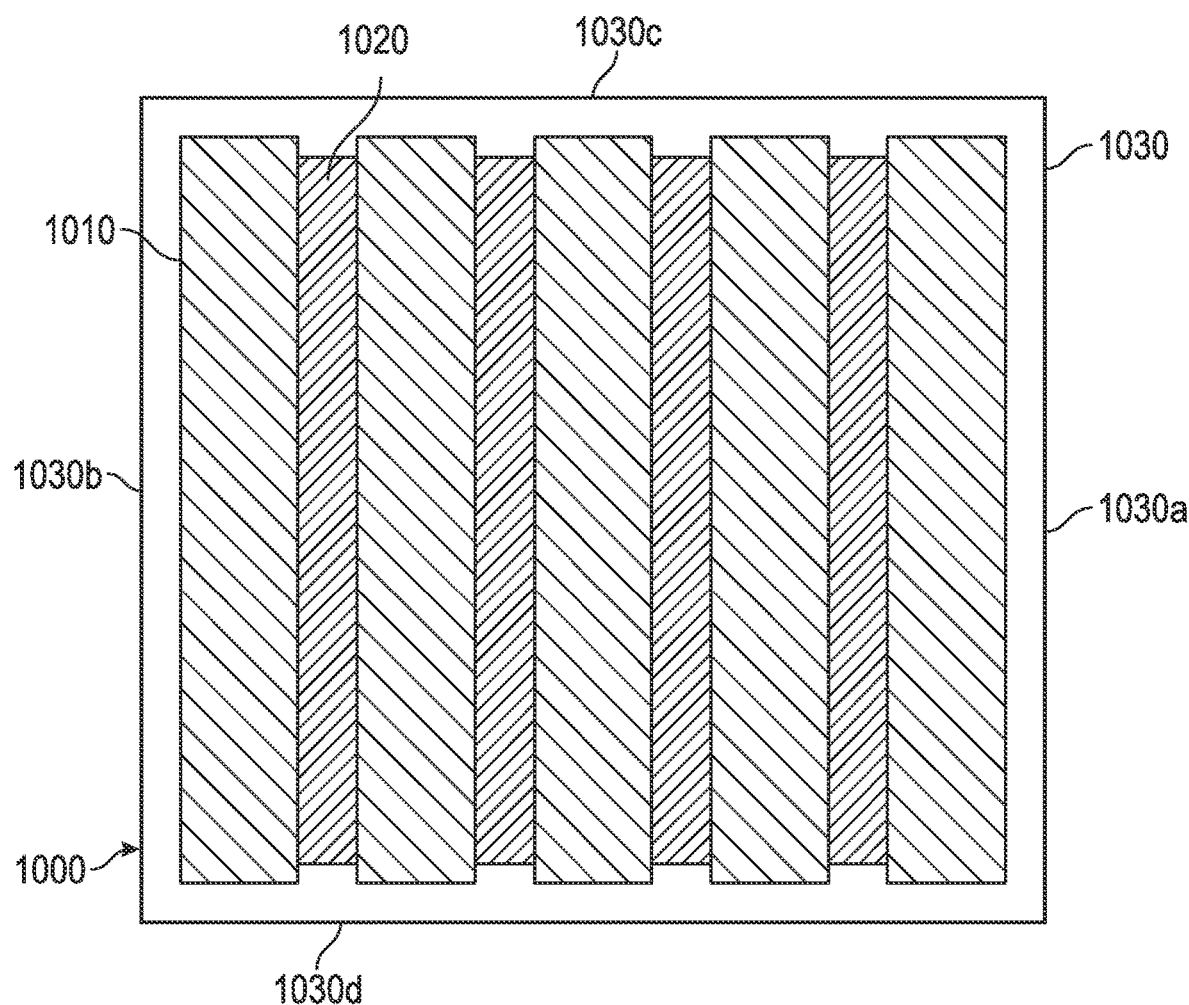

FIG. 10 is a diagram of a prior art battery module.

Figure 11A:
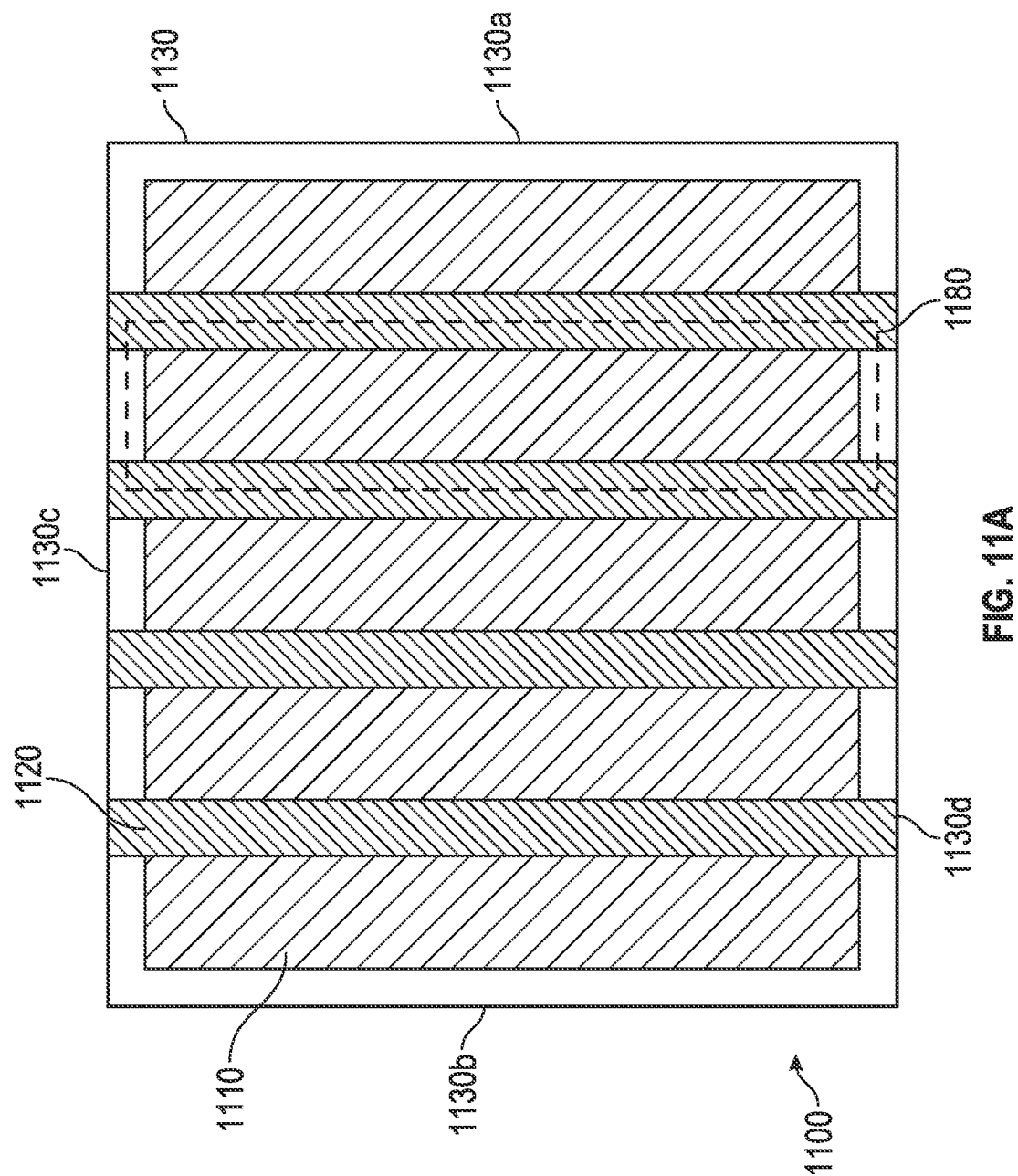
Figure 11B:
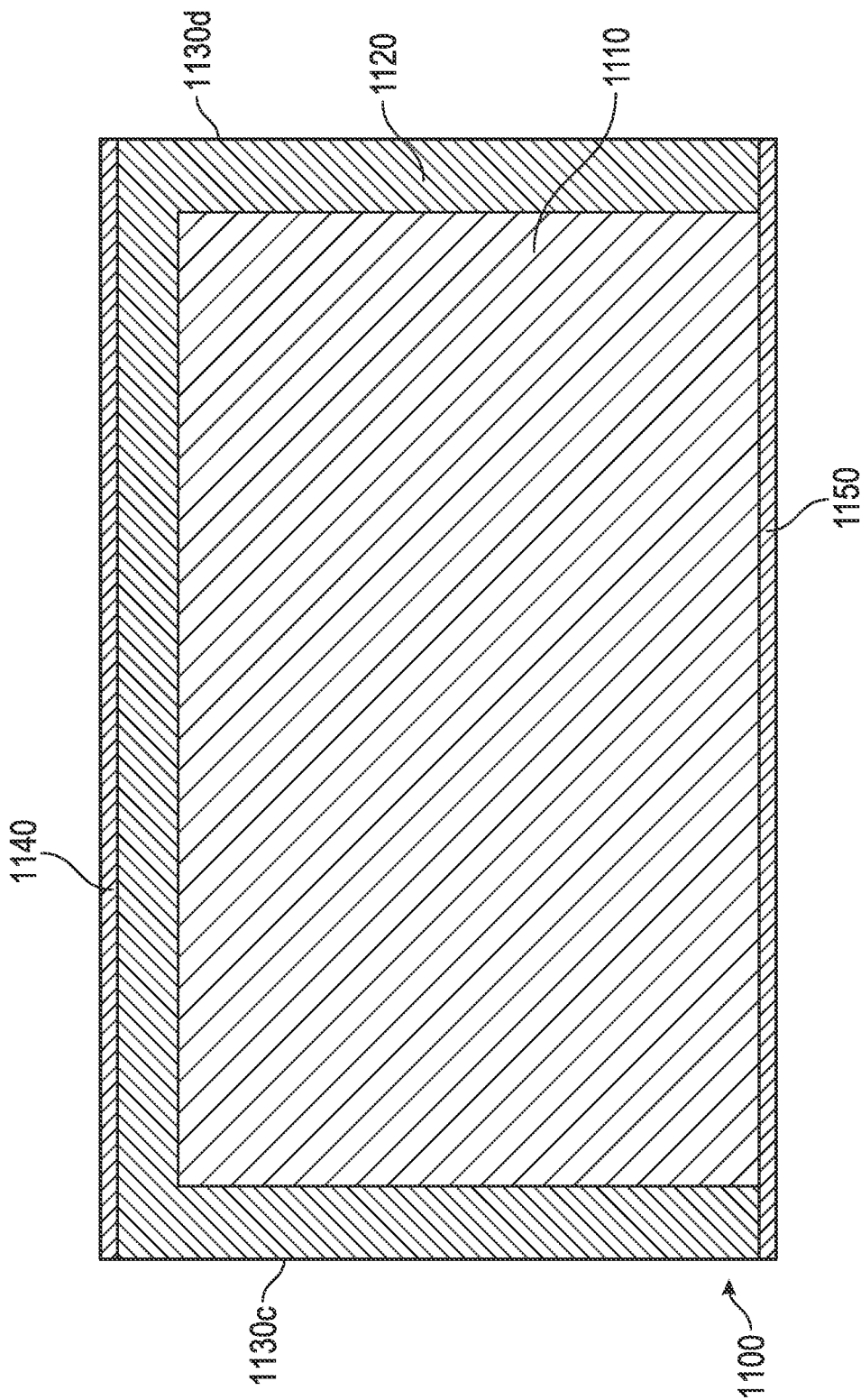

FIG. 11A is a diagram of a battery module having extended spacer elements;

FIG. 11B is a side-view diagram of a battery module having extended spacer elements.

Figure 12A:
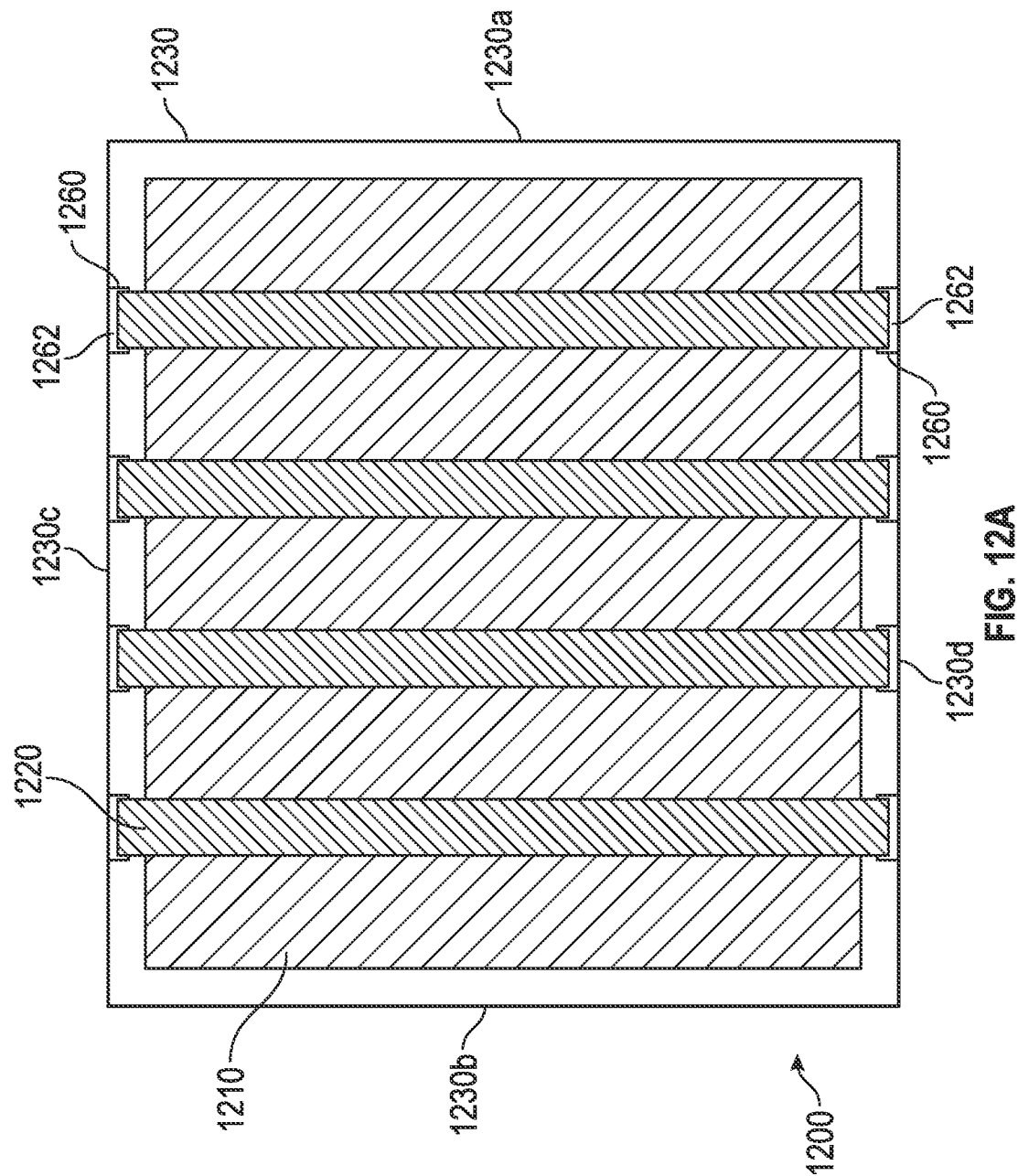

FIG. 12A is a diagram of a battery module having spacer elements positioned in protruding channels.

Figure 12B:
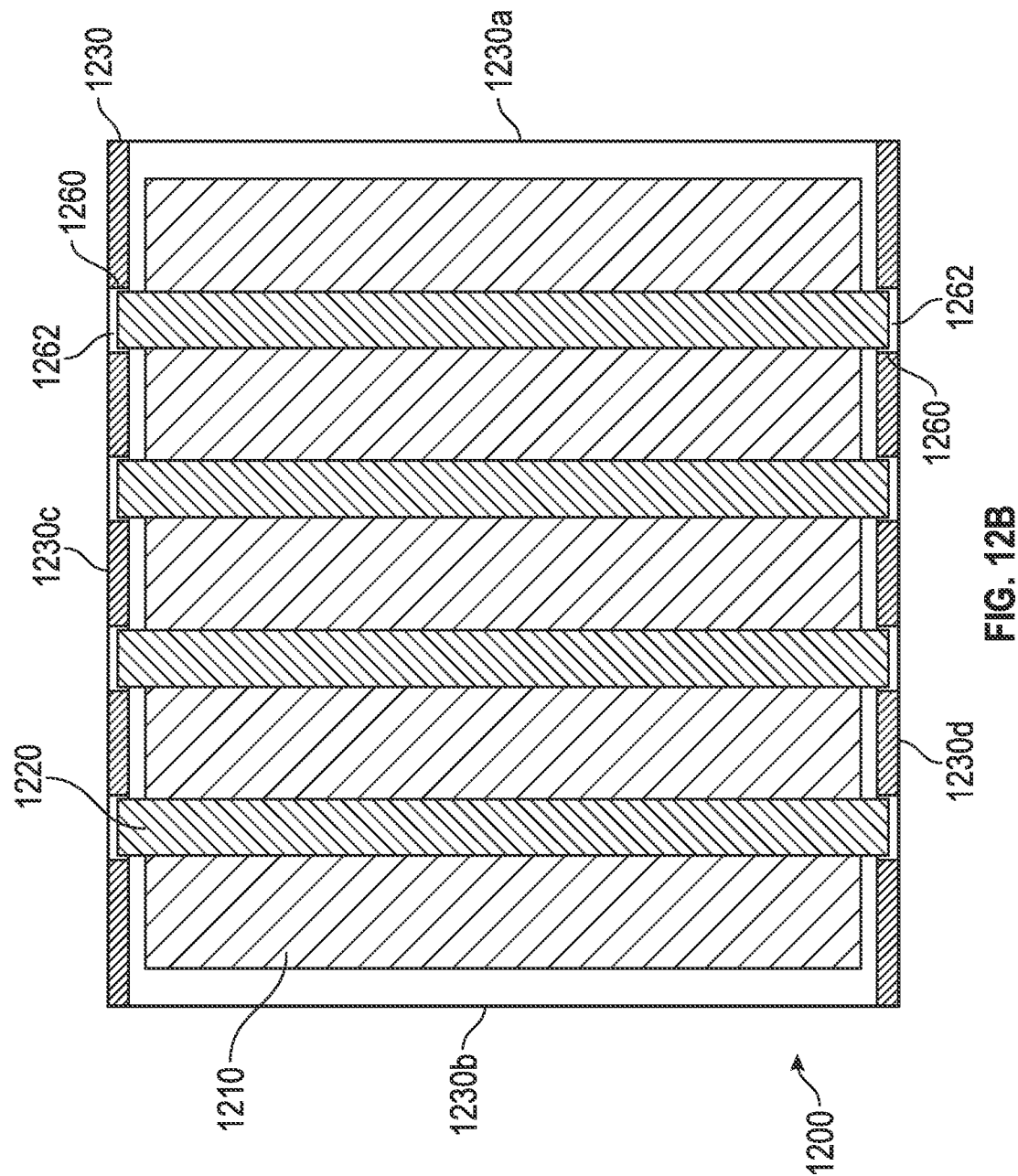

FIG. 12B is a diagram of a battery module having spacer elements positioned in an indented channel.

FIG. 13 is a diagram of a top plate of a battery module.

Figure 14:
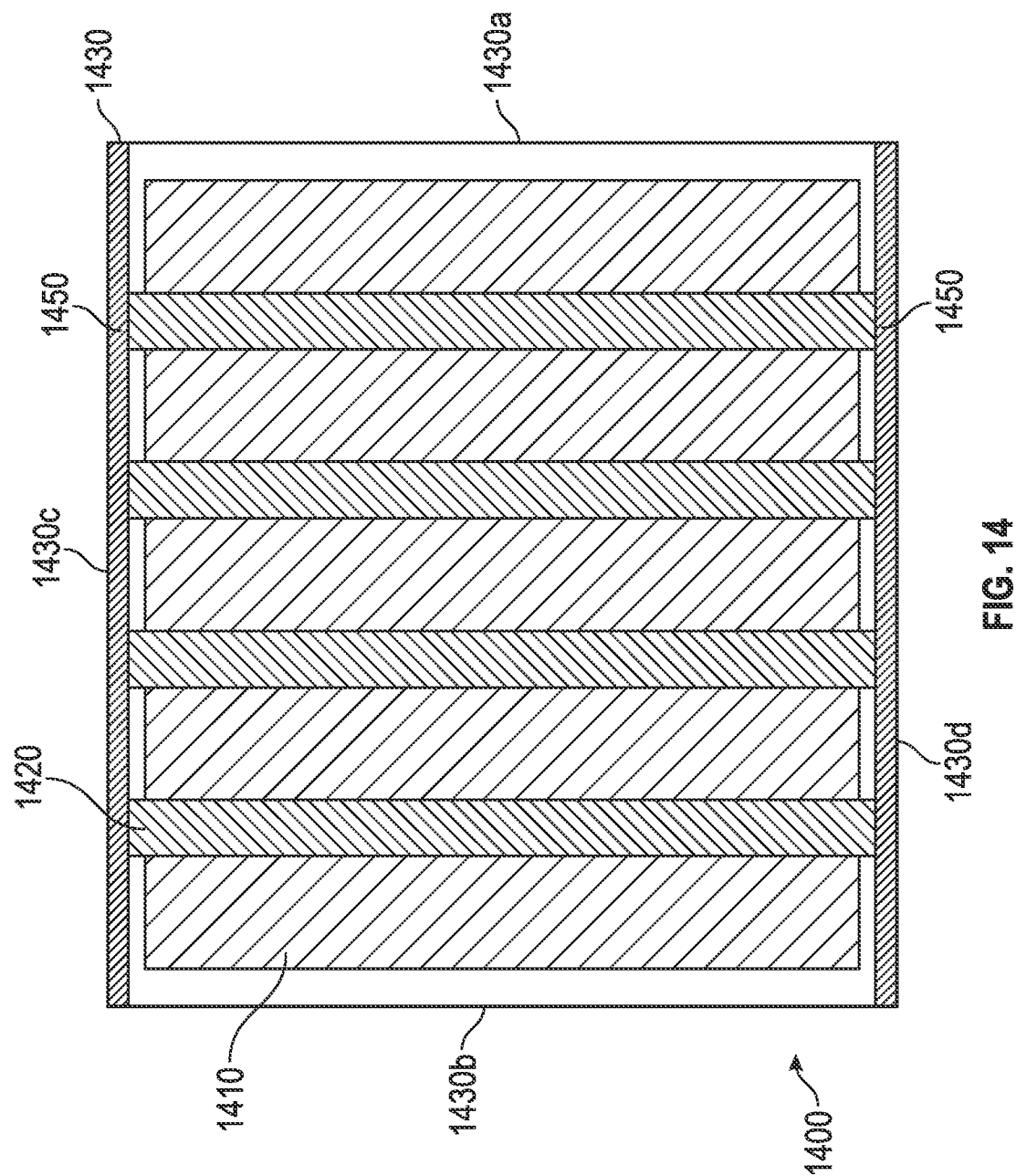

FIG. 14 is a diagram of a battery module having edge elements that form a seal between a spacer element and the enclosure.

Figure 15:
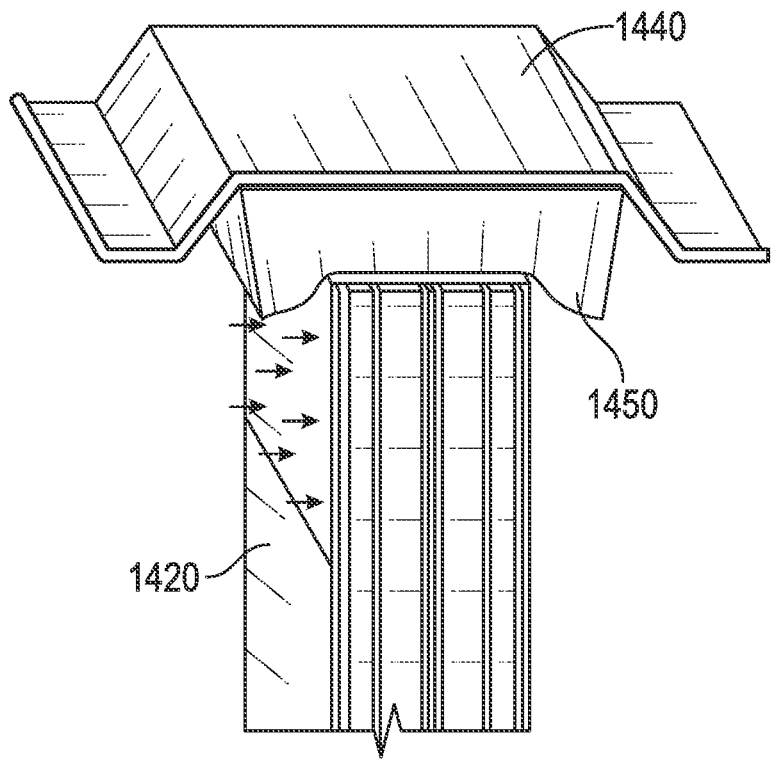

FIG. 15 is an expanded view of the interface between the spacer element and the edge element.

Figure 16:
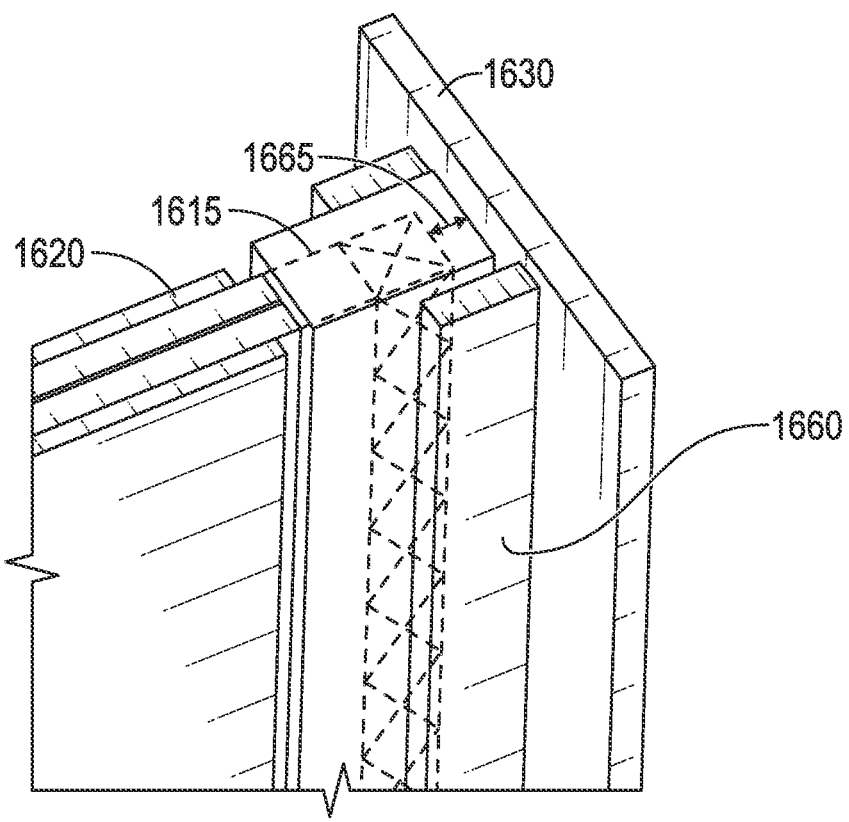

FIG. 16 is an expanded view of the interface between the spacer element and the cap.

Figure 17:
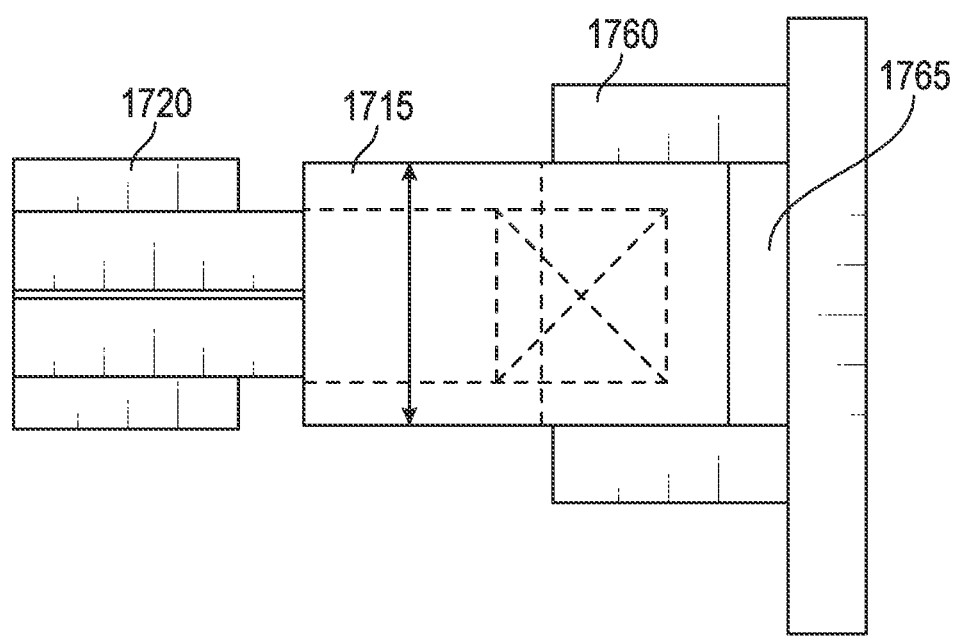

FIG. 17 is a diagram of an alternate configuration of a battery module having spacer elements positioned in a cap.

Figure 18A:
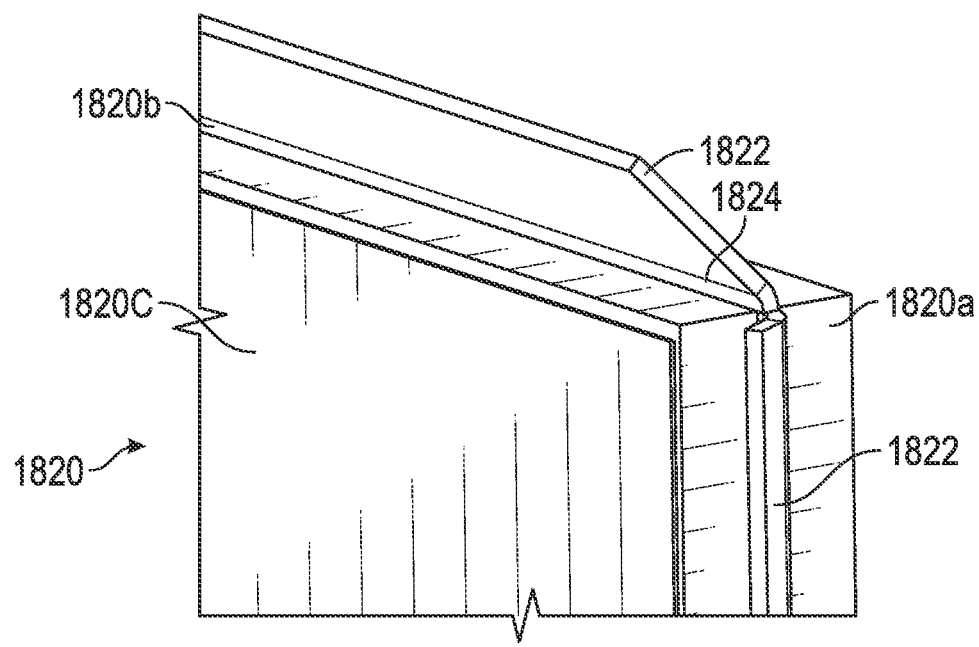

FIG. 18A depicts an embodiment of spacer element having an extended thermally capacitive layer or thermally conductive layer sandwiched between insulating layers within a battery module.

Figure 18B:
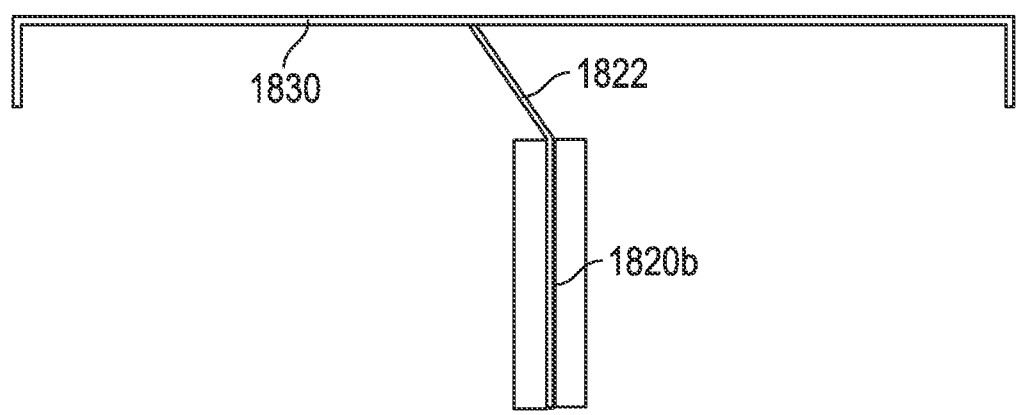

FIG. 18B depicts the spacer element of FIG. 18A in use.

Figure 19A:
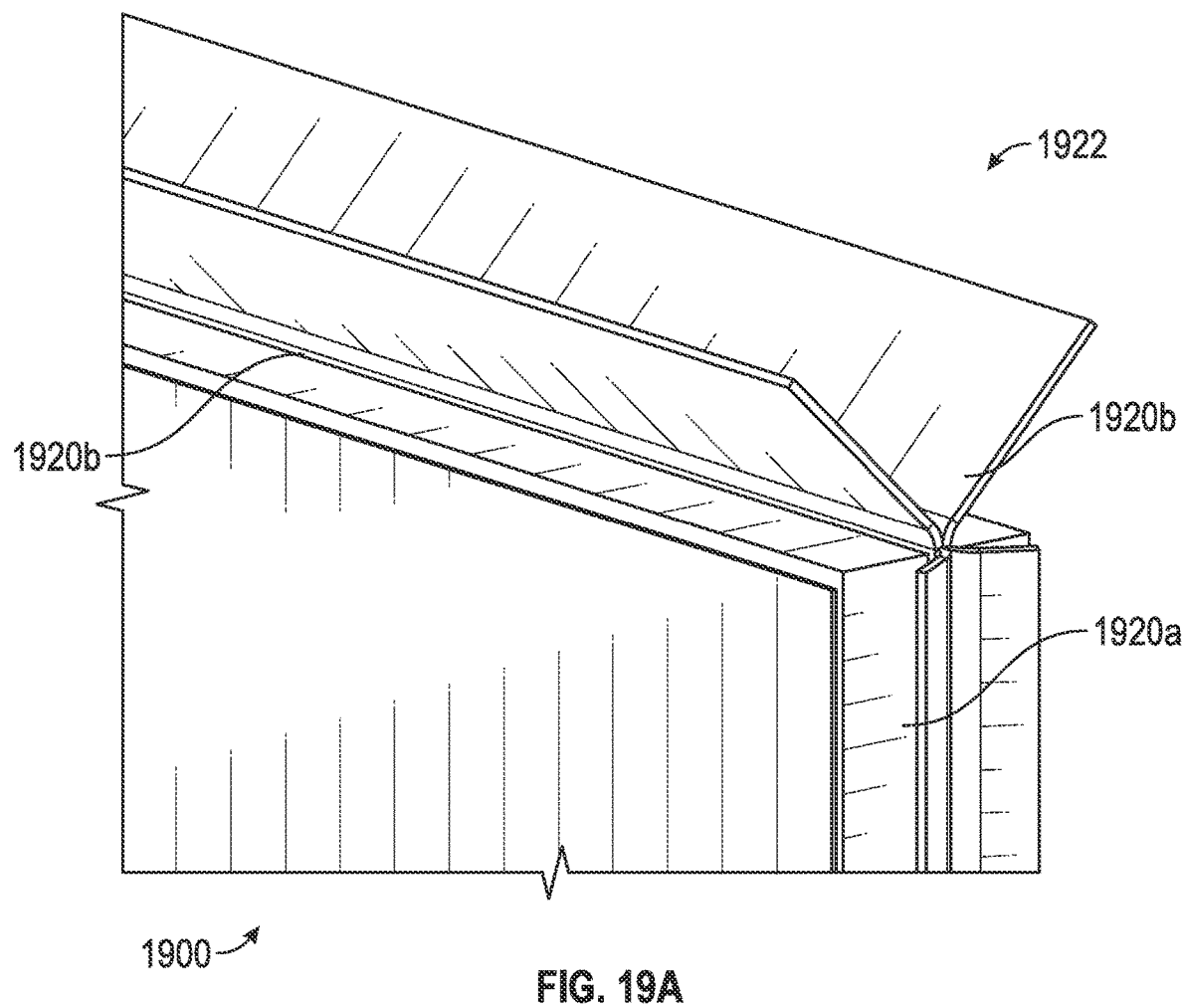

FIG. 19A depicts an embodiment of a spacer element having an extension portion within a battery module.

Figure 19B:
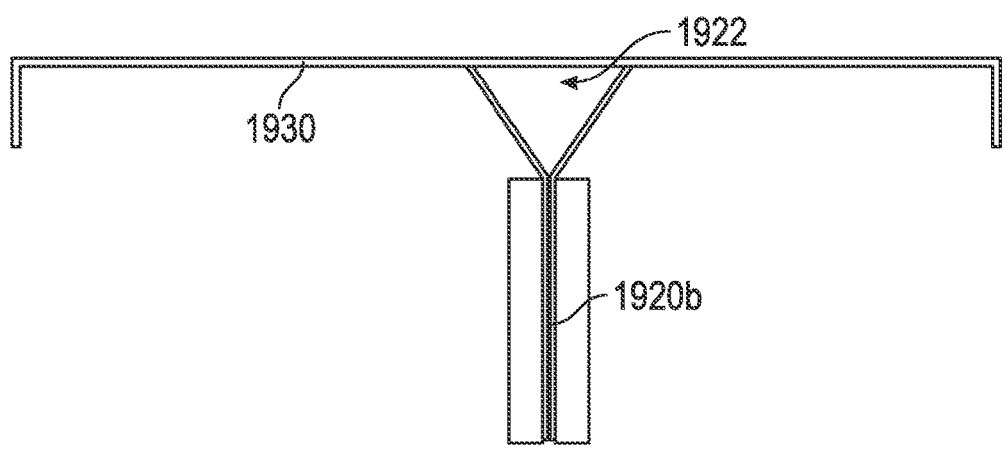

FIG. 19B depicts the spacer element of FIG. 19A in use.

Figure 20A:
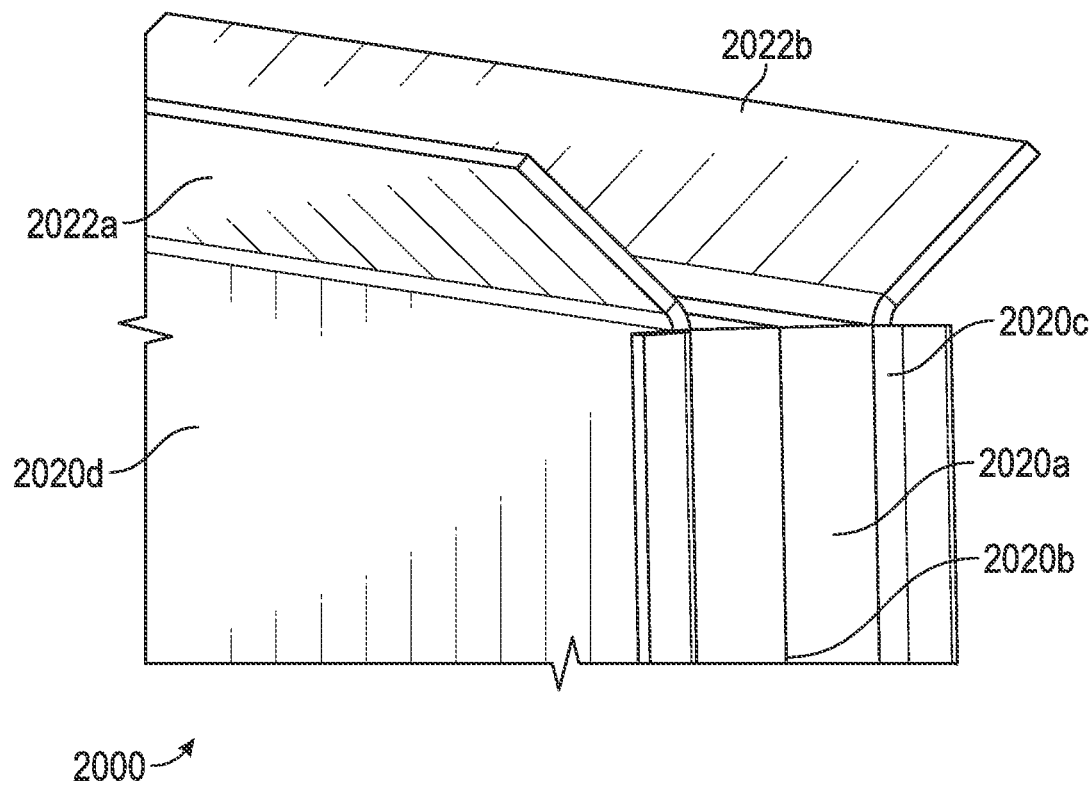

FIG. 20A depicts an alternate embodiment of a spacer element having an extension portion.

Figure 20B:
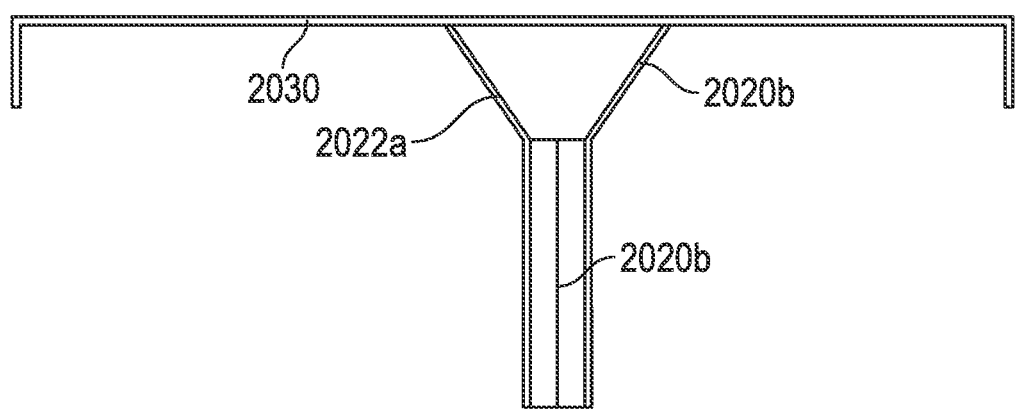

FIG. 20B depicts the spacer element of FIG. 20A in use.

Figure 21A:
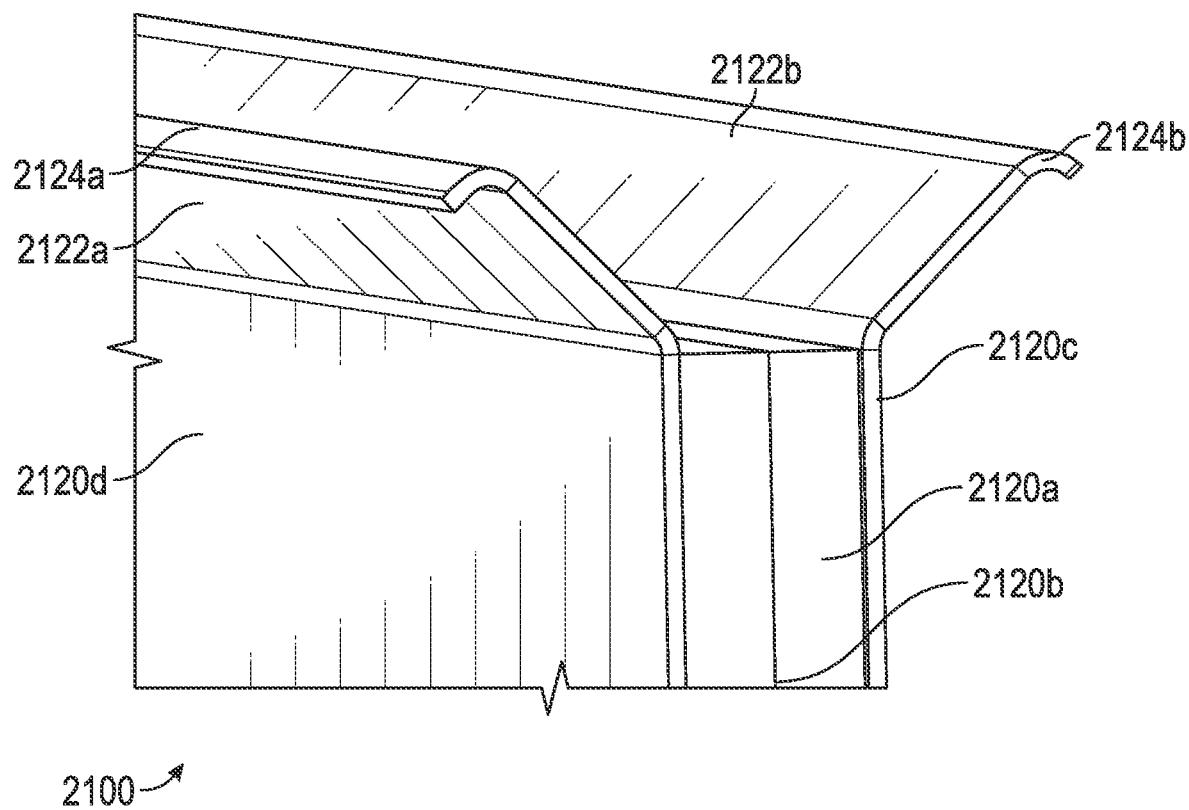

FIG. 21A depicts a modification of the extension portion that can be applied to any of the embodiments disclosed herein.

Figure 21B:
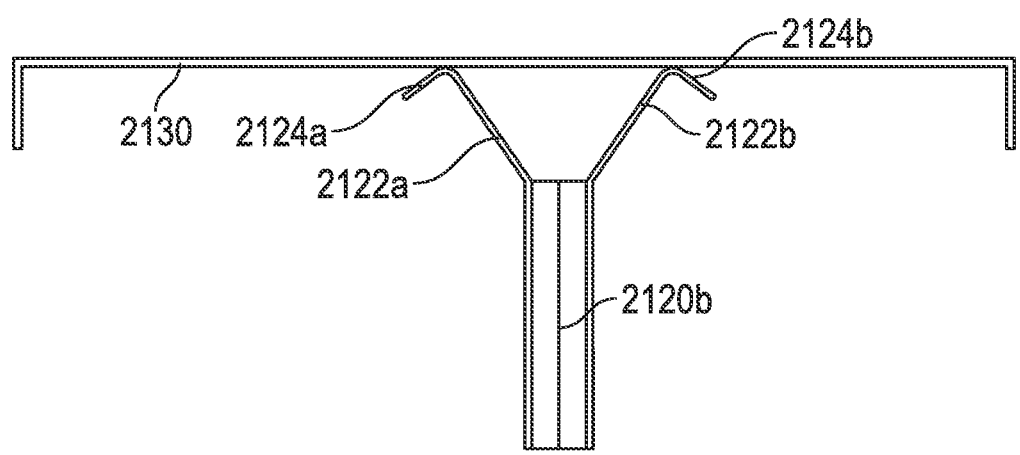

FIG. 21B depicts the extension portion of FIG. 21A in use.

Figure 22:
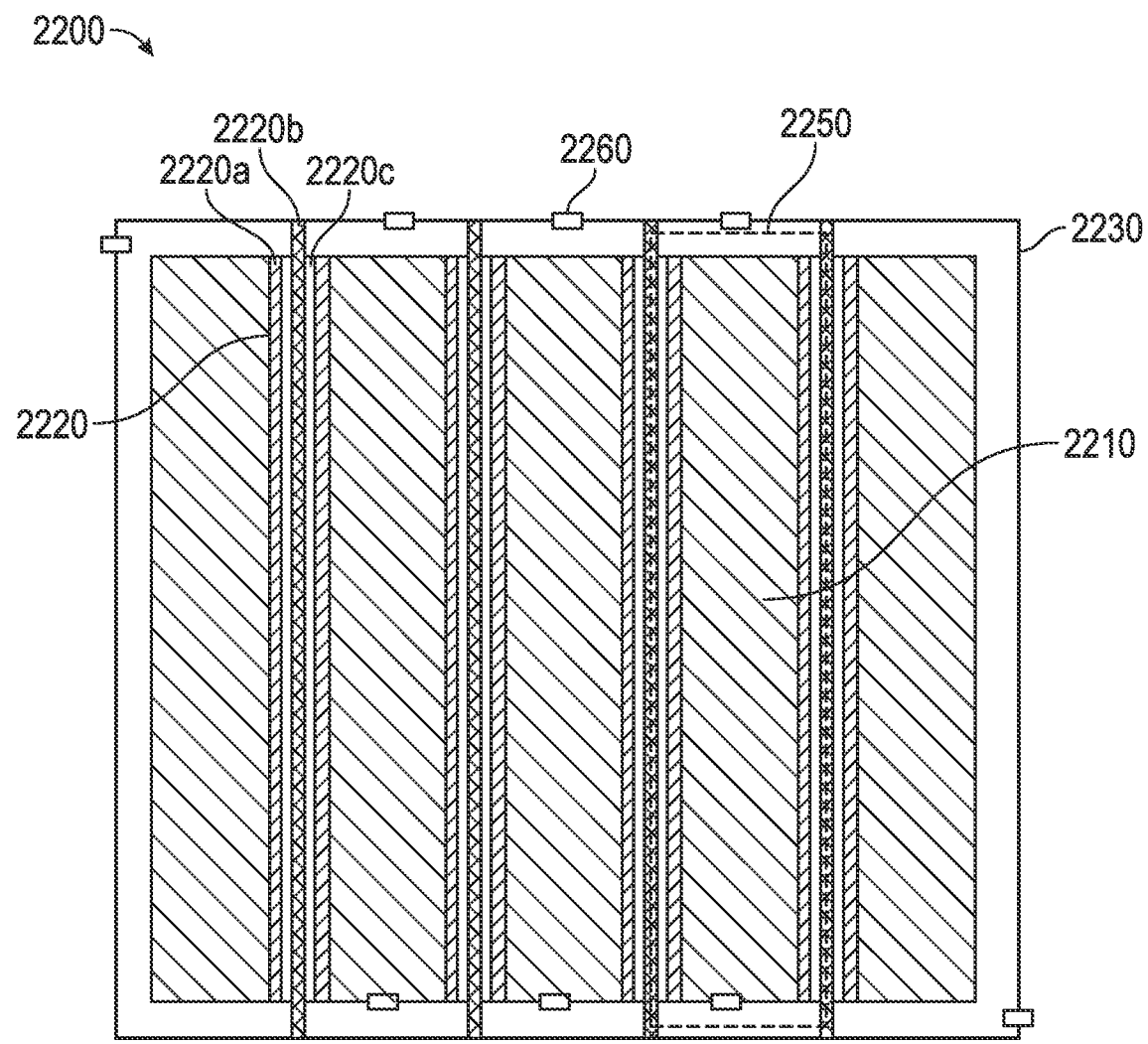

FIG. 22 depicts an embodiment of a spacer element that includes a layer that extends beyond the dimensions of a battery cell to the enclosure.

Figure 23:
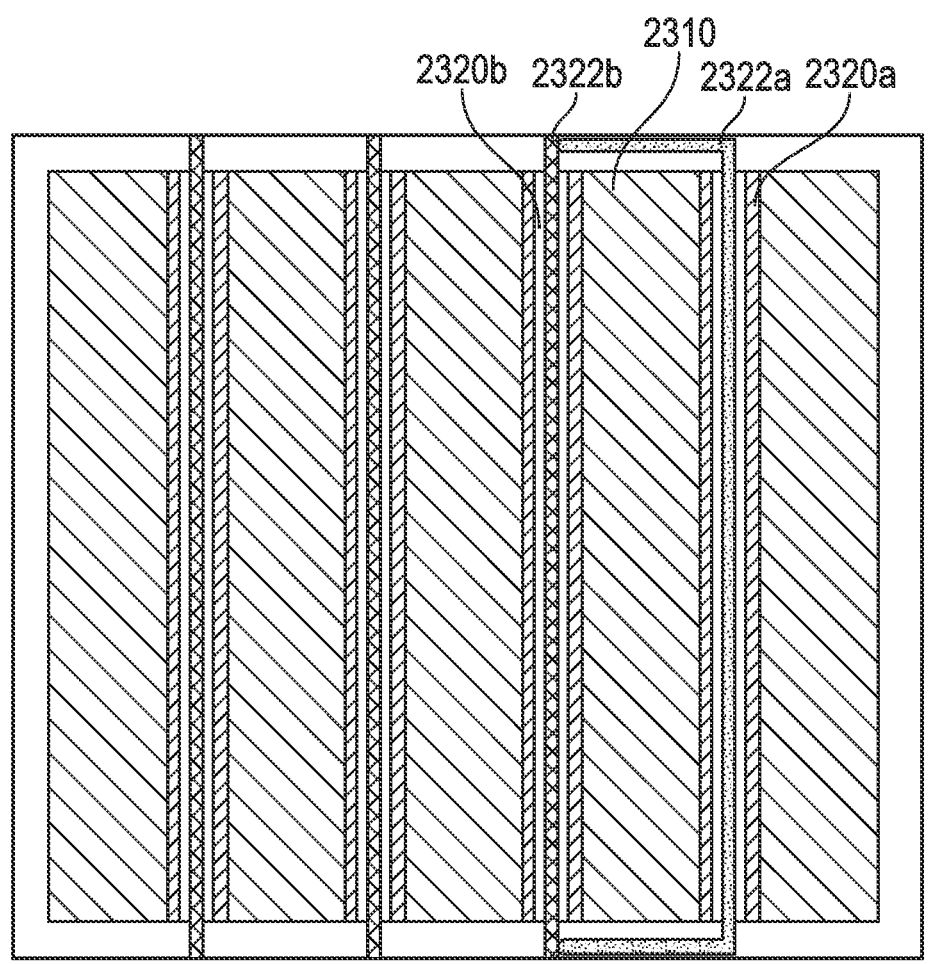

FIG. 23 depicts an embodiment of a spacer element, or portions of the spacer element, that can cover and at least partially isolate a battery cell from the other battery cells.

Figure 24:
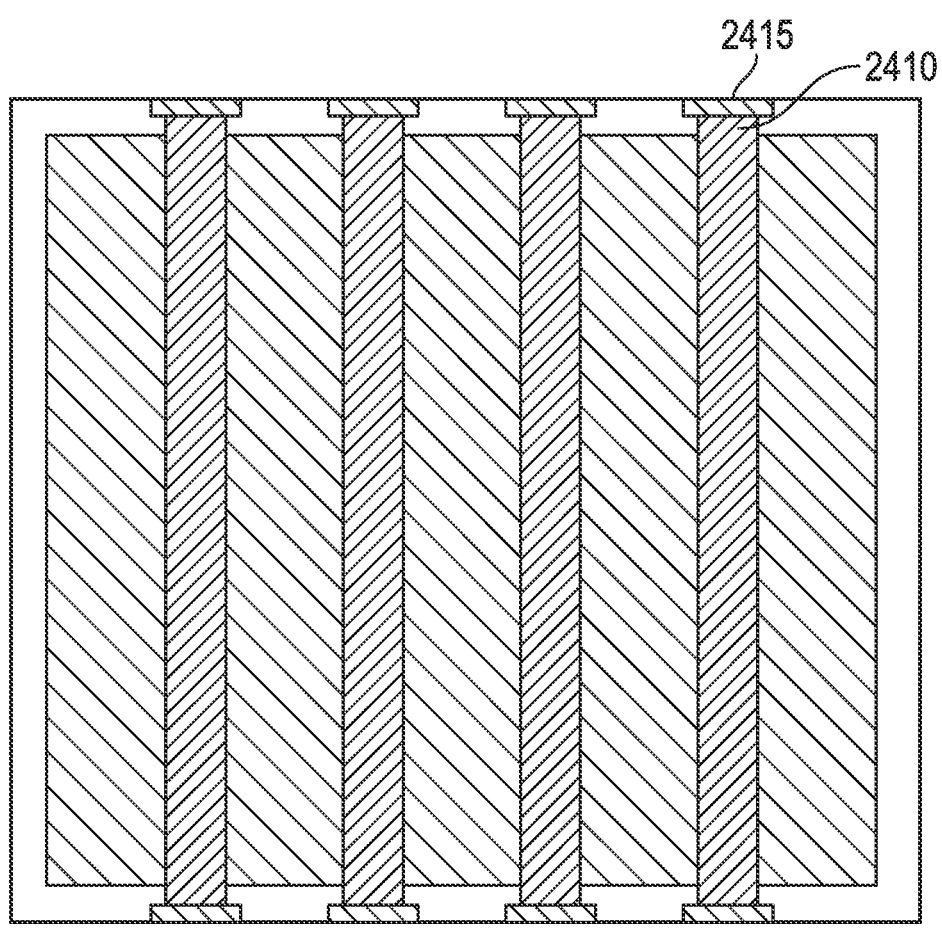

FIG. 24 depicts an embodiment in which separate edge elements are positioned along an enclosure wall at locations proximate to expected locations of the spacer elements.

Figure 25B:
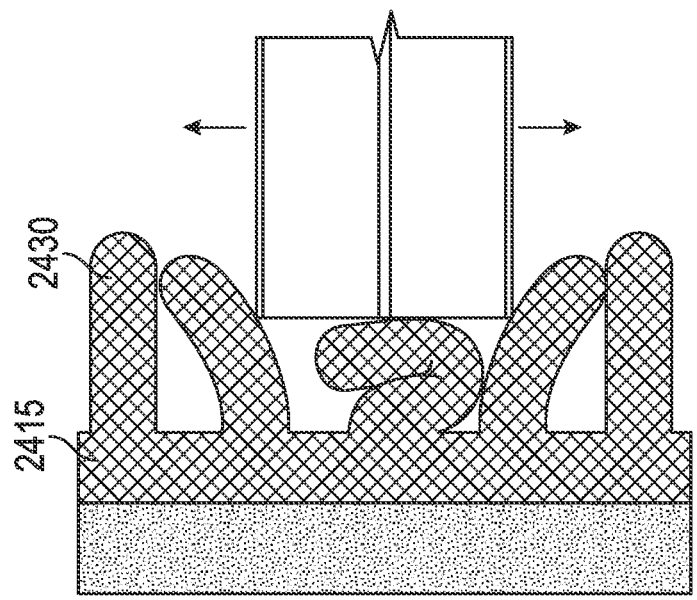
Figure 25A:
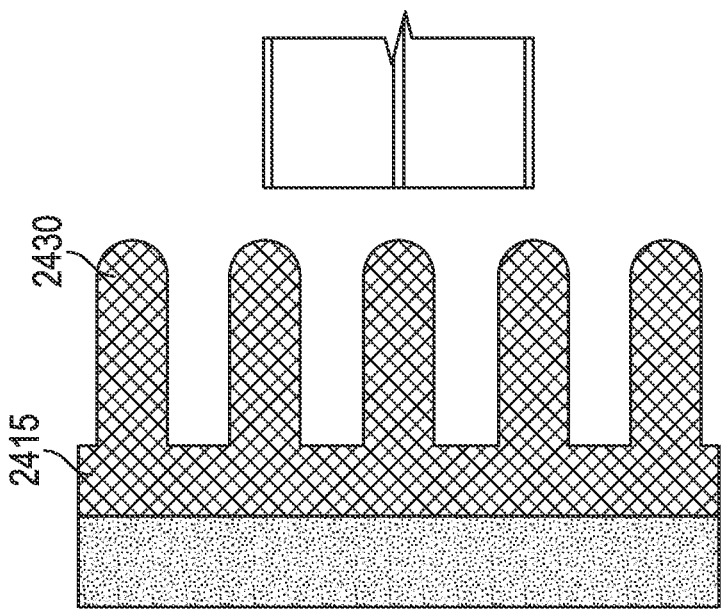

FIG. 25A depicts an embodiment of edge element used to form a seal between a spacer element and the interior of the enclosure prior to positioning of the spacer element.

FIG. 25B depicts the edge element of FIG. 25A after positioning of the spacer element.

FIG. 26A is a diagram of a battery module, prior to a heat trigger event, having shape memory edge elements and intumescent edge elements.

FIG. 26B is a diagram of the battery module of FIG. 26A after the heat trigger event.

FIG. 26C is a diagram of a battery module, prior to a heat trigger event, having shape memory elements.

FIG. 26D is a diagram of the battery module of FIG. 26C after the heat trigger event.

FIG. 27A is a diagram of a battery module, prior to a heat trigger event, having spacer/shape elements that are formed of a combination of shape memory and intumescent materials.

FIG. 27B is a diagram of the battery module of FIG. 27A after the heat trigger event.

FIG. 27C is a diagram of a battery module, prior to a heat trigger event, having a shape memory edge element and an intumescent spacer element.

FIG. 27D is a diagram of the battery module of FIG. 27C after the heat trigger event.

FIG. 28A is a diagram of a portion of a battery module, prior to a heat trigger event, including a shape memory plate sandwiched between a battery cell and a heat isolation layer.

FIG. 28B is a diagram of the portion of the battery module of FIG. 28A after the heat trigger event.

Figure 29B:
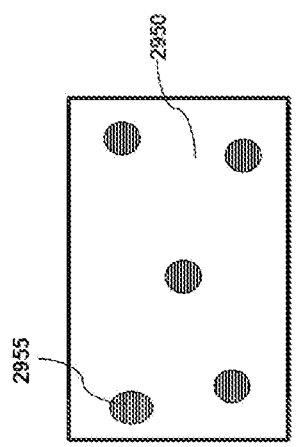
Figure 29C:
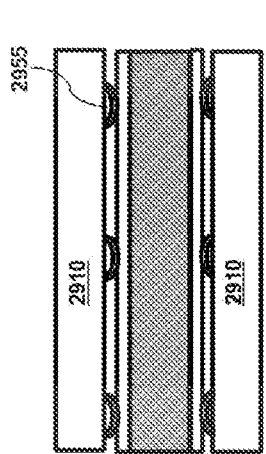
Figure 29A:
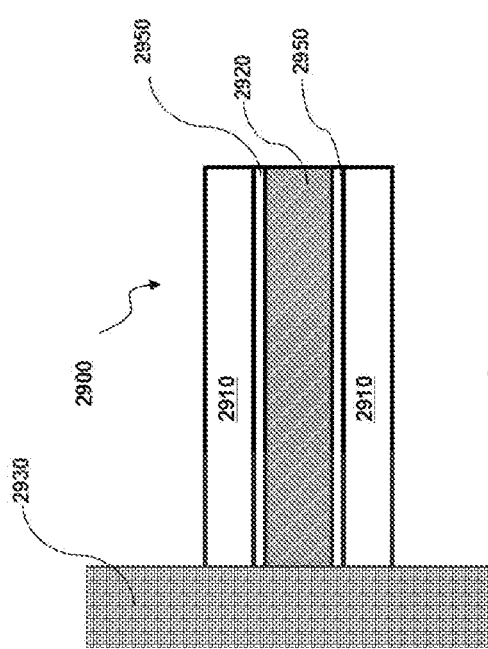

FIG. 29A is a diagram of a portion of a battery module, prior to a heat trigger event, including a heat conducting layer including shape memory material elements dispersed throughout the heat conducting layer.

FIG. 29B is a diagram of the portion of the battery module of FIG. 29A after the heat triggering event.

FIG. 29C is a diagram showing a top view of the heat conducting layer with shape memory material elements dispersed throughout.

DETAILED DESCRIPTION

In the following detailed description of the preferred embodiments, reference is made to the accompanying drawings, which form a part thereof, and within which are shown by way of illustration specific embodiments by which the disclosure may be practiced. It is to be understood that other embodiments may be utilized and structural changes may be made without departing from the scope of the disclosure.

The present disclosure is directed to multilayer materials and systems including said multilayer materials to manage thermal runaway issues in energy storage systems. Exemplary embodiments include a multilayer material comprising at least one insulation layer, at least one compressible pad, and optional one or more layers that have favorable heat-dissipating properties, have favorable fire, flame and/or abrasion-resistance properties, have favorable performance for use as thermal barriers. The present disclosure further relates to a battery module or pack with one or more battery cells and the multilayer thermal barrier material placed in thermal communication with the battery cell.

One or more insulation layers of the multilayer material disclosed herein can include aerogel compositions or reinforced aerogel compositions. Aerogel materials are known to possess about two to six times the thermal resistance of other common types of insulation, e.g., foams, fiberglass, etc. Aerogels can increase effective shielding and thermal insulation without substantially increasing the thickness of the insulation or adding additional weight. Aerogels are known to be a class of structures having low density, open cell structures, large surface areas, and nanometer scale pore sizes.

Multilayer materials and multilayer materials comprising aerogel compositions according to embodiments of the present disclosure provide favorable properties for compressibility, compressional resilience, and compliance. When used as a thermal barrier between cells within a battery module, the multilayer materials can provide resistance to compression deformation to accommodate the expansion of cells due to the degradation and swelling of active materials during charge/discharge cycles for the battery.

The present disclosure also provides a battery module or battery pack including at least one battery cell and a multilayer material according to embodiments disclosed herein disposed on the battery cell or on the battery module, e.g., on a surface of the at least one battery cell or on a surface of the battery module. For example, the battery module or battery pack has an inner surface and outer surface. In certain embodiments, the multilayer material is on the inner surface of the battery module or battery pack. In certain embodiments, the multilayer material is on an outer surface of the battery module or battery pack.

The multilayer materials of the present disclosure can have various unique configurations in which more than one layers having thermally and/or mechanically favorable properties are arranged in a certain way. FIG. 7 illustrates a multilayer material 400 according to embodiments disclosed herein. In one embodiment, a multilayer material 400 for use as a thermal barrier in an electrical energy storage system includes a core portion 700 comprising a layered assembly of at least one insulation layer 470, and/or 480 and at least one thermal capacitive layer 430, 440, and/or 450 which are alternately piled in a direction normal to their largest surface; and an exterior portion 600 disposed outside of the core portion 700, the exterior portion 600 comprising at least one sacrificial material layer comprising a compressible pad 410 and/or 460 having a compression modulus of about 1 MPa to about 12 MPa and at least one encapsulating material layer 420 selected from a polymer, an elastomer or combination thereof, wherein the thermal capacitive layer 430, 440, and/or 450 has specific thermal capacity of at least about 200 J/(kg-K), and wherein the insulation layer 470, and/or 480 has thermal conductivity through a thickness dimension of said insulation layer less than about 50 mW/m-K at 25° C. and less than about 60 mW/m-K at 600° C.

In some embodiments, insulation layers 470, and 480 are made of the same material. In some embodiments, insulation layers 470, and 480 are made of different materials having different thermal and/or mechanical properties. In some embodiments, thermal capacitive layers 430, 440, and 450 are made of the same material. In some embodiments, thermal capacitive layers 430, 440, and 450 are made of different materials having different thermal and/or mechanical properties. Compressible pads 410 and 460 can also be made of different or the same materials.

FIG. 8 illustrates a multilayer material 500 according to embodiments disclosed herein. In one embodiment, a multilayer material 400 for use as a thermal barrier in an electrical energy storage system includes a core portion 700 comprising a layered assembly of at least one insulation layer 470, and/or 480 and at least one thermally conductive layer 530, 540, and/or 550 which are alternately piled in a direction normal to their largest surface; and an exterior portion 600 disposed outside of the core portion 700, the exterior portion 600 comprising at least one sacrificial material layer comprising a compressible pad 410 and/or 460 having a compression modulus of about 1 MPa to about 12 MPa and at least one encapsulating material layer 420 selected from a polymer, an elastomer or combination thereof, wherein the thermally conductive layer 530, 540, and/or 550 has thermal conductivity along an in-plane dimension of said thermally conductive layer of at least about 200 mW/m-K, and wherein the insulation layer 470, and/or 480 has thermal conductivity through a thickness dimension of said insulation layer less than about 50 mW/m-K at 25° C. and less than about 60 mW/m-K at 600° C.

In some embodiments, thermally conductive layers 530, 540, and 550 are made of the same material. In some embodiments, thermally conductive layers 530, 540, and 550 are made of different materials having different thermal and/or mechanical properties.

In some embodiments, the encapsulating material layer 420 is sandwiched between the core portion 700 and the sacrificial material layer having at least one compressible pad 410 and/or 460 as shown in FIG. 7 and FIG. 8. In some embodiments, the sacrificial material layer having at least one compressible pad 410 and/or 460 is sandwiched between the core portion 700 and the encapsulating material layer 420.

The multilayer material according to embodiments disclosed herein can have an average thickness in a range of between about 2 mm to about 10 mm in uncompressed state. Average thickness of the multilayer material may decrease upon exposure to external mechanical load such as load applied to the materials between cells during initial assembly of a battery module e.g. 1 MPa or lower.

In exemplary configuration of the multilayer material shown in FIG. 9A, a multilayer material 800 for use as a thermal barrier in an electrical energy storage system comprises a core layer having two sides comprising at least one compressible pad 410 and/or 460 having a compression modulus of about 1 MPa to about 12 MPa (e.g., 1.5 MPa, 2 MPa, 4 MPa, 5 MPa, 6 MPa, 8 MPa, 9 MPa, 10 MPa, 11 MPa, 11.5 MPa); and two insulation layers 470 and 480 having thermal conductivity through a thickness dimension of said insulation layer less than about 50 mW/m-K at 25° C. and less than about 60 mW/m-K at 600° C., wherein the core layer is sandwiched by two insulation layers 470 and 480, wherein the multilayer material is optionally encapsulated in an encapsulating material 420 selected from at least one of a polymer, an elastomer or combination thereof.

In exemplary configuration of the multilayer material shown in FIG. 9B, a multilayer material 810 for use as a thermal barrier in an electrical energy storage system comprises a core layer having two sides comprising one compressible pad 410 or 460 having a compression modulus of about 1 MPa to about 12 MPa and two thermally conductive layers 530, 540, and/or 550; two insulation layers 470 and 480 having thermal conductivity through a thickness dimension of said insulation layer less than about 50 mW/m-K at 25° C. and less than about 60 mW/m-K at 600° C., wherein the core layer is sandwiched by two insulation layers 470 and 480, wherein the at least one thermally conductive layer has an in-plane thermal conductivity of at least about 200 mW/m-K and wherein the multilayer material is optionally encapsulated in an encapsulating material 420 selected from at least one of a polymer, an elastomer or combination thereof.

In exemplary embodiments as shown in FIG. 9C, a multilayer material 820 for use as a thermal barrier in an electrical energy storage system comprises a core layer having two sides comprising one compressible pad 410 or 460 having a compression modulus of about 1 MPa to about 12 MPa and two thermally capacitive layers 430, 440, and/or 450; two insulation layers 470 and 480 having thermal conductivity through a thickness dimension of said insulation layer less than about 50 mW/m-K at 25° C. and less than about 60 mW/m-K at 600° C., wherein the core layer is sandwiched by two insulation layers 470 and 480, wherein at least one thermally capacitive layer has a specific thermal capacity of at least about 200 J/(kg-K), and wherein the multilayer material is optionally encapsulated in an encapsulating material 420 selected from at least one of a polymer, an elastomer or combination thereof.

In exemplary embodiments as shown in FIG. 9D, a multilayer material 830 for use as a thermal barrier in an electrical energy storage system comprises a core layer having two sides comprising one compressible pad 410 or 460 having a compression modulus of about 1 MPa to about 12 MPa and two thermally capacitive layer 430, 440, and/or 450; two insulation layers 470 and 480 having thermal conductivity through a thickness dimension of said insulation layer less than about 50 mW/m-K at 25° C. and less than about 60 mW/m-K at 600° C., wherein the core layer is sandwiched by two insulation layers 470 and 480, wherein at least one thermally capacitive layer has a specific thermal capacity of at least about 200 J/(kg-K), wherein the multilayer material is optionally encapsulated in an encapsulating material 420 selected from at least one of a polymer, an elastomer or combination thereof, and wherein the multilayer material 830 further comprises two thermally capacitive layers 430, 440, and/or 450, wherein each thermally capacitive layer 430, 440, and/or 450 is disposed onto outer surface of each insulation layer 470 and 480.

In exemplary configuration of the multilayer material shown in FIG. 9E, a multilayer material 840 for use as a thermal barrier in an electrical energy storage system comprises a core layer having two sides comprising two compressible pad 410 and 460 having a compression modulus of about 1 MPa to about 12 MPa and one thermally capacitive layer 430, 440, or 450; two insulation layers 470 and 480 having thermal conductivity through a thickness dimension of said insulation layer less than about 50 mW/m-K at 25° C. and less than about 60 mW/m-K at 600° C., wherein the core layer is sandwiched by two insulation layers 470 and 480, wherein the thermally capacitive layer has a specific thermal capacity of at least about 200 J/(kg-K), wherein the multilayer material is optionally encapsulated in an encapsulating material 420 selected from at least one of a polymer, an elastomer or combination thereof, and the thermally capacitive layer is sandwiched by two compressible pads 410 and 460.

Insulation Layers

Insulation layers of the multilayer materials described herein are responsible for reliably controlling heat flow from heat-generating parts in small spaces and to provide safety and prevention of fire propagation for such products in the fields of electronic, industrial and automotive technologies. Insulation layers with superior properties in compression may be useful in addressing these needs. In many embodiments of the present disclosure, the insulation layer also functions as a flame/fire deflector layer either by itself or in combination with other layers of the multilayer material. For example, insulation layer e.g. an aerogel layer, in combination with a flame-resistant layer, such as a layer of metal or mica, can provide protection for underlying layers from flame and/or hot gases, as well as flame/hot gases with entrained particulate materials, such as the materials that may be ejected from a LIB during a thermal runaway event. For another example, the insulation layer may itself be resistant to flame and/or hot gases as well as flame/hot gases with entrained particulate materials. An insulation layer such as mica, microporous silica, aerogel in combination with a flame-resistant layer can function as a flame/fire deflector layer. Insulation layers including aerogels, such as those disclosed in embodiments herein, are durable and easy to handle, have favorable resistance to heat propagation and fire propagation while minimizing thickness and weight of materials used, and that also have favorable properties for compressibility, compressional resilience, and compliance.

Aerogels are a class of porous materials with open-cells comprising a framework of interconnected structures, with a corresponding network of pores integrated within the framework, and an interstitial phase within the network of pores primarily comprised of gases such as air. Aerogels are typically characterized by a low density, a high porosity, a large surface area, and small pore sizes. Aerogels can be distinguished from other porous materials by their physical and structural properties.

Accordingly, in some embodiments, the insulation layer of the multilayer material of the present disclosure comprises an aerogel. In some embodiments, the insulation layer can further include a material selected from the group consisting of mica, microporous silica, ceramic fiber, mineral wool, and combinations thereof. In some cases, the insulation layer lacks an aerogel. In some embodiments, the insulation layer can include a material selected from the group consisting of mica, microporous silica, ceramic fiber, mineral wool, and combinations thereof.

In certain embodiments, insulation layer of the present disclosure has a thermal conductivity through a thickness dimension of said insulation layer about 50 mW/mK or less, about 40 mW/mK or less, about 30 mW/mK or less, about 25 mW/mK or less, about 20 mW/mK or less, about 18 mW/mK or less, about 16 mW/mK or less, about 14 mW/mK or less, about 12 mW/mK or less, about 10 mW/mK or less, about 5 mW/mK or less, or in a range between any two of these values at 25° C. In certain embodiments, insulation layer of the present disclosure has a thermal conductivity through a thickness dimension of said insulation layer about 60 mW/mK or less, about 50 mW/mK or less, about 40 mW/mK or less, about 30 mW/mK or less, about 25 mW/mK or less, about 20 mW/mK or less, about 18 mW/mK or less, about 16 mW/mK or less, about 14 mW/mK or less, about 12 mW/mK or less, about 10 mW/mK or less, about 5 mW/mK or less, or in a range between any two of these values at 600° C.

The insulation layer of the present disclosure e.g. an insulation layer including an aerogel, can retain or increase insubstantial amounts in thermal conductivity (commonly measured in mW/m-k) under a load of up to about 5 MPa. In certain embodiments, insulation layer of the present disclosure has a thermal conductivity through a thickness dimension of said insulation layer about 50 mW/mK or less, about 40 mW/mK or less, about 30 mW/mK or less, about 25 mW/mK or less, about 20 mW/mK or less, about 18 mW/mK or less, about 16 mW/mK or less, about 14 mW/mK or less, about 12 mW/mK or less, about 10 mW/mK or less, about 5 mW/mK or less, or in a range between any two of these values at 25° C. under a load of up to about 5 MPa. The thickness of the aerogel insulation layer may be reduced as a result of the load experienced by the aerogel insulation layer. For example, the thickness of the aerogel insulation layer may be reduced by 50% or lower, 40% or lower, 30% or lower, 25% or lower, 20% or lower, 15% or lower, 10% or lower, 5% or lower, or in a range between any two of these values under a load in the range of about 0.50 MPa to 5 MPa. Although the thermal resistance of the insulation layer including an aerogel may be reduced as the thickness is reduced, the thermal conductivity can be retained or increase by insubstantial amounts.

In certain embodiments, the insulation layer of the present disclosure may have a heat of combustion of about 750 cal/g or less, about 717 cal/g or less, about 700 cal/g or less, about 650 cal/g or less, about 600 cal/g or less, about 575 cal/g or less, about 550 cal/g or less, about 500 cal/g or less, about 450 cal/g or less, about 400 cal/g or less, about 350 cal/g or less, about 300 cal/g or less, about 250 cal/g or less, about 200 cal/g or less, about 150 cal/g or less, about 100 cal/g or less, about 50 cal/g or less, about 25 cal/g or less, about 10 cal/g or less, or in a range between any two of these values. An insulation layer that has an improved heat of combustion relative to another insulation layer will have a lower heat of combustion value, relative to the reference insulation layer. In certain embodiments of the present disclosure, the HOC of an insulation layer is improved by incorporating a fire-class additive into the insulation layer.

In certain embodiments, insulation layers of the present disclosure have an onset of thermal decomposition of about 300° C. or more, about 320° C. or more, about 340° C. or more, about 360° C. or more, about 380° C. or more, about 400° C. or more, about 420° C. or more, about 440° C. or more, about 460° C. or more, about 480° C. or more, about 500° C. or more, about 515° C. or more, about 550° C. or more, about 600° C. or more, or in a range between any two of these values. Within the context herein, for example, a first composition having an onset of thermal decomposition that is higher than an onset of thermal decomposition of a second composition, would be considered an improvement of the first composition over the second composition. It is contemplated herein that onset of thermal decomposition of a composition or material is increased when adding one or more fire-class additives, as compared to a composition that does not include any fire-class additives.

The term "flexural modulus" or "bending modulus of elasticity" is a measure of a materials stiffness/resistance to bend when a force is applied perpendicular to the long edge of a sample—known as the three-point bend test. Flexural Modulus denotes the ability of a material to bend. The flexural modulus is represented by the slope of the initial straight line portion of the stress-strain curve and is calculated by dividing the change in stress by the corresponding change in strain. Hence, the ratio of stress to strain is a measure of the flexural modulus. The International Standard unit of Flexural Modulus is the pascal (Pa or N/m2 or m-1·kg·s-2). The practical units used are megapascals (MPa or N/mm2) or gigapascals (GPa or kN/mm2). In the US customary units, it is expressed as pounds (force) per square inch (psi). In certain embodiments, insulation layers of the present disclosure have a flexural modulus of about 8 MPa or less, about 7 MPa or less, about 6 MPa or less, about 5 MPa or less, about 4 MPa or less, about 3 MPa or less. Preferably, the insulation layer of the present disclosure e.g. aerogel has a flexural modulus of about 2 MPa to about 8 MPa.

As described above, compression and resilience properties of materials between cells or battery modules and packs are important in order to accommodate swelling the cells during their life cycles. In certain embodiments, the insulation layer, or the multilayer material including the insulation layer, (i) is compressible by at least 50% of its original or uncompressed thickness, preferably at least 65%, and most preferably at least 80%, and (ii) is sufficiently resilient that after compression for a few seconds it will return to at least 70% of its original or uncompressed thickness, preferably at least 75%, and most preferably at least 80%.

In certain embodiments, the compression modulus of the insulation layer (e.g., a layer including aerogel), a compressible component of the multilayer material including the insulation layer, or the multilayer material as a whole is about 1 MPa, about 2 MPa, about 3 MPa, about 4 MPa, about 5 MPa, about 6 MPa, about 7 MPa, about 8 MPa, about 9 MPa, about 10 MPa, about 11 MPa, about 12 MPa or in a range between any two of these values.

Aerogels

The aerogel the present invention may be organic, inorganic, or a mixture thereof. In some embodiments, the aerogel comprises a silica-based aerogel. The insulation layer of the multilayer material comprising aerogel further comprises a reinforcement material. The reinforcing material may be any material that provides resilience, conformability, or structural stability to the aerogel material. Examples of well-known reinforcing materials include, but are not limited to open-cell macroporous framework reinforcement materials, closed-cell macroporous framework reinforcement materials, open-cell membranes, honeycomb reinforcement materials, polymeric reinforcement materials, and fiber reinforcement materials such as discrete fibers, woven materials, non-woven materials, needled non-wovens, battings, webs, mats, and felts.

The reinforcement material can be selected from organic polymer-based fibers, inorganic fibers, carbon-based fibers or a combination thereof. The inorganic fibers are selected from glass fibers, rock fibers, metal fibers, boron fibers, ceramic fibers, basalt fibers, or combination thereof.

In some embodiments, the reinforcement material can include a reinforcement including a plurality of layers of material. For example, the plurality of layers of material can be bonded together. In exemplary embodiments, at least one of the plurality of layers can include a first material and at least one other layer of the plurality of layers can include a second material. The first material and the second material can have the same or different material properties. For example, the first material can be more compressible than the second material. For another example, the first material can include closed cells and the second material can include open cells.

Aerogels are described as a framework of interconnected structures that are most commonly comprised of interconnected oligomers, polymers, or colloidal particles. An aerogel framework may be made from a range of precursor materials, including inorganic precursor materials (such as precursors used in producing silica-based aerogels); organic precursor materials (such precursors used in producing carbon-based aerogels); hybrid inorganic/organic precursor materials; and combinations thereof. Within the context of the present disclosure, the term "amalgam aerogel" refers to an aerogel produced from a combination of two or more different gel precursors; the corresponding precursors are referred to as "amalgam precursors".

Inorganic Aerogels

Inorganic aerogels are generally formed from metal oxide or metal alkoxide materials. The metal oxide or metal alkoxide materials may be based on oxides or alkoxides of any metal that can form oxides. Such metals include, but are not limited to silicon, aluminum, titanium, zirconium, hafnium, yttrium, vanadium, cerium, and the like. Inorganic silica aerogels are traditionally made via the hydrolysis and condensation of silica-based alkoxides (such as tetraethoxylsilane), or via gelation of silicic acid or water glass. Other relevant inorganic precursor materials for silica based aerogel synthesis include, but are not limited to metal silicates such as sodium silicate or potassium silicate, alkoxysilanes, partially hydrolyzed alkoxysilanes, tetraethoxylsilane (TEOS), partially hydrolyzed TEOS, condensed polymers of TEOS, tetramethoxylsilane (TMOS), partially hydrolyzed TMOS, condensed polymers of TMOS, tetra-n-propoxysilane, partially hydrolyzed and/or condensed polymers of tetra-n-propoxysilane, polyethylsilicates, partially hydrolyzed polyethysilicates, monomeric alkylalkoxy silanes, bis-trialkoxy alkyl or aryl silanes, polyhedral silsesquioxanes, or combinations thereof.

In certain embodiments of the present disclosure, prehydrolyzed TEOS, such as Silbond H-5 (SBH5, Silbond Corp), which is hydrolyzed with a water/silica ratio of about 1.9-2, may be used as commercially available or may be further hydrolyzed prior to incorporation into the gelling process. Partially hydrolyzed TEOS or TMOS, such as polyethysilicate (Silbond 40) or polymethylsilicate may also be used as commercially available or may be further hydrolyzed prior to incorporation into the gelling process.

Inorganic aerogels can also include gel precursors comprising at least one hydrophobic group, such as alkyl metal alkoxides, cycloalkyl metal alkoxides, and aryl metal alkoxides, which can impart or improve certain properties in the gel such as stability and hydrophobicity. Inorganic silica aerogels can specifically include hydrophobic precursors such as alkylsilanes or arylsilanes. Hydrophobic gel precursors may be used as primary precursor materials to form the framework of a gel material. However, hydrophobic gel precursors are more commonly used as co-precursors in combination with simple metal alkoxides in the formation of amalgam aerogels. Hydrophobic inorganic precursor materials for silica based aerogel synthesis include, but are not limited to trimethyl methoxysilane (TMS), dimethyl dimethoxysilane (DMS), methyl trimethoxysilane (MTMS), trimethyl ethoxysilane, dimethyl diethoxysilane (DMDS), methyl triethoxysilane (MTES), ethyl triethoxysilane (ETES), diethyl diethoxysilane, dimethyl diethoxysilane (DMDES), ethyl triethoxysilane, propyl trimethoxysilane, propyl triethoxysilane, phenyl trimethoxysilane, phenyl triethoxysilane (PhTES), hexamethyldisilazane and hexaethyldisilazane, and the like. Any derivatives of any of the above precursors may be used and specifically certain polymeric of other chemical groups may be added or cross-linked to one or more of the above precursors.

Aerogels may also be treated to impart or improve hydrophobicity. Hydrophobic treatment can be applied to a sol-gel solution, a wet-gel prior to liquid extraction, or to an aerogel subsequent to liquid extraction. Hydrophobic treatment is especially common in the production of metal oxide aerogels, such as silica aerogels. An example of a hydrophobic treatment of a gel is discussed below in greater detail, specifically in the context of treating a silica wet-gel. However, the specific examples and illustrations provided herein are not intended to limit the scope of the present disclosure to any specific type of hydrophobic treatment procedure or aerogel substrate. The present disclosure can include any gel or aerogel known to those in the art, as well as associated methods of hydrophobic treatment of the aerogels, in either wet-gel form or dried aerogel form.

Hydrophobic treatment is carried out by reacting a hydroxy moiety on a gel, such as a silanol group (Si—OH) present on a framework of a silica gel, with a functional group of a hydrophobizing agent. The resulting reaction converts the silanol group and the hydrophobizing agent into a hydrophobic group on the framework of the silica gel. The hydrophobizing agent compound can react with hydroxyl groups on the gel according the following reaction: RNMX4-N (hydrophobizing agent)+MOH (silanol)→MOMRN (hydrophobic group)+HX. Hydrophobic treatment can take place both on the outer macro-surface of a silica gel, as well as on the inner-pore surfaces within the porous network of a gel.

A gel can be immersed in a mixture of a hydrophobizing agent and an optional hydrophobic-treatment solvent in which the hydrophobizing agent is soluble, and which is also miscible with the gel solvent in the wet-gel. A wide range of hydrophobic-treatment solvents can be used, including solvents such as methanol, ethanol, isopropanol, xylene, toluene, benzene, dimethylformamide, and hexane. Hydrophobizing agents in liquid or gaseous form may also be directly contacted with the gel to impart hydrophobicity.

The hydrophobic treatment process can include mixing or agitation to help the hydrophobizing agent to permeate the wet-gel. The hydrophobic treatment process can also include varying other conditions such as temperature and pH to further enhance and optimize the treatment reactions. After the reaction is completed, the wet-gel is washed to remove unreacted compounds and reaction by-products.

Hydrophobizing agents for hydrophobic treatment of an aerogel are generally compounds of the formula: RNMX4-N; where M is the metal; R is a hydrophobic group such as $CH_3$, $CH_2CH_3$, $C_6H_6$, or similar hydrophobic alkyl, cycloalkyl, or aryl moieties; and X is a halogen, usually Cl. Specific examples of hydrophobizing agents include, but are not limited to trimethylchlorosilane (TMCS), triethylchlorosilane (TECS), triphenylchlorosilane (TPCS), dimethylchlorosilane (DMCS), dimethyldichlorosilane (DMDCS), and the like. Hydrophobizing agents can also be of the formula: $Y(R_3M)_2$; where M is a metal; Y is bridging group such as NH or O; and R is a hydrophobic group such as $CH_3$, $CH_2CH_3$, $C_6H_6$, or similar hydrophobic alkyl, cycloalkyl, or aryl moieties. Specific examples of such hydrophobizing agents include, but are not limited to hexamethyldisilazane [HMDZ] and hexamethyldisiloxane [HMDSO]. Hydrophobizing agents can further include compounds of the formula: RNMV4-N, wherein V is a reactive or leaving group other than a halogen. Specific examples of such hydrophobizing agents include, but are not limited to vinyltriethoxysilane and vinyltrimethoxysilane.

Hydrophobic treatments of the present disclosure may also be performed during the removal, exchange or drying of liquid in the gel. In a specific embodiment, the hydrophobic treatment may be performed in supercritical fluid environment (such as, but not limited to supercritical carbon dioxide) and may be combined with the drying or extraction step.

Organic Aerogels

Organic aerogels are generally formed from carbon-based polymeric precursors. Such polymeric materials include, but are not limited to resorcinol formaldehydes (RF), polyimide, polyacrylate, polymethyl methacrylate, acrylate oligomers, polyoxyalkylene, polyurethane, polyphenol, polybutadiene, trialkoxysilyl-terminated polydimethylsiloxane, polystyrene, polyacrylonitrile, polyfurfural, melamine-formaldehyde, cresol formaldehyde, phenol-furfural, polyether, polyol, polyisocyanate, polyhydroxybenze, polyvinyl alcohol dialdehyde, polycyanurates, polyacrylamides, various epoxies, agar, agarose, chitosan, and combinations thereof. As one example, organic RF aerogels are typically made from the sol-gel polymerization of resorcinol or melamine with formaldehyde under alkaline conditions.

Organic/Inorganic Hybrid Aerogels

Organic/inorganic hybrid aerogels are mainly comprised of (organically modified silica ("ormosil") aerogels. These ormosil materials include organic components that are covalently bonded to a silica network. Ormosils are typically formed through the hydrolysis and condensation of organically modified silanes, $R—Si(OX)_3$, with traditional alkoxide precursors, $Y(OX)_4$. In these formulas, X may represent, for example, $CH_3$, $C_2H_5$, $C_3H_7$, $C_4H_9$; Y may represent, for example, Si, Ti, Zr, or Al; and R may be any organic fragment such as methyl, ethyl, propyl, butyl, isopropyl, methacrylate, acrylate, vinyl, epoxide, and the like. The organic components in ormosil aerogel may also be dispersed throughout or chemically bonded to the silica network.

In certain embodiments, aerogels of the present disclosure are inorganic silica aerogels formed primarily from prepolymerized silica precursors preferably as oligomers, or hydrolyzed silicate esters formed from silicon alkoxides in an alcohol solvent. In certain embodiments, such prepolymerized silica precursors or hydrolyzed silicate esters may be formed in situ from other precursors or silicate esters such as alkoxy silanes or water glass. However, the disclosure as a whole may be practiced with any other aerogel compositions known to those in the art, and is not limited to any one precursor material or amalgam mixture of precursor materials.

Macropores

As discussed above, aerogel compositions according to embodiments of the present disclosure can include an aerogel framework that includes macropores. Without being bound by any particular theory of operation, the presence of macropores within the aerogel framework can allow for compression of the aerogel composition, e.g., the reinforced aerogel composition, while maintaining, or even improving, the thermal properties, e.g., reducing the thermal conductivity. For example, the macropores may be deformed, crushed, or otherwise reduced in size by compression of the composition, thereby allowing for the thickness of the composition to be reduced under load. However, as the macropores are deformed, they effectively become smaller pores. As a result, the path for heat transfer within the aerogel framework can be more tortuous as the macropores are deformed, thereby improving thermal properties, e.g., reducing the thermal conductivity. Within the context of the present disclosure, "mesopores" are pores for which the average pore diameter is in the range of about 2 nm and about 50 nm. Aerogel frameworks are typically mesoporous (i.e., primarily containing pores with an average diameter ranging from about 2 nm to about 50 nm). In certain embodiments, the aerogel framework of aerogel compositions of the present disclosure can include macropores. Within the context of the present disclosure, "macropores" are pores for which the average pore diameter is greater than about 50 nm. An aerogel framework can include both macropores and mesopores. For example, at least 10% of a pore volume of the aerogel framework can be made up of macropores, at least 5% of the pore volume of the aerogel framework can be made up of macropores, at least 75% of the pore volume of the aerogel framework can be made up of macropores, at least 95% of the pore volume of the aerogel framework can be made up of macropores, or 100% of the pore volume of the aerogel framework can be made up of macropores. In some particular embodiments, the aerogel framework can be a macroporous aerogel framework such that a majority of its pore volume is made up of macropores. In some instances, the macroporous aerogel framework can also include micropores and/or mesopores. In some embodiments, the average pore size (diameter) of pores in the aerogel framework can be greater than 50 nm, greater than 50 nm to 5000 nm, 250 nm to 2000 nm, 500 nm to 2000 nm, 500 nm to 1400 nm, or 1200 nm. In certain embodiments, the average pore size can be greater than 50 nm in diameter, greater than 50 nm to 1000 nm, preferably 100 nm to 800 nm, more preferably 250 nm to 750 nm.

Homogeneous and Heterogenous Pore Size Distribution

In some embodiments, the variation in pore size within the aerogel framework can be distributed homogenously through the aerogel framework. For example, the average pore size can be substantially the same throughout the aerogel framework.

In other embodiments, the variation in pores size within the aerogel framework can be distributed heterogeneously through the aerogel framework. For example, the average pore size can be different in certain regions of the aerogel framework. In some exemplary embodiments, the average pore size can be greater in the region of the upper surface, the lower surface or both the upper and lower surfaces of the aerogel framework. For example, macropores can be distributed within the composition such that the ratio of macropores to mesopores is greater at the upper surface than at the lower surface, greater at the lower surface than at the upper surface, or greater at both the upper and lower surfaces than in a middle region between the upper and lower surfaces. For another example, macropores can be distributed within the composition such that the ratio of macropores to mesopores is greater near the upper surface than near the lower surface, greater near the lower surface than near the upper surface, or greater near both the upper and lower surfaces than in the middle region between the upper and lower surfaces. In other embodiments, the average pore size can be greater in a middle region between the upper and lower surface of the aerogel framework.

Macropore Formation

Macropores can be formed during production of the aerogel composition. For example, the formation of macropores can be induced in the gel precursor materials during transition into the gel composition. In some embodiments, the formation of macropores can be through inducing spinodal decomposition, e.g., of the gel precursor solution. For another example, the formation of macropores can be induced by the addition of one or more foaming agents.

The macropores present in the resulting aerogel framework can be formed by selecting processing conditions that favor the formation of macropores vs mesopores and/or micropores. The amount of macropores can be adjusted by implementing any one of, any combination of, or all of the following variables: (1) the polymerization solvent; (2) the polymerization temperature; (3) the polymer molecular weight; (4) the molecular weight distribution; (5) the copolymer composition; (6) the amount of branching; (7) the amount of crosslinking; (8) the method of branching; (9) the method of crosslinking; (10) the method used in formation of the gel; (11) the type of catalyst used to form the gel; (12) the chemical composition of the catalyst used to form the gel; (13) the amount of the catalyst used to form the gel; (14) the temperature of gel formation; (15) the type of gas flowing over the material during gel formation; (16) the rate of gas flowing over the material during gel formation; (17) the pressure of the atmosphere during gel formation; (18) the removal of dissolved gasses during gel formation; (19) the presence of solid additives in the resin during gel formation; (20) the amount of time of the gel formation process; (21) the substrate used for gel formation; (22) the type of solvent or solvents used in each step of the solvent exchange process; (23) the composition of solvent or solvents used in each step of the solvent exchange process; (24) the amount of time used in each step of the solvent exchange process; (25) the dwell time of the part in each step of the solvent exchange process; (26) the rate of flow of the solvent exchange solvent; (27) the type of flow of the solvent exchange solvent; (28) the agitation rate of the solvent exchange solvent; (29) the temperature used in each step of the solvent exchange process; (30) the ratio of the volume of solvent exchange solvent to the volume of the part; (31) the method of drying; (32) the temperature of each step in the drying process; (33) the pressure in each step of the drying process; (34) the composition of the gas used in each step of the drying process; (35) the rate of gas flow during each step of the drying process; (36) the temperature of the gas during each step of the drying process; (37) the temperature of the part during each step of the drying process; (38) the presence of an enclosure around the part during each step of the drying process; (39) the type of enclosure surrounding the part during drying; and/or (40) the solvents used in each step of the drying process. The multifunctional amine and diamine compounds may be added separately or together in one or more portions as solids, neat, or dissolved in an appropriate solvent. In other aspects, a method of making an aerogel can include the steps of: (a) providing a multifunctional amine compound and at least one diamine compound to a solvent to form a solution; (b) providing at least one dianhydride compound to the solution of step (a) under conditions sufficient to form a branched polymer matrix solution, where the branched polymer matrix is solubilized in the solution; and (c) subjecting the branched polymer matrix solution to conditions sufficient to form an aerogel having an open-cell structure. The macropores present in the resulting aerogel framework can be formed in the manner noted above. In one preferred and non-limiting aspect, the formation of macropores vs smaller mesopores and micropores can be primarily controlled by controlling the polymer/solvent dynamics during gel formation.

As discussed above, aerogel compositions according to embodiments of the present disclosure can include an aerogel framework and a reinforcement material where at least a portion of the reinforcement material does not contain aerogel. For example, the aerogel framework can extend partially through the thickness of the reinforcement material. In such embodiments, a portion of the reinforcement material, e.g., an OCMF, fiber, or combinations thereof, can include aerogel material and a portion can be free of aerogel. For example, in some embodiments, the aerogel extends through about 90% of the thickness of the reinforcement material, through a range of about 50% and about 90% of the thickness of the reinforcement material, through a range of about 10% to about 50% of the thickness of the reinforcement material, or through about 10% of the thickness of the reinforcement material.

Without being bound by any particular theory of operation, aerogel compositions in which at least a portion of the reinforcement material does not contain aerogel can provide favorable properties for compressibility, compressional resilience, and compliance. For example, the properties of the reinforcement material can be selected to provide sufficient reinforcement and support for thermal properties in the region containing aerogel and also to provide sufficient compressibility, compressional resilience, and/or compliance in the region without aerogel. The aerogel-containing portion of the reinforced aerogel composition can provide the desired thermal conductivity, e.g., less than about 25 mW/m*K while the portion of the reinforcement without aerogel can provide or improve the desired physical characteristics, e.g., compressibility.

In some embodiments, reinforced aerogel compositions in which at least a portion of the reinforcement material does not contain aerogel can be formed using methods disclosed herein in which the reinforcement material is combined with an amount of precursor solution sufficient to partially fill the reinforcement material with precursor solution. For example, the volume of precursor can be less than the volume of the reinforcement material such that the precursor extends only partially through the reinforcement. When dried, the resulting reinforced aerogel composition will include an aerogel framework extending through less than the full thickness of the reinforcement material, as discussed above. In other embodiments, reinforced aerogel compositions in which at least a portion of the reinforcement material does not contain aerogel can be formed by removing surface aerogel layers from the reinforced aerogel composition.

In some embodiments, reinforced aerogel compositions in which at least a portion of the reinforcement material does not contain aerogel can be formed using a reinforcement material having mixed properties through the thickness of the reinforcement. For example, the reinforcement can include a plurality of layers, each layer having varying properties, e.g., differences in average pore/cell size, material composition, closed cells, open cells, surface treatments, or combinations thereof. The plurality of layers can be bonded to each other, e.g., using an adhesive, by flame bonding or by other suitable methods or mechanisms such as those discussed herein. The different properties of the reinforcement material can provide a varied distribution of aerogel through the layers. For example, the open cell portion of the reinforcement material can include an aerogel framework while the closed cell portion remains substantially free of aerogel. Similarly, other material properties of the reinforcement material or layers thereof can determine the distribution of aerogel within the reinforcement and thus within the reinforced aerogel composition.

In some exemplary embodiments, reinforced aerogel compositions in which at least a portion of the reinforcement material does not contain aerogel can be formed using methods disclosed herein in which the properties of the reinforcement material or layers or reinforcement material control or affect the amount of precursor solution that fills that material or layer, e.g., during the casting process, so as to provide partial filling of the reinforcement material with precursor solution. For example, one layer of the reinforcement can have open cells and another layer of the reinforcement can have closed cells. When a precursor solution is combined with such a reinforcement, the gel precursor solution can infiltrate the open cells of that layer while not substantially infiltrating the closed cells of the other layer. When such a composition is dried, the resulting reinforced aerogel composition can include a portion, e.g., the closed cell layer, that does not contain aerogel while another portion, e.g., the open cell layer, contains aerogel.

In some embodiments, the additives disclosed herein (e.g., endothermic additives, opacifying additives, fire-class additives, or other additives) can be heterogeneously dispersed within the reinforced aerogel composition. For example, the additive material can vary through the thickness or along the length and/or width of the aerogel composition. For example, the additive can be accumulated on one side of the aerogel composition. In some embodiments, the additive material(s) can be concentrated in one layer of the aerogel composite or be provided as a separate layer consisting essentially of the additive adjacent to or attached to the composite. For example, the heat control member can include a layer consisting essentially of an endothermic material, such as gypsum, sodium bicarbonate, magnesia-based cement. In further exemplary embodiments, the aerogel composition can also include at least one layer of additional material, either within the composition or as a facing layer. For example, the layer can be a layer selected from the group consisting of a polymeric sheet, a metallic sheet, a fibrous sheet, a highly oriented graphite material, e.g., a pyrolytic graphite sheet, and a fabric sheet. In some embodiments, the facing layer can be attached to the composition, e.g., by an adhesive mechanism selected from the consisting of: an aerosol adhesive, a urethane-based adhesive, an acrylate adhesive, a hot melt adhesive, an epoxy, a rubber resin adhesive; a polyurethane composite adhesive, and combinations thereof. In some embodiments, the facing layer can be attached to the composition by a non-adhesive mechanism, e.g., a mechanism selected from the group consisting of: flame bonding, needling, stitching, sealing bags, rivets, buttons, clamps, wraps, braces, and combinations thereof. In some embodiments, a combination of any of the aforementioned adhesive and non-adhesive mechanisms can be used to attach a facing layer to the composition.

Powdered Aerogel Compositions

As discussed herein, aerogel compositions or composites can include materials which incorporate aerogel particulates, particles, granules, beads, or powders into a solid or semi-solid material, such as in conjunction with binders such as adhesives, resins, cements, foams, polymers, or similar solid or solidifying materials. For example, aerogel compositions can include a reinforcing material, aerogel particles, and, optionally, a binder. In exemplary embodiments, a slurry containing aerogel particles and at least one type of wetting agent can be provided. For example, the aerogel particles can be coated or wetted with at least one wetting agent, such as a surfactant or dispersant. The aerogel particles can be fully wetted, partially wetted (e.g., surface wetting), or be present in a slurry. The preferred wetting agent is capable of volatilizing to allow suitable recovery of the hydrophobicity of hydrophobic aerogel particles. If the wetting agent remains on the surface of the aerogel particles, the remaining wetting agent can contribute to the overall thermal conductivity of the composite material. Thus, the preferred wetting agent is one that is removable, such as by volatilization with or without decomposition or other means. Generally, any wetting agent that is compatible with the aerogel can be used.

Wetting Agents

The slurry or aerogel coated with a wetting agent can be useful as a way to easily introduce hydrophobic aerogel into a variety of materials, such as other aqueous-containing fluids, slurries, adhesives, binder materials, which can optionally harden to form solid materials, fibers, metalized fibers, discrete fibers, woven materials, non-woven materials, needled non-wovens, battings, webs, mats, felts, and combinations thereof. The aerogel wetted with at least one wetting agent or the slurry containing the aerogel with at least one wetting agent permits the easy introduction and uniform distribution of hydrophobic aerogel. Wet laid processes, such as the ones described in U.S. Pat. Nos. 9,399,864; 8,021,583; 7,635,411; and 5,399,422 (each of which are incorporated by reference herein in their entirety), use an aqueous slurry to disperse aerogel particles, fibers and other additives. The slurry can then be dewatered to form a layer of aerogel particles, fibers and additives that can be dried and optionally calendared to produce an aerogel composite.

Aerogel Particles and Additives

In other embodiments, aerogel compositions can include aerogel particles, at least one inorganic matrix material and, optionally, fibers, auxiliary materials, additives, and further inorganic binders. The inorganic matrix material can, in some embodiments, include phyllosilicates, e.g., naturally occurring phyllosilicates, such as kaolins, clays or bentonites, synthetic phyllosilicates, such as magadiite or kenyaite, or mixtures of these. The phyllosilicates may be fired or unfired, e.g., to dry the materials and drive off the water of crystallization. The inorganic matrix material can also, in some embodiments, include inorganic binders, such as cement, lime, gypsum or suitable mixtures thereof, in combination with phyllosilicates. The inorganic matrix material can also, in some embodiments, include other inorganic additives, such as fire-class additives, opacifiers, or combinations thereof, disclosed herein. Exemplary processes and aerogel compositions including inorganic matrix materials are disclosed in U.S. Pat. Nos. 6,143,400; 6,083,619 (each of which are incorporated by reference herein in their entirety). In some embodiments, aerogel compositions can include aerogel particles coated on or absorbed within woven materials, non-woven materials, needled non-wovens, battings, webs, mats, felts, and combinations thereof. Adhesive binders can be included in the composition. Additives such as fire-class additives, opacifiers, or combinations thereof, as disclosed herein, can also be included. Exemplary processes and aerogel compositions coated on or absorbed into fabrics are disclosed in U.S. Pat. Pub. No. 2019/0264381A1 (which is incorporated by reference herein in its entirety)

As discussed herein, aerogel composites can be laminated or faced with other materials, such as reinforcing layers of facing materials. In one embodiment, the present disclosure provides a multi-layer laminate comprising at least one base layer including a reinforced aerogel composition, and at least one facing layer. In one embodiment, the facing layer comprises a reinforcing material. In one embodiment, the reinforced aerogel composition is reinforced with a fiber reinforcement layer or an open-cell foam reinforcement layer. In one embodiment, the present disclosure provides a multi-layer laminate comprising a base layer comprising a reinforced aerogel composition, and at least two facing layers comprising reinforcing materials, wherein the two facing layers are on opposite surfaces of the base layer. For example, the multi-layer aerogel laminate composite can be produced according to the methods and materials described in US Patent Application 2007/0173157.

The facing layer can comprise materials which will help provide specific characteristics to the final composite structure, such as improved flexibility or reduced dusting. The facing materials can be stiff or flexible. The facing materials can include conductive layers or reflective foils. For example, the facing materials can include metallic or metallized materials. The facing materials can include non-woven materials. The facing layers can be disposed on a surface of the composite structure or the reinforced aerogel composites that form the composite structure, e.g., the heat control member. The facing layers can form a continuous coating or bag around the composite structure or the reinforced aerogel composites that form the composite structure, e.g., the heat control member. In some embodiments, the facing layer or layers can encapsulate the composite structure or the reinforced aerogel composites that form the composite structure.

In one embodiment, the facing layer comprises a polymeric sheet surrounding the composite structure; more specifically a polymeric material which comprises polyesters, polyethylenes, polyurethanes, polypropylenes, polyacrylonitriles, polyamids, aramids; and more specifically polymers such as polyethyleneterephthalate, low density polyethylene, ethylene-propylene co-polymers, poly(4-methylpentane), polytetrafluoroethylene, poly(1-butene), polystyrene, polyvinylacetatae, polyvinylchloride, polyvinylidenechloride, polyvinylfluoride, polyvinylacrylonitrile, plymethylmethacrylate, polyoxymethylene, polyphenylenesulfone, cellulosetriacetate, polycarbonate, polyethylene naphthalate, polycaprolactam, polyhexamethyleneadipamide, polyundecanoamide, polyimide, or combinations thereof. In one embodiment, the polymeric sheet comprises or consists essentially of an expanded polymeric material; more specifically an expanded polymeric material comprising PTFE (ePTFE), expanded polypropylene (ePP), expanded polyethylene (ePE), expanded polystyrene (ePS), or combinations thereof. In one preferred embodiment, the facing material consists essentially of an expanded polymeric material. In one embodiment, the polymeric sheet comprises or consists essentially of a microporous polymeric material characterized by a pore size ranging from 0.1 µm to 210 µm, 0.1 µm to 115 µm, 0.1 µm to 15 µm, or 0.1 µm to 0.6 µm.

In one embodiment, the facing layer material comprises or consists essentially of a fluoropolymeric material. Within the context of the present disclosure, the terms "fluoropolymeric" or "fluoropolymer material" refer to materials comprised primarily of polymeric fluorocarbons. Suitable fluoropolymeric facing layer materials include, but are not limited to: polytetrafluoroethylene (PTFE), including microporous PTFE described in U.S. Pat. No. 5,814,405, and expanded PTFE (ePTFE) such as Gore-Tex® (available from W. L. Gore); polyvinylfluoride (PVF); polyvinylidene fluoride (PVDF); perfluoroalkoxy (PFA); fluorinated ethylene-propylene (FEP); Polychlorotrifluoroethylene (PCTFE); Ethylene tetrafluoroethylene (ETFE); polyvinylidene fluoride (PVDF); ethylene chlorotrifluoroethylene (ECTFE); and combinations thereof. In one preferred embodiment, the facing material consists essentially of a fluoropolymeric material. In one preferred embodiment, the facing material consists essentially of an expanded PTFE (ePTFE) material.

In one embodiment, the facing layer material comprises or consists essentially of a non-fluoropolymeric material. Within the context of the present disclosure, the terms "non-fluoropolymeric" or "non-fluoropolymer material" refer to materials which do not comprise a fluorpolymeric material. Suitable non-fluoropolymeric facing layer materials include, but are not limited to: aluminized Mylar; low density polyethylene, such as Tyvek® (available from DuPont); rubber or rubber composites; non-woven materials, elastic fibers such as spandex, nylon, lycra or elastane; and combinations thereof. In one embodiment, the facing material is a flexible facing material.

In some embodiments, the facing layer material can include automotive resins and polymers such as those having a maximum use temperature up to about 100 C, up to about 120 C or up to about 150 C. For example, the facing layer material can include acrylonitrile butadiene styrene (ABS) polycarbonate ABS, polypropylene, polyurethane, polystyrene, polyethylene, polycarbonate, polyimides, polyamides, PVC, or combinations thereof. For example, aerogel composites and heat control members according to embodiments disclosed herein can include layers of automotive resins or automotive polymers, metallic or metallized layers, and aerogel layers.

The facing layer can be attached to the base layer by using adhesives which are suitable for securing inorganic or organic facing materials to the reinforcing material of the base layer. Examples of adhesives which can be used in the present disclosure include, but are not limited to: cement-based adhesives, sodium silicates, latexes, pressure sensitive adhesives, silicone, polystyrene, aerosol adhesives, urethane, acrylate adhesives, hot melt boding systems, boding systems commercially available from 3M, epoxy, rubber resin adhesives, polyurethane adhesive mixtures such as those described in U.S. Pat. No. 4,532,316.

The facing layer can also be attached to the base layer by using non-adhesive materials or techniques which are suitable for securing inorganic or organic facing materials to the reinforcing material of the base layer. Examples of non-adhesive materials or techniques which can be used in the present disclosure include, but are not limited to: heat sealing, ultrasonic stitching, RF sealing, stitches or threading, needling, sealing bags, rivets or buttons, clamps, wraps, or other non-adhesive lamination materials.

The facing layer can be attached to the base layer at any stage of production of the aerogel composite material. In one embodiment, the facing layer is attached to the base layer after infusion of the sol gel solution into the base reinforcement material but prior to gelation. In another embodiment, the facing layer is attached to the base layer after infusion of the sol gel solution into the base reinforcement material and after subsequent gelation, but prior to aging or drying the gel material. In yet another embodiment, the facing layer is attached to the base layer after aging and drying the gel material. In a preferred embodiment, the facing layer is attached to the reinforcement material of the base layer prior to infusion of the sol gel solution into the base reinforcement material. The facing layer can be solid and fluid impermeable. The facing layer can be porous and fluid permeable. In a preferred embodiment, the facing layer is porous and fluid permeable, and contains pores or holes with diameters large enough to allow fluids to diffuse through the facing material. In another preferred embodiment, the facing layer is attached to the reinforcement material of the base layer prior to infusion of the sol gel solution into the base reinforcement material, wherein the facing layer is porous and fluid permeable, and contains pores or holes with diameters large enough to allow fluids to diffuse through the facing material. In yet another preferred embodiment, the facing layer is attached to an open-cell foam reinforcement material prior to infusion of the sol gel solution into the foam reinforcement material, wherein the facing layer is porous and fluid permeable, and contains pores or holes with diameters large enough to allow fluids to diffuse through the facing material.

Opacifiers

Aerogel compositions can include an opacifier to reduce the radiative component of heat transfer. At any point prior to gel formation, opacifying compounds or precursors thereof may be dispersed into the mixture comprising gel precursors. Examples of opacifying compounds include, but are not limited to Boron Carbide (B4C), Diatomite, Manganese ferrite, MnO, NiO, SnO, $Ag_2O$, $Bi_2O_3$, carbon black, graphite, titanium oxide, iron titanium oxide, aluminum oxide, zirconium silicate, zirconium oxide, iron (II) oxide, iron (III) oxide, manganese dioxide, iron titanium oxide (ilmenite), chromium oxide, carbides (such as SiC, TiC or WC), or mixtures thereof. Examples of opacifying compound precursors include, but are not limited to $TiOSO_4$ or $TiOCl_2$. In some embodiments, the opacifying compounds used as additives can exclude whiskers or fibers of silicon carbide. When aerogel compositions are intended for use in electrical devices, e.g., in batteries as a barrier layer or other related applications, the composition including an opacifier can desirably possess a high dielectric strength with high volume and surface resistivities. In such embodiments, carbon additives used as an opacifier can be non-conductive or modified to reduce electrical conductivity. For example, the opacifier can be surface oxidized to reduce electrical conductivity. In some embodiments, carbonaceous additives with inherent electrical conductivity can be used as an opacifier in aerogel compositions intended for used in electrical devices. In such embodiments, the conductive carbonaceous additives can be used at concentrations below the percolation threshold so as to provide a composition with a suitable dielectric strength for use in an electrical device.

Fire-Class Additives

Aerogel compositions can include one or more fire-class additives. Within the context of the present disclosure, the term "fire-class additive" refers to a material that has an endothermic effect in the context of reaction to fire and can be incorporated into an aerogel composition. Furthermore, in certain embodiments, fire-class additives have an onset of endothermic decomposition (ED) that is no more than 100° C. greater than the onset of thermal decomposition (Td) of the aerogel composition in which the fire-class additive is present, and in certain embodiments, also an ED that is no more than 50° C. lower than the Td of the aerogel composition in which the fire-class additive is present. In other words, the ED of fire-class additives has a range of ($T_d$−50° C.) to ($T_d$+100° C.):

$$E_D \begin{cases} \text{max: } T_d + 100° \text{ C.} \\ \text{min: } T_d - 50° \text{ C.} \end{cases}$$

Prior to, concurrent with, or even subsequent to incorporation or mixing with the sol (e.g., silica sol prepared from alkyl silicates or water glass in various ways as understood in prior art), fire-class additives can be mixed with or otherwise dispersed into a medium including ethanol and optionally up to 10% vol. water. The mixture may be mixed and/or agitated as necessary to achieve a substantially uniform dispersion of additives in the medium. Without being bound by theory, utilizing a hydrated form of the above-referenced clays and other fire-class additives provides an additional endothermic effect. For example, halloysite clay (commercially available under the tradename DRAGONITE from Applied Minerals, Inc. or from Imerys simply as Halloysite), kaolinite clay are aluminum silicate clays that in hydrated form has an endothermic effect by releasing water of hydration at elevated temperatures (gas dilution). As another example, carbonates in hydrated form can release carbon dioxide on heating or at elevated temperatures.

Within the context of the present disclosure, the terms "heat of dehydration" means the amount of heat required to vaporize the water (and dihydroxylation, if applicable) from the material that is in hydrated form when not exposed to elevated temperatures. Heat of dehydration is typically expressed on a unit weight basis.

In certain embodiments, fire-class additives of the present disclosure have an onset of thermal decomposition of about 100° C. or more, about 130° C. or more, about 200° C. or more, about 230° C. or more, about 240° C. or more, about 330° C. or more, 350° C. or more, about 400° C. or more, about 415° C. or more, about 425° C. or more, about 450° C. or more, about 500° C. or more, about 550° C. or more, about 600° C. or more, about 650° C. or more, about 700° C. or more, about 750° C. or more, about 800° C. or more, or in a range between any two of these values. In certain embodiments, fire-class additives of the present disclosure have an onset of thermal decomposition of about 440° C. or 570° C. In certain embodiments, fire-class additives of the present disclosure have an onset of thermal decomposition which is no more than 50° C. more or less than the Td of the aerogel composition (without the fire-class additive) into which the fire-class additive is incorporated, no more than 40° C. more or less, no more than 30° C. more or less, no more than 20° C. more or less, no more than 10° C. more or less, no more than 5° C. more or less, or in a range between any two of these values The fire-class additives of this disclosure include, clay materials such as, but not limited to, phyllosilicate clays (such as illite), kaolin or kaolinite (aluminum silicate; Al2Si2O5(OH)4), metakaolin, halloysite (aluminum silicate; Al2Si2O5(OH)4), endellite (aluminum silicate; Al2Si2O5(OH)4), mica (silica minerals), diaspore (aluminum oxide hydroxide; α-AlO(OH)), gibbsite (aluminum hydroxide), boehmite (aluminum oxide hydroxide; γ-AlO(OH)), montmorillonite, beidellite, pyrophyllite (aluminum silicate; Al2Si4O10(OH)2), nontronite, bravaisite, smectite, leverrierite, rectorite, celadonite, attapulgite, chloropal, volkonskoite, allophane, racewinite, dillnite, severite, miloschite, collyrite, cimolite and newtonite, sodium bicarbonate (NaHCO3), magnesium hydroxide (or magnesium dihydroxide, "MDH"), alumina trihydrate ("ATH"), gypsum (calcium sulfate dihydrate; CaSO4·2H2O), barringtonite (MgCO3·2 H2O), nesquehonite (MgCO3·3 H2O), lansfordite (MgCO3·5 H2O), hydromagnesite (hydrated magnesium carbonate; Mg5(CO3)4(OH)2·4H2O), other carbonates such as, but not limited to, dolomite and lithium carbonate. Among the clay materials, certain embodiments of the present disclosure use clay materials that have at least a partial layered structure. In certain embodiments of the present disclosure, clay materials as fire-class additives in the aerogel compositions have at least some water such as in hydrated form. The additives may be in hydrated crystalline form or may become hydrated in the manufacturing/processing of the compositions of the present disclosure. In certain embodiments, fire-class additives also include low melting additives that absorb heat without a change in chemical composition. An example of this class is a low melting glass, such as inert glass beads. Other additives that may be useful in the compositions of the present disclosure include, but are not limited to, wollastonite (calcium silicate) and titanium dioxide (TiO2). In certain embodiments, other additives may include infrared opacifiers such as, but not limited to, titanium dioxide or silicon carbide, ceramifiers such as, but not limited to, low melting glass frit, calcium silicate or charformers such as, but not limited to, phosphates and sulfates. In certain embodiments, additives may require special processing considerations such as techniques to ensure the additives are uniformly distributed and not agglomerated heavily to cause product performance variations. The processing techniques may involve additional static and dynamic mixers, stabilizers, adjustment of process conditions and others known in the art.

Amount of Additives

The amount of additives in the aerogel compositions disclosed herein may depend on the desired properties of the composition. The amount of additives used during preparation and processing of the sol gel compositions is typically referred to as a weight percentage relative to silica content of the sol. The amount of additives in the sol may vary from about 5 wt % to about 70 wt % by weight relative to silica content. In certain embodiments, the amount of additives in the sol is between 10 wt % and 60 wt % relative to silica content and in certain preferred embodiments, it is between 20 wt % and 40 wt % relative to silica content. In exemplary embodiments, the amount of additives in the sol relative to silica content is in the range of about 5% to about 20%, about 10% to about 20%, about 10% to about 30%, about 10% to about 20%, about 30 wt % to about 50 wt %, about 35 wt % to about 45 wt %, or about 35 wt % to about 40 wt % relative to silica content. In some embodiments, the amount of additives in the sol is at least about 10 wt % relative to silica content or about 10 wt % relative to silica content. In some embodiments, the amount of additives is in the range of about 5 wt % to about 15 wt % relative to silica content. In certain embodiments, the additives may be of more than one type. One or more fire-class additives may also be present in the final aerogel compositions. In some preferred embodiments which include aluminum silicate fire-class additives, the additives are present in the aerogel compositions in about 60-70 wt % relative to silica content. For example, in some preferred embodiments which include aluminum silicate fire-class additives such as kaolin or combinations of aluminum silicate fire-class additives such as kaolin with alumina trihydrate ("ATH"), the total amount of additives present in the aerogel compositions is about 30-40 wt % relative to silica content. For another example, in some preferred embodiments in which additives include silicon carbide, the total amount of additives present in the aerogel compositions is about 30-40 wt %, e.g. 35 wt %, relative to silica content. For another example, in some preferred embodiments in which additives include silicon carbide, the total amount of additives present in the aerogel compositions is about 5-15 wt %, e.g. 10 wt %, relative to silica content.

When referring to the final reinforced aerogel compositions, the amount of additives is typically referred to as a weight percentage of the final reinforced aerogel composition. The amount of additives in the final reinforced aerogel composition may vary from about 1% to about 50%, about 1% to about 25%, or about 10% to about 25% by weight of the reinforced aerogel composition. In exemplary embodiments, the amount of additives in the final reinforced aerogel composition is in the range of about 10% to about 20% by weight of the reinforced aerogel composition. In exemplary embodiments, the amount of additives in the final reinforced aerogel composition as a weight percentage of the composition is about 1%, about 2% about 3%, about 4%, about 5%, about 6%, about 7%, about 8%, about 9%, about 10%, about 11%, about 12%, about 13%, about 14%, about 15%, about 16%, about 17%, about 18%, about 19% about 20% or in a range between any of the aforementioned percentages. In certain embodiments, the amount of additives in the final reinforced aerogel composition is about 15% by weight of the reinforced aerogel composition. In certain embodiments, the amount of additives in the final reinforced aerogel composition is about 13% by weight of the reinforced aerogel composition. For example, in some preferred embodiments which include additives such as silicon carbide, the total amount of additives present in the aerogel compositions is about 10-20%, e.g., about 15%, by weight of the reinforced aerogel composition. For another example, in some preferred embodiments in which additives include silicon carbide, the total amount of additives present in the aerogel compositions is about 3-5%, e.g., about 4%, by weight of the reinforced aerogel composition.

Fire-Class Additive Onset of Thermal Decomposition

In certain embodiments, fire-class additives can be classified or grouped based on their onset temperature of thermal decomposition. For example, fire-class additives can be classified or grouped as having an onset temperature of thermal decomposition less than about 200° C., less than about 400° C., or greater than about 400° C. For example, additives having an onset temperature of thermal decomposition less than about 200° C. include sodium bicarbonate (NaHCO3), nesquehonite (MgCO3·3 H2O), and gypsum (calcium sulfate dihydrate; CaSO4·2H2O). For another example, additives having an onset temperature of thermal decomposition less than about 400° C. include alumina trihydrate ("ATH"), hydromagnesite (hydrated magnesium carbonate; Mg5(CO3)4(OH)2·4H2O), and magnesium hydroxide (or magnesium dihydroxide, "MDH"). For another example, additives having an onset temperature of thermal decomposition less than about 400° C. include halloysite (aluminum silicate; Al2Si2O5(OH)4), kaolin or kaolinite (aluminum silicate; Al2Si2O5(OH)4), boehmite (aluminum oxide hydroxide; γ-AlO(OH)) or high temperature phase change materials (PCM).

In certain embodiments of the present disclosure, clay materials e.g., aluminosilicate clays such as halloysite or kaolinite, as additives in the aerogel compositions are in the dehydrated form, e.g., meta-halloysite or metakaolin. Other additives that may be useful in the compositions of the present disclosure include, but are not limited to, wollastonite (calcium silicate) and titanium dioxide (TiO2). In certain embodiments, other additives may include infrared opacifiers such as, but not limited to, titanium dioxide or silicon carbide, ceramifiers such as, but not limited to, low melting glass frit, calcium silicate or charformers such as, but not limited to, phosphates and sulfates. In certain embodiments, additives may require special processing considerations such as techniques to ensure the additives are uniformly distributed and not agglomerated heavily to cause product performance variations. The processing techniques may involve additional static and dynamic mixers, stabilizers, adjustment of process conditions and others known in the art. One or more fire-class additives may also be present in the final aerogel compositions.

In certain embodiments, the inclusion of additives, e.g., aluminosilicate clay-based materials such as halloysite or kaolin, in the aerogel materials and compositions of the present disclosure can provide improved high temperature shrinkage properties. An exemplary test method for high temperature shrinkage is "Standard Test Method for Linear Shrinkage of Preformed High-Temperature Thermal Insulation Subjected to Soaking Heat" (ASTM C356, ASTM International, West Conshohocken, PA). In such tests, referred to as a "thermal soak," materials are exposed to temperatures greater than 1000° C. for a duration of up to 60 minutes. In certain exemplary embodiments, aerogel materials or compositions of the present disclosure can have high temperature shrinkage, i.e., a linear shrinkage, width shrinkage, thickness shrinkage or any combination of dimensional shrinkage, of about 20% or less, about 15% or less, about 10% or less, about 6% or less, about 5% or less, 4% or less, 3% or less, 2% or less, 1% or less, or in a range between any two of these values.

In some exemplary embodiments, certain basic catalysts used to catalyze precursor reactions can result in trace levels of alkali metals in the aerogel composition. Trace levels, e.g., 100 to 500 ppm, of alkali, e.g., sodium or potassium, in the aerogel materials can have a deleterious effect on high temperature shrinkage and thermal durability. However, without being bound by any particular mechanism or theory, aluminosilicate clay-based materials such as halloysite or kaolin can sequester fugitive alkali, e.g., sodium or potassium, thereby reducing or eliminating the effect of alkali on shrinkage and thermal durability. In certain embodiments of the present disclosure, the aluminosilicate clay materials are in the dehydrated form, e.g., meta-halloysite or metakaolin. For example, aerogel materials or compositions including an amount of metakaolin or meta-halloysite of greater than about 0.5 wt % relative to silica content can significantly reduce thermal shrinkage and thermal durability. In exemplary embodiments, aerogel materials or compositions can include an amount of metakaolin or meta-halloysite in a range of about 0.5 wt % to about 3.0 wt % relative to silica content.

Encapsulation Layer or Encapsulating Material Layer

In some embodiments, the core portion of the multilayer material disclosed herein or the multilayer material may be encapsulated by an encapsulation layer. For example, the encapsulation layer can include a layer or layers of material surrounding the multilayer material and/or a coating of material surrounding the multilayer material and/or the core portion of the multilayer material. For example, the encapsulation layer can include a film, a layer, an envelope or a coating. The encapsulation member can be made of any material suitable to enclose the composite structure or the reinforced aerogel composites that form the composite structure. For example, the encapsulation member can reduce or eliminate the generation of dust or particulate material shed from the composite structure. Encapsulating material layer can be selected from a polymer, an elastomer or combination thereof. Examples of suitable polymers such as polyethylene terephthalate (PET), polyethylene (PE), polyimide (PI) and nylon, have very low thermal conductivity (less than 1 W/m) which has the effect of lowering the overall system through-plane thermal conductivity. In one embodiment, the encapsulation layer comprises polyethylene terephthalate layer. In another embodiment, the encapsulation layer comprises rubber.

The encapsulation layer may include at least one vent that allows air to flow in and out of the panel. The encapsulation member may include at least one filter that filters particulate matter. In an exemplary embodiment, the encapsulation layer includes a vent that allows air to flow in and out of the panel, and a particulate filter over the vent that keeps particulate matter within the encapsulation member. In another embodiment, the encapsulation layer includes edge seals which include at least one vent and at least one particulate filter. In a further embodiment, the encapsulation layer includes edge seals which include at least one vent and at least one particulate filter, wherein the vents in the edge seals allow air to flow in and out of the encapsulation member edges, and wherein the filters capture and retain particulate matter in the flowing air to prevent contamination of the air outside the encapsulation layer with particulate matter.

Thermal Capacitance Layer

In exemplary embodiments, the multilayer material can include a material or layers of material providing thermal capacitance (i.e., a thermally capacitive material), e.g., a material having a specific heat capacity of at least about 0.2 J/(g-C). In some embodiments, the material providing thermal capacitance has a specific heat capacity of at least about 0.5 J/(g-C). For example, the material providing thermal capacity can include metals such as aluminum, titanium, nickel, steel, stainless steel, iron, or combinations thereof. In some embodiments, the multilayer material can include a layer or coating of the material providing thermal capacitance. In some embodiments, the multilayer material can include particles of the material providing thermal capacitance disposed within a layer of the multilayer material, e.g., within a layer of the aerogel composition. In certain embodiments, the multilayer material can include at least one layer of a material providing thermal capacitance disposed adjacent to the aerogel composition. In certain embodiments, the multilayer material can include at least one layer of a material providing thermal capacitance disposed between at least two of a plurality of layers of the aerogel composition. In exemplary embodiments, the multilayer material can include both thermally conductive and thermally capacitive material.

For example, the multilayer material can include a material that provides both thermal capacitance and thermal conductivity, e.g., a metal such as aluminum, titanium, nickel, steel, iron, or combinations thereof. For another example, the multilayer material can include one or more different materials or layers of material that each provide either thermal capacitance, thermal conductivity, or a combination thereof, e.g., a layer including metal and a layer including thermally conductive polymer. Preferably the thermally conductive layers have a melting temperature of at least 300° C., more preferably of at least 600° C., still more preferably of at least 1000° C., and yet still more preferably of at least 1500° C.

In some embodiments, thermal capacitive materials can be selected from phase change materials. It can be appreciated that for a phase change material to be suitable for a wide range of applications in energy storage systems, the material should not only have relatively high thermal capacitance during the phase change, but should also be relatively low cost and self-containing, i.e., not require any sealing or special containment over the operating temperature range of the device e.g. battery module being packaged. Additional desirable properties for energy storage applications include a high thermal conductivity to quickly transport heat away from a heat-generating component, and the capability of customizing the temperature at which the phase change occurs.

In some embodiments, thermal capacitive materials have thermal conductivity along an in-plane dimension of at least about 200 mW/m-K.

Thermally Conductive Layer

Thermally conductive layers disclosed herein have been found to exhibit a significantly enhanced ability to rapidly dissipate heat throughout the x-y plane of a multilayer material further improving the durability under a high heat load. Examples of high thermal conductivity materials include carbon fiber, graphite, silicon carbide, metals including but not limited to copper, steel, stainless steel, aluminum, and the like, as well as combinations thereof.

In exemplary embodiments, the multilayer material can include a thermally conductive material or layers of material providing thermal conductivity. The thermally conductive layer of the present disclosure helps to dissipate heat away from a localized heat load within a battery module or pack. For example, the thermally conductive layer can have thermal conductivity along an in-plane dimension of at least about 200 mW/m-K. The thermally conductive material can include at least one-layer comprising metal, carbon, conductive polymer, or combinations thereof.

In some embodiments of the above aspects, the multilayer material can include one or a plurality of thermally conductive layers, i.e., with a thermal conductivity of greater than 50 W/mK, more preferably greater than 100 W/mK, and still more preferably greater than 200 W/mK (all measured at 25° C.). For example, the multilayer material can include at least one layer of or including a thermally conductive material, e.g., a layer including metal, carbon, thermally conductive polymer, or combinations thereof. As used in the context of these embodiments, thermally conductive material refers to materials having a thermal conductivity greater than that of the insulation materials e.g. aerogel composition. In certain embodiments, thermally conductive materials have thermal conductivities at least about one order of magnitude greater than that of the aerogel composition. In some embodiments, the multilayer material can include a plurality of layers of the aerogel composition. In certain embodiments, the multilayer material can include at least one layer of conductive material disposed adjacent to the aerogel composition. In certain embodiments, the multilayer material can include at least one layer of conductive material disposed between at least two of a plurality of layers of the aerogel composition. In some embodiments, the multilayer material can include particles of the conductive material disposed within a layer of the multilayer material, e.g., within a layer of the aerogel composition.

To aid in the distribution and removal of heat by, in at least one embodiment the thermally conductive layer is coupled to a heat sink. It will be appreciated that there are a variety of heat sink types and configurations, as well as different techniques for coupling the heat sink to the thermally conductive layer, and that the present disclosure is not limited to the use of any one type of heat sink/coupling technique. For example, at least one thermally conductive layer of the multilayer materials disclosed herein can be in thermal communication with an element of a cooling system of a battery module or pack, such as a cooling plate or cooling channel of the cooling system. For another example, at least one thermally conductive layer of the multilayer materials disclosed herein can be in thermal communication with other elements of the battery pack, battery module, or battery system that can function as a heat sink, such as the walls of the pack, module or system, or with other ones of the multilayer materials disposed between battery cells. Thermal communication between the thermally conductive layer of the multilayer materials and heat sink elements within the battery system can allow for removal of excess heat from the cell or cells adjacent to the multilayer material to the heat sink, thereby reducing the effect, severity, or propagation of a thermal event that may generate excess heat, e.g., as described in more detail herein.

Preferably the thermally conductive layers have a melting temperature of at least 300° C., more preferably of at least 600° C., still more preferably of at least 1000° C., and yet still more preferably of at least 1500° C.

The thickness of the thermally conductive layer may depend on the composition, the properties of the other elements of the multilayer, such as the compression pad, the number of thermal conductions included in the multilayer material and various factors of the composition. Functionally speaking, the thermally conductive layer should be thick enough to provide the desired in-plane thermal conductivity.

In some embodiments, the thermally conductive materials, e.g., pyrolytic graphite sheets (PGS), can have a thickness of about 0.010 mm, 0.025 mm, 0.05 mm, 0.07 mm, 0.10 mm, or in a range between any two of these values and in in-plane thermal conductivity in the range of about 600 to about 1950 W/mK. In some embodiments, the thermally conductive materials, e.g., metal sheets, can have a thickness of about 0.05 mm, about 0.07 mm, about 0.10 mm, about 0.20 mm, about 0.25 mm, about 0.30 mm, about 0.5 mm, about 0.75 mm, about 1 mm, about 1.5 mm, about 2 mm, about 3 mm, about 4 mm, about 5 mm, or in a range between any two of these values.

In some embodiments, thermally conductive materials can be selected from phase change materials.

In some embodiments, thermal pastes can be used between layers of the multilayer material to ensure even and consistent thermal conduction between such layers. As used herein, thermal paste refers to various materials also known as thermal compound, thermal grease, thermal interface material (TIM), thermal gel, heat paste, heat sink compound, and heat sink paste. For example, a layer of thermal paste can be disposed between the aerogel composition and any other layers such as the layer or layers including thermally conductive or thermally capacitive materials, the facing layer or layers, or the encapsulation layer.

Sacrificial Material Layer

In exemplary embodiments, the multilayer material can include a sacrificial material or layers of sacrificial material. Within the context of the present disclosure, the term "sacrificial material" or "sacrificial layer" refers to a material or layer that is intended to be sacrificed or at least partially removed in response to mechanical, thermal, chemical and/or electromagnetic conditions experienced by the layer. For example, the sacrificial material or sacrificial layer can decompose when exposed the high temperatures such as those occurring prior to or during a battery thermal runaway event. In some embodiments, a sacrificial material layer can be disposed on an exterior surface, e.g., an outer surface of the core portion of the multilayer material or an exterior surface, e.g., an outer surface of the multilayer material.

In exemplary embodiments, sacrificial materials or layers of the present disclosure can include a compressible pad having a compression modulus of about 1 MPa, about 2 MPa, about 3 MPa, about 4 MPa, about 5 MPa, about 6 MPa, about 7 MPa, about 8 MPa, about 9 MPa, about 10 MPa, about 11 MPa, about 12 MPa or in a range between any two of these values. The sacrificial material layer can be selected from the group consisting of siloxanes, polyolefins, polyurethanes, phenolics, melamine, cellulose acetate, and polystyrene. In some cases, material layer is in the form of foam. In some embodiments, the compressible pad or foam can be worn away due to exposure to mechanical (such as cyclical) loads. In some embodiments, the compressible pad or foam decomposes after exposure to a singular mechanical, chemical and/or thermal event.

In some embodiments, the onset temperature of chemical decomposition of the sacrificial material layer is in the range of about 200° C. to about 400° C.

Suitable foams for use as a compressible pad in embodiments disclosed herein have densities lower than about 1.0 g/cc or less, about 0.90 g/cc or less about, about 0.80 g/cc or less, about 0.70 g/cc or less, about 0.60 g/cc or less, about 0.50 g/cc or less, about 0.40 g/cc or less, about 0.30 g/cc or less, about 0.20 g/cc or less, about 0.16 g/cc, about 0.10 g/cc or less, about 0.08 g/cc or less, or in a range between any two of these values, and/or a void volume content of at least about 20 to about 99%, specifically greater than or equal to about 30%, based upon the total volume of the foam. In an exemplary embodiment, the foam has a density of about 0.08 g/cc to about 0.50 g/cc, a 25% compression force deflection (CFD) at about 27 kPa to about 55 kPa, and a compression set at about 70° C. of less than about 10%, specifically less than 5%. CFD is measured by calculating the force in kPa required to compress the sample to 25% of the original thickness in accordance with ASTM D1056.

Polymers for use in the foams can be selected from a wide variety of thermoplastic resins, blends of thermoplastic resins, or thermosetting resins. Examples of thermoplastic resins that can be used include polyacetals, polyacrylics, styrene acrylonitrile, polyolefins, acrylonitrile-butadiene-styrene, polycarbonates, polystyrenes, polyethylene terephthalates, polybutylene terephthalates, polyamides such as, but not limited to Nylon 6, Nylon 6,6, Nylon 6,10, Nylon 6,12, Nylon 11 or Nylon 12, polyamideimides, polyarylates, polyurethanes, ethylene propylene rubbers (EPR), polyarylsulfones, polyethersulfones, polyphenylene sulfides, polyvinyl chlorides, polysulfones, polyetherimides, polytetrafluoroethylenes, fluorinated ethylene propylenes, polychlorotrifluoroethylenes, polyvinylidene fluorides, polyvinyl fluorides, polyetherketones, polyether etherketones, polyether ketone ketones, and the like, or a combination comprising at least one of the foregoing thermoplastic resins.

Examples of blends of thermoplastic resins that can be used in the polymer foams include acrylonitrile-butadiene-styrene/nylon, polycarbonate/acrylonitrile-butadiene-styrene, acrylonitrile butadiene styrene/polyvinyl chloride, polyphenylene ether/polystyrene, polyphenylene ether/nylon, polysulfone/acrylonitrile-butadiene-styrene, polycarbonate/thermoplastic urethane, polycarbonate/polyethylene terephthalate, polycarbonate/polybutylene terephthalate, thermoplastic elastomer alloys, polyethylene terephthalate/polybutylene terephthalate, styrene-maleic anhydride/acrylonitrile-butadiene-styrene, polyether etherketone/polyethersulfone, styrene-butadiene rubber, polyethylene/nylon, polyethylene/polyacetal, ethylene propylene rubber (EPR), and the like, or a combination comprising at least one of the foregoing blends.

Examples of polymeric thermosetting resins that can be used in the polymer foams include polyurethanes, epoxies, phenolics, polyesters, polyamides, silicones, and the like, or a combination comprising at least one of the foregoing thermosetting resins. Blends of thermosetting resins as well as blends of thermoplastic resins with thermosetting resins can be used.

Multilayer Material

As discussed above, multilayer materials according to embodiments of the present disclosure provide favorable properties for compressibility, compressional resilience, and compliance. When used as a thermal insulator between cells within a battery module, thermal insulation sheets formed using aerogel compositions can provide resistance to compression deformation to accommodate the expansion of cells due to the degradation and swelling of active materials during charge/discharge cycles for the battery. During initial assembly of a battery module, a relatively low load of 1 MPa or lower is typically applied to the thermal insulators, e.g., the multilayer materials disclosed herein. In uses, e.g., when the cells within a battery module expand or swell during charge/discharge cycles, a load of up to about 5 MPa may be applied to the multilayer materials disclosed herein.

In an exemplary aspect, the present disclosure provides a multilayer material where the multilayer material exhibits a compressibility of less than about 25% at about 25 kPa. Optionally, upon release of compression, the multilayer material can be sufficiently resilient to return to at least about 80%, 75%, 65%, 60% or 50%, of its original thickness. In some embodiments, the multilayer material exhibits a compressibility of less than about 25% in a range of about 25 kPa to about 35 kPa and preferably a compressibility less than about 50% at about 50 kPa. In some embodiments, the multilayer material exhibits a compressibility in the range of about 25% to about 50% at about 50 kPa. In exemplary embodiments, the multilayer material exhibits a compressibility of less than about 80% at about 245 kPa, e.g., less than about 70% at about 235 kPa. In exemplary embodiments, the multilayer material exhibits a compressibility of less than about 70% at about 345 kPa. The thermal conductivity of the multilayer material including a reinforced aerogel composition is preferably maintained at less than about 25 mW/m*K when the multilayer material is compressed.

As discussed herein, the multilayer material can include multiple layers of material, such as insulating layers, thermally conductive layers, thermally capacitive layers, encapsulating material layers, abrasion resistance layers, fire/flame resistant layers, heat reflecting layers, compressible layers, e.g., compressible pads, sacrificial layers, or combinations thereof. The combinations and configurations of layers in the multilayer material can be selected to obtain the desired combination of properties, e.g., compressibility, resilience, thermal performance, fire reaction, and other properties. In some embodiments, the multilayer material includes at least one compressible pad disposed between at least two layers of reinforced aerogel composition. For example, the compressible pad can be a foam or other compressible material such as polyolefins, polyurethanes, phenolics, melamine, cellulose acetate, or polystyrene. In certain embodiments, the multilayer material can also include at least one layer of thermally conductive layer or thermally capacitive layer and at least one of the plurality of layers of the reinforced aerogel composition. The thermally conductive material or thermally capacitive material can absorb and/or disperse heat within the multilayer material. In some embodiments, the multilayer material can further include a heat reflecting layer. For example, the heat reflecting layer can include a metallic foil or sheet.

In embodiments of the multilayer material that include several layers, the layers can be attached to other layers, e.g., by an adhesive mechanism selected from the consisting of: an aerosol adhesive, a urethane-based adhesive, an acrylate adhesive, a hot melt adhesive, an epoxy, a rubber resin adhesive; a polyurethane composite adhesive, and combinations thereof. In some embodiments, the layers can be attached by a non-adhesive mechanism, e.g., a mechanism selected from the group consisting of: flame bonding, needling, stitching, sealing bags, rivets, buttons, clamps, wraps, braces, and combinations thereof. In some embodiments, a combination of any of the aforementioned adhesive and non-adhesive mechanisms can be used to attach layers together.

End Products of Multilayer Material

Multilayer materials according to embodiments of the present disclosure can be formed into various end products. In the simplest configuration, the multilayer material can be in the form of a sheet. The sheet can be formed continuously or semi-continuously, e.g., as a rolled product, or sheets of a desired size and shape can be cut or otherwise formed from a larger sheet. The sheet material can be used to form a thermal barrier between battery cells. In other configurations, the reinforced aerogel composition can be formed into a pouch, e.g., to contain a pouch cell of a battery, or into a cylinder to contain cylindrical battery cells.

The multilayer material of the present disclosure may be shaped into a range of three-dimensional forms, including paneling, pipe preforms, half-shell preforms, elbows, joints, pouches, cylinders and other shapes regularly required in the application of insulation materials to industrial and commercial applications.

As used in this specification and the appended claims, the singular forms "a", "an", and "the" include plural referents unless the content clearly dictates otherwise. As used in this specification and the appended claims, the term "or" is generally employed in its sense including "and/or" unless the context clearly dictates otherwise.

As used herein, "about" means approximately or nearly and in the context of a numerical value or range set forth means±5% of the numerical. In an embodiment, the term "about" can include traditional rounding according to significant figures of the numerical value. In addition, the phrase "about 'x' to 'y'" includes "about 'x' to about 'y'".

As used herein, the terms "composition" and "composite" are used interchangeably.

As used herein, the terms "compressible pad" and "compressible layer" are used interchangeably.

Within the context of the present disclosure, the term "aerogel", "aerogel material" or "aerogel matrix" refers to a gel comprising a framework of interconnected structures, with a corresponding network of interconnected pores integrated within the framework, and containing gases such as air as a dispersed interstitial medium; and which is characterized by the following physical and structural properties (according to Nitrogen Porosimetry Testing) attributable to aerogels: (a) an average pore diameter ranging from about 2 nm to about 100 nm, (b) a porosity of at least 80% or more, and (c) a surface area of about 100 $m^2/g$ or more.

Aerogel materials of the present disclosure thus include any aerogels or other open-celled materials which satisfy the defining elements set forth in previous paragraphs; including materials which can be otherwise categorized as xerogels, cryogels, ambigels, microporous materials, and the like.

Aerogel materials may also be further characterized by additional physical properties, including: (d) a pore volume of about 2.0 mL/g or more, particularly about 3.0 mL/g or more; (e) a density of about 0.50 g/cc or less, particularly about 0.3 g/cc or less, more particularly about 0.25 g/cc or less; and (f) at least 50% of the total pore volume comprising pores having a pore diameter of between 2 and 50 nm (although embodiments disclosed herein include aerogel frameworks and compositions that include pores having a pore diameter greater than 50 nm, as discussed in more detail below). However, satisfaction of these additional properties is not required for the characterization of a compound as an aerogel material.

Within the context of the present disclosure, the term "aerogel composition" refers to any composite material that includes aerogel material as a component of the composite. Examples of aerogel compositions include, but are not limited to fiber-reinforced aerogel composites; aerogel composites which include additive elements such as opacifiers; aerogel composites reinforced by open-cell macroporous frameworks; aerogel-polymer composites; and composite materials which incorporate aerogel particulates, particles, granules, beads, or powders into a solid or semi-solid material, such as in conjunction with binders, resins, cements, foams, polymers, or similar solid materials. Aerogel compositions are generally obtained after the removal of the solvent from various gel materials disclosed herein. Aerogel compositions thus obtained may further be subjected to additional processing or treatment. The various gel materials may also be subjected to additional processing or treatment otherwise known or useful in the art before subjected to solvent removal (or liquid extraction or drying).

Aerogel compositions of the present disclosure may comprise reinforced aerogel compositions. Within the context of the present disclosure, the term "reinforced aerogel composition" refers to aerogel compositions comprising a reinforcing phase within the aerogel material, where the reinforcing phase is not part of the aerogel framework itself.

Within the context of the present disclosure, the term "fiber-reinforced aerogel composition" refers to a reinforced aerogel composition which comprises a fiber reinforcement material as a reinforcing phase. Examples of fiber reinforcement materials include, but are not limited to, discrete fibers, woven materials, dry laid non-woven materials, wet laid non-woven materials, needled nonwovens, battings, webs, mats, felts, and/or combinations thereof.

Fiber reinforcement material can be selected from organic polymer-based fibers, inorganic fibers, carbon-based fibers or a combination thereof. Fiber reinforcement materials can comprise a range of materials, including, but not limited to: Polyesters, polyolefin terephthalates, poly(ethylene) naphthalate, polycarbonates (examples Rayon, Nylon), cotton, (e.g. lycra manufactured by DuPont), carbon (e.g. graphite), polyacrylonitriles (PAN), oxidized PAN, uncarbonized heat treated PANs (such as those manufactured by SGL carbon), glass or fiberglass based material (like S-glass, 901 glass, 902 glass, 475 glass, E-glass) silica based fibers like quartz, (e.g. Quartzel manufactured by Saint-Gobain), Q-felt (manufactured by Johns Manville), Saffil (manufactured by Saffil), Durablanket (manufactured by Unifrax) and other silica fibers, Duraback (manufactured by Carborundum), Polyaramid fibers like Kevlar, Nomex, Sontera (all manufactured by DuPont), Conex (manufactured by Taijin), polyolefins like Tyvek (manufactured by DuPont), Dyneema (manufactured by DSM), Spectra (manufactured by Honeywell), other polypropylene fibers like Typar, Xavan (both manufactured by DuPont), fluoropolymers like PTFE with trade names as Teflon (manufactured by DuPont), Goretex (manufactured by W.L. GORE), Silicon carbide fibers like Nicalon (manufactured by COI Ceramics), ceramic fibers like Nextel (manufactured by 3M), Acrylic polymers, fibers of wool, silk, hemp, leather, suede, PBO-Zylon fibers (manufactured by Tyobo), Liquid crystal material like Vectan (manufactured by Hoechst), Cambrelle fiber (manufactured by DuPont), Polyurethanes, polyamaides, Wood fibers, Boron, Aluminum, Iron, Stainless Steel fibers and other thermoplastics like PEEK, PES, PEI, PEK, PPS. The glass or fiberglass-based fiber reinforcement materials may be manufactured using one or more techniques. In certain embodiments, it is desirable to make them using a carding and cross-lapping or air-laid process. In exemplary embodiments, carded and cross-lapped glass or fiberglass-based fiber reinforcement materials provide certain advantages over air-laid materials. For example, carded and cross-lapped glass or fiberglass-based fiber reinforcement materials can provide a consistent material thickness for a given basis weight of reinforcement material. In certain additional embodiments, it is desirable to further needle the fiber reinforcement materials with a need to interlace the fibers in z-direction for enhanced mechanical and other properties in the final aerogel composition.

Within the context of the present disclosure, references to "thermal runaway" generally refer to the sudden, rapid increase in cell temperature and pressure due various operational factors and which in turn can lead to propagation of excessive temperature throughout an associated module. Potential causes for thermal runaway in such systems may, for example, include: cell defects and/or short circuits (both internal and external), overcharge, cell puncture or rupture such as in the event of an accident, and excessive ambient temperatures (e.g., temperatures typically greater than 55° C.). In normal use, the cells heat as result of internal resistance. Under normal power/current loads and ambient operating conditions, the temperature within most Li-ion cells can be relatively easily controlled to remain in a range of 20° C. to 55° C. However, stressful conditions such as high power draw at high cell/ambient temperatures, as well as defects in individual cells, may steeply increase local heat generation. In particular, above the critical temperature, exothermic chemical reactions within the cell are activated. Moreover, chemical heat generation typically increases exponential with temperature. As a result, heat generation becomes much greater than available heat dissipation. Thermal runaway can lead to cell venting and internal temperatures in excess of 200° C.

Within the context of the present disclosure, the term "foam" refers to a material comprising a framework of interconnected polymeric structures of substantially uniform composition, with a corresponding network or collection of pores integrated within the framework, and which is formed by dispersing a proportion of gas in the form of bubbles into a liquid or resin foam material such that the gas bubbles are retained as pores as the foam material solidifies into a solid structure. In general, foams can be made using a wide variety of processes—see, for example, U.S. Pat. Nos. 6,147,134; 5,889,071; 6,187,831; and 5,229,429. Foam materials of the present disclosure thus include any materials that satisfy the defining elements set forth in this paragraph, including compounds that can be otherwise categorized as OCMF materials, macroporous materials, and the like. Foams as defined in the present disclosure may be in the types of thermoplastics, elastomers, and thermosets (duromers).

Within the context of the present disclosure, the terms "flexible" and "flexibility" refer to the ability of a material or composition to be bent or flexed without macrostructural failure. Insulation layer of the present disclosure are capable of bending at least 5°, at least 25°, at least 45°, at least 65°, or at least 85° without macroscopic failure; and/or have a bending radius of less than 4 feet, less than 2 feet, less than 1 foot, less than 6 inches, less than 3 inches, less than 2 inches, less than 1 inch, or less than U inch without macroscopic failure. Likewise, the terms "highly flexible" or "high flexibility" refer to materials capable of bending to at least 90° and/or have a bending radius of less than U inch without macroscopic failure. Furthermore, the terms "classified flexible" and "classified as flexible" refer to materials or compositions which can be classified as flexible according to ASTM Cl 101 (ASTM International, West Conshohocken, PA).

Insulation layer of the present disclosure can be flexible, highly flexible, and/or classified flexible. Aerogel compositions of the present disclosure can also be drapable. Within the context of the present disclosure, the terms "drapable" and "drapability" refer to the ability of a material to be bent or flexed to 90° or more with a radius of curvature of about 4 inches or less, without macroscopic failure. Insulation layer according to certain embodiments of the current disclosure are flexible such that the composition is non-rigid and may be applied and conformed to three-dimensional surfaces or objects, or pre-formed into a variety of shapes and configurations to simplify installation or application.

Within the context of the present disclosure, the terms "additive" or "additive element" refer to materials that may be added to an aerogel composition before, during, or after the production of the aerogel. Additives may be added to alter or improve desirable properties in an aerogel, or to counteract undesirable properties in an aerogel. Additives are typically added to an aerogel material either prior to gelation to precursor liquid, during gelation to a transition state material or after gelation to a solid or semi solid material.

Examples of additives include, but are not limited to microfibers, fillers, reinforcing agents, stabilizers, thickeners, elastic compounds, opacifiers, coloring or pigmentation compounds, radiation absorbing compounds, radiation reflecting compounds, fire-class additives, corrosion inhibitors, thermally conductive components, components providing thermal capacitance, phase change materials, pH adjustors, redox adjustors, HCN mitigators, off-gas mitigators, electrically conductive compounds, electrically dielectric compounds, magnetic compounds, radar blocking components, hardeners, anti-shrinking agents, and other aerogel additives known to those in the art. In some embodiments, components providing thermal capacity can include materials having a specific heat capacity of at least about 0.3 J/(g-C). In some embodiments, the material providing thermal capacitance has a specific heat capacity of at least about 0.5 J/(g-C). For example, the material providing thermal capacity can include metals such as aluminum, titanium, nickel, steel, iron, or combinations thereof. In some embodiments, the multilayer material can include one or more layer or coating of the material providing thermal capacitance. In some embodiments, the multilayer material can include particles of the material providing thermal capacitance disposed within one or more insulation layer comprising aerogel compositions.

In certain embodiments, the aerogel compositions, reinforced aerogel compositions, and the multilayer materials disclosed herein can perform during high temperature events, e.g., provide thermal protection during high temperature events as disclosed herein. High temperature events are characterized by a sustained heat flux of at least about 25 kW/m$^2$, at least about 30 kW/m$^2$, at least about 35 kW/m$^2$ or at least about 40 kW/m$^2$ over an area of at least about 1 cm$^2$ for at least 2 seconds. A heat flux of about 40 kW/m$^2$ has been associated with that arising from typical fires (Behavior of Charring Solids under Fire-Level Heat Fluxes; Milosavljevic, I., Suuberg, E. M.; NISTIR 5499; September 1994). In a special case, the high temperature event is a heat flux of heat flux of about 40 kW/m over an area of at least about 10 cm$^2$ for a duration of at least 1 minute.

Within the context of the present disclosure, the terms "thermal conductivity" and "TC" refer to a measurement of the ability of a material or composition to transfer heat between two surfaces on either side of the material or composition, with a temperature difference between the two surfaces. Thermal conductivity is specifically measured as the heat energy transferred per unit time and per unit surface area, divided by the temperature difference. It is typically recorded in SI units as mW/m*K (milliwatts per meter*Kelvin). The thermal conductivity of a material may be determined by test methods known in the art, including, but not limited to Test Method for Steady-State Thermal Transmission Properties by Means of the Heat Flow Meter Apparatus (ASTM C518, ASTM International, West Conshohocken, PA); a Test Method for Steady-State Heat Flux Measurements and Thermal Transmission Properties by Means of the Guarded-Hot-Plate Apparatus (ASTM C177, ASTM International, West Conshohocken, PA); a Test Method for Steady-State Heat Transfer Properties of Pipe Insulation (ASTM C335, ASTM International, West Conshohocken, PA); a Thin Heater Thermal Conductivity Test (ASTM C1114, ASTM International, West Conshohocken, PA); Standard Test Method for Thermal Transmission Properties of Thermally Conductive Electrical Insulation Materials (ASTM D5470, ASTM International, West Conshohocken, PA); Determination of thermal resistance by means of guarded hot plate and heat flow meter methods (EN 12667, British Standards Institution, United Kingdom); or Determination of steady-state thermal resistance and related properties—Guarded hot plate apparatus (ISO 8203, International Organization for Standardization, Switzerland). Due to different methods possibly resulting in different results, it should be understood that within the context of the present disclosure and unless expressly stated otherwise, thermal conductivity measurements are acquired according to ASTM C518 standard (Test Method for Steady-State Thermal Transmission Properties by Means of the Heat Flow Meter Apparatus), at a temperature of about 37.5° C. at atmospheric pressure in ambient environment, and under a compression load of about 2 psi. The measurements reported as per ASTM C518 typically correlate well with any measurements made as per EN 12667 with any relevant adjustment to the compression load.

Thermal conductivity measurements can also be acquired at a temperature of about 10° C. at atmospheric pressure under compression. Thermal conductivity measurements at 10° C. are generally 0.5-0.7 mW/mK lower than corresponding thermal conductivity measurements at 37.5° C. In certain embodiments, the insulation layer of the present disclosure has a thermal conductivity at 10° C. of about 40 mW/mK or less, about 30 mW/mK or less, about 25 mW/mK or less, about 20 mW/mK or less, about 18 mW/mK or less, about 16 mW/mK or less, about 14 mW/mK or less, about 12 mW/mK or less, about 10 mW/mK or less, about 5 mW/mK or less, or in a range between any two of these values.

Within the context of the present disclosure, the term "density" refers to a measurement of the mass per unit volume of a material or composition. The term "density" generally refers to the apparent density of a material, as well as the bulk density of a composition. Density is typically recorded as kg/m$^3$ or g/cc. The density of a material or composition e.g. aerogel may be determined by methods known in the art, including, but not limited to Standard Test Method for Dimensions and Density of Preformed Block and Board-Type Thermal Insulation (ASTM C303, ASTM International, West Conshohocken, PA); Standard Test Methods for Thickness and Density of Blanket or Batt Thermal Insulations (ASTM C167, ASTM International, West Conshohocken, PA); Determination of the apparent density of preformed pipe insulation (EN 13470, British Standards Institution, United Kingdom); or Determination of the apparent density of preformed pipe insulation (ISO 18098, International Organization for Standardization, Switzerland). Due to different methods possibly resulting in different results, it should be understood that within the context of the present disclosure, density measurements are acquired according to ASTM C167 standard (Standard Test Methods for Thickness and Density of Blanket or Batt Thermal Insulations) at 2 psi compression for thickness measurement, unless otherwise stated. In certain embodiments, aerogel materials or compositions of the present disclosure have a density of about 1.0 g/cc or less, about 0.90 g/cc or less about, about 0.80 g/cc or less, about 0.70 g/cc or less, about 0.60 g/cc or less, about 0.50 g/cc or less, about 0.40 g/cc or less, about 0.30 g/cc or less, about 0.25 g/cc or less, about 0.20 g/cc or less, about 0.18 g/cc or less, about 0.16 g/cc or less, about 0.14 g/cc or less, about 0.12 g/cc or less, about 0.10 g/cc or less, about 0.05 g/cc or less, about 0.01 g/cc or less, or in a range between any two of these values.

Hydrophobicity of an aerogel material or composition can be expressed in terms of the water vapor uptake. Within the context of the present disclosure, the term "water vapor uptake" refers to a measurement of the potential of an aerogel material or composition to absorb water vapor. Water vapor uptake can be expressed as a percent (by weight) of water that is absorbed or otherwise retained by an aerogel material or composition when exposed to water vapor under certain measurement conditions. The water vapor uptake of an aerogel material or composition may be determined by methods known in the art, including, but not limited to Standard Test Method for Determining the Water Vapor Sorption of Unfaced Mineral Fiber Insulation (ASTM C1104, ASTM International, West Conshohocken, PA); Thermal insulating products for building applications: Determination of long term water absorption by diffusion (EN 12088, British Standards Institution, United Kingdom). Due to different methods possibly resulting in different results, it should be understood that within the context of the present disclosure, measurements of water vapor uptake are acquired according to ASTM C1104 standard (Standard Test Method for Determining the Water Vapor Sorption of Unfaced Mineral Fiber Insulation) at 49° C. and 95% humidity for 24 hours (modified from 96 hours according to the ASTM C1104 standard) under ambient pressure, unless otherwise stated. In certain embodiments, aerogel materials or compositions of the present disclosure can have a water vapor uptake of about 50 wt % or less, about 40 wt % or less, about 30 wt % or less, about 20 wt % or less, about 15 wt % or less, about 10 wt % or less, about 8 wt % or less, about 3 wt % or less, about 2 wt % or less, about 1 wt % or less, about 0.1 wt % or less, or in a range between any two of these values. An aerogel material or composition that has improved water vapor uptake relative to another aerogel material or composition will have a lower percentage of water vapor uptake/retention relative to the reference aerogel materials or compositions.

Hydrophobicity of an aerogel material or composition can be expressed by measuring the equilibrium contact angle of a water droplet at the interface with the surface of the material. Aerogel materials or compositions of the present disclosure can have a water contact angle of about 90° or more, about 120° or more, about 130° or more, about 140° or more, about 150° or more, about 160° or more, about 170° or more, about 175° or more, or in a range between any two of these values.

Within the context of the present disclosure, the terms "heat of combustion", "HOC" and "$\Delta HC$" refer to a measurement of the amount of heat energy released in the combustion or exothermic thermal decomposition of a material or composition. Heat of combustion is typically recorded in calories of heat energy released per gram of aerogel material or composition (cal/g), or as megajoules of heat energy released per kilogram of material or composition (MJ/kg). The heat of combustion of a material or composition may be determined by methods known in the art, including, but not limited to Reaction to fire tests for products—Determination of the gross heat of combustion (calorific value) (EN ISO 1716, International Organization for Standardization, Switzerland; EN adopted). Within the context of the present disclosure, heat of combustion measurements are acquired according to EN ISO 1716 standards (Reaction to fire tests for products—Determination of the gross heat of combustion (calorific value)), unless otherwise stated.

Within the context of the present disclosure, all thermal analyses and related definitions are referenced with measurements performed by starting at 25° C. and ramping at a rate of 20° C. per minute up to 1000° C. in air at ambient pressure. Accordingly, any changes in these parameters will have to be accounted for (or re-performed under these conditions) in measuring and calculating onset of thermal decomposition, temperature of peak heat release, temperature of peak hear absorption and the like.

Within the context of the present disclosure, the terms "onset of thermal decomposition" and "TD" refer to a measurement of the lowest temperature of environmental heat at which rapid exothermic reactions from the decomposition of organic material appear within a material or composition. The onset of thermal decomposition of organic material within a material or composition may be measured using thermo-gravimetric analysis (TGA). The TGA curve of a material depicts the weight loss (% mass) of a material as it is exposed to an increase in surrounding temperature, thus indicating thermal decomposition. The onset of thermal decomposition of a material can be correlated with the intersection point of the following tangent lines of the TGA curve: a line tangent to the base line of the TGA curve, and a line tangent to the TGA curve at the point of maximum slope during the rapid exothermic decomposition event related to the decomposition of organic material. Within the context of the present disclosure, measurements of the onset of thermal decomposition of organic material are acquired using TGA analysis as provided in this paragraph, unless otherwise stated.

The onset of thermal decomposition of a material may also be measured using differential scanning calorimetry (DSC) analysis. The DSC curve of a material depicts the heat energy (mW/mg) released by a material as it is exposed to a gradual increase in surrounding temperature. The onset of thermal decomposition temperature of a material can be correlated with the point in the DSC curve where the $\Delta$ mW/mg (change in the heat energy output) maximally increases, thus indicating exothermic heat production from the aerogel material. Within the context of the present disclosure, measurements of onset of thermal decomposition using DSC, TGA, or both are acquired using a temperature ramp rate of 20° C./min as further defined in the previous paragraph, unless otherwise stated expressly. DSC and TGA each provide similar values for this onset of thermal decomposition, and many times, the tests are run concurrently, so that results are obtained from both.

Within the context of the present disclosure, the terms "onset of endothermic decomposition" and "TED" refer to a measurement of the lowest temperature of environmental heat at which endothermic reactions from decomposition or dehydration appear within a material or composition. The onset of endothermic decomposition of a material or composition may be measured using thermo-gravimetric analysis (TGA). The TGA curve of a material depicts the weight loss (% mass) of a material as it is exposed to an increase in surrounding temperature. The onset of thermal decomposition of a material may be correlated with the intersection point of the following tangent lines of the TGA curve: a line tangent to the base line of the TGA curve, and a line tangent to the TGA curve at the point of maximum slope during the rapid endothermic decomposition or dehydration of the material. Within the context of the present disclosure, measurements of the onset of endothermic decomposition of a material or composition are acquired using TGA analysis as provided in this paragraph, unless otherwise stated.

Within the context of the present disclosure, the terms "furnace temperature rise" and "ΔTR" refer to a measurement of the difference between a maximum temperature (TMAX) of a material or composition under thermal decomposition conditions relative to a baseline temperature of that material or composition under the thermal decomposition conditions (usually the final temperature, or TFIN). Furnace temperature rise is typically recorded in degrees Celsius, or ° C. The furnace temperature rise of a material or composition may be determined by methods known in the art, including, but not limited to Reaction to fire tests for building and transport products: Non-combustibility test (EN ISO 1182, International Organization for Standardization, Switzerland; EN adopted). Within the context of the present disclosure, furnace temperature rise measurements are acquired according to conditions comparable to EN ISO 1182 standard (Reaction to fire tests for building and transport products: Non-combustibility test), unless otherwise stated. In certain embodiments, aerogel compositions of the present disclosure can have a furnace temperature rise of about 100° C. or less, about 90° C. or less, about 80° C. or less, about 70° C. or less, about 60° C. or less, about 50° C. or less, about 45° C. or less, about 40° C. or less, about 38° C. or less, about 36° C. or less, about 34° C. or less, about 32° C. or less, about 30° C. or less, about 28° C. or less, about 26° C. or less, about 24° C. or less, or in a range between any two of these values. Within the context of compositional stability at elevated temperatures, for example, a first composition having a furnace temperature rise that is lower than a furnace temperature rise of a second composition, would be considered an improvement of the first composition over the second composition. It is contemplated herein that furnace temperature rise of a composition is reduced when adding one or more fire-class additives, as compared to a composition that Within the context of the present disclosure, the terms "flame time" and "TFLAME" refer to a measurement of sustained flaming of a material or composition under thermal decomposition conditions, where "sustained flaming" is a persistence of flame at any part on the visible part of the specimen lasting 5 seconds or longer. Flame time is typically recorded in seconds or minutes. The flame time of a material or composition may be determined by methods known in the art, including, but not limited to Reaction to fire tests for building and transport products: Non-combustibility test (EN ISO 1182, International Organization for Standardization, Switzerland; EN adopted). Within the context of the present disclosure, flame time measurements are acquired according to conditions comparable to EN ISO 1182 standard (Reaction to fire tests for building and transport products: Non-combustibility test), unless otherwise stated. In certain embodiments, aerogel compositions of the present disclosure have a flame time of about 30 seconds or less, about 25 seconds or less, about 20 seconds or less, about 15 seconds or less, about 10 seconds or less, about 5 seconds or less, about 2 seconds or less, or in a range between any two of these values. Within the context herein, for example, a first composition having a flame time that is lower than a flame time of a second composition, would be considered an improvement of the first composition over the second composition. It is contemplated herein that flame time of a composition is reduced when adding one or more fire-class additives, as compared to a composition that does not include any fire-class additives.

Within the context of the present disclosure, the terms "mass loss" and "ΔM" refer to a measurement of the amount of a material, composition, or composite that is lost or burned off under thermal decomposition conditions. Mass loss is typically recorded as weight percent or wt %. The mass loss of a material, composition, or composite may be determined by methods known in the art, including, but not limited to: Reaction to fire tests for building and transport products: Non-combustibility test (EN ISO 1182, International Organization for Standardization, Switzerland; EN adopted). Within the context of the present disclosure, mass loss measurements are acquired according to conditions comparable to EN ISO 1182 standard (Reaction to fire tests for building and transport products: Non-combustibility test), unless otherwise stated. In certain embodiments, insulation layer or aerogel compositions of the present disclosure can have a mass loss of about 50% or less, about 40% or less, about 30% or less, about 28% or less, about 26% or less, about 24% or less, about 22% or less, about 20% or less, about 18% or less, about 16% or less, or in a range between any two of these values. Within the context herein, for example, a first composition having a mass loss that is lower than a mass loss of a second composition would be considered an improvement of the first composition over the second composition. It is contemplated herein that mass loss of a composition is reduced when adding one or more fire-class additives, as compared to a composition that does not include any fire-class additives.

Within the context of the present disclosure, the terms "temperature of peak heat release" refers to a measurement of the temperature of environmental heat at which exothermic heat release from decomposition is at the maximum. The temperature of peak heat release of a material or composition may be measured using TGA analysis, differential scanning calorimetry (DSC) or a combination thereof. DSC and TGA each would provide similar values for temperature of peak heat release, and many times, the tests are run concurrently, so that results are obtained from both. In a typical DSC analysis, heat flow is plotted against the rising temperature and temperature of peak heat release is the temperature at which the highest peak in such curve occurs. Within the context of the present disclosure, measurements of the temperature of peak heat release of a material or composition are acquired using TGA analysis as provided in this paragraph, unless otherwise stated.

In the context of an endothermic material, the terms "temperature of peak heat absorption" refers to a measurement of the temperature of environmental heat at which endothermic heat absorption from decomposition is at the minimum. The temperature of peak heat absorption of a material or composition may be measured using TGA analysis, differential scanning calorimetry (DSC) or a combination thereof. In a typical DSC analysis, heat flow is plotted against the rising temperature and temperature of peak heat absorption is the temperature at which the lowest peak in such curve occurs. Within the context of the present disclosure, measurements of the temperature of peak heat absorption of a material or composition are acquired using TGA analysis as provided in this paragraph, unless otherwise stated.

Within the context of the present disclosure, the term "low-flammability" and "low-flammable" refer to a material or composition which satisfy the following combination of properties: i) a furnace temperature rise of 50° C. or less; ii) a flame time of 20 seconds or less; and iii) a mass loss of 50 wt % or less. Within the context of the present disclosure, the term "non-flammability" and "non-flammable" refer to a material or composition which satisfy the following combination of properties: i) a furnace temperature rise of 40° C. or less; ii) a flame time of 2 seconds or less; and iii) a mass loss of 30 wt % or less. It is contemplated that flammability (e.g., combination of furnace temperature rise, flame time, and mass loss) of a composition is reduced upon inclusion of one or more fire-class additives, as described herein.

Within the context of the present disclosure, the term "low-combustibility" and "low-combustible" refer to a low-flammable material or composition which has a total heat of combustion (HOC) less than or equal to 3 MJ/kg. Within the context of the present disclosure, the term "non-combustibility" and "non-combustible" refer to a non-flammable material or composition which has the heat of combustion (HOC) less than or equal to 2 MJ/kg. It is contemplated that HOC of a composition is reduced upon inclusion of one or more fire-class additives, as described herein.

Within the context of the present disclosure, the term "hydrophobic-bound silicon" refers to a silicon atom within the framework of a gel or aerogel comprising at least one hydrophobic group covalently bonded to the silicon atom. Examples of hydrophobic-bound silicon include, but are not limited to, silicon atoms in silica groups within the gel framework which are formed from gel precursors comprising at least one hydrophobic group (such as MTES or DMDS). Hydrophobic-bound silicon may also include, but are not limited to, silicon atoms in the gel framework or on the surface of the gel which are treated with a hydrophobizing agent (such as HMDZ) to impart or improve hydrophobicity by incorporating additional hydrophobic groups into the composition. Hydrophobic groups of the present disclosure include, but are not limited to, methyl groups, ethyl groups, propyl groups, isopropyl groups, butyl groups, isobutyl groups, tertbutyl groups, octyl groups, phenyl groups, or other substituted or unsubstituted hydrophobic organic groups known to those with skill in the art. Within the context of the present disclosure, the terms "hydrophobic group," "hydrophobic organic material," and "hydrophobic organic content" specifically exclude readily hydrolysable organic silicon-bound alkoxy groups on the framework of the gel material, which are the product of reactions between organic solvents and silanol groups. Such excluded groups are distinguishable from hydrophobic organic content of this through NMR analysis. The amount of hydrophobic-bound silicon contained in an aerogel can be analyzed using NMR spectroscopy, such as CP/MAS 29Si Solid State NMR. An NMR analysis of an aerogel allows for the characterization and relative quantification of M-type hydrophobic-bound silicon (monofunctional silica, such as TMS derivatives); D-type hydrophobic-bound silicon (bifunctional silica, such as DMDS derivatives); T-type hydrophobic-bound silicon (trifunctional silica, such as MTES derivatives); and Q-type silicon (quadfunctional silica, such as TEOS derivatives). NMR analysis can also be used to analyze the bonding chemistry of hydrophobic-bound silicon contained in an aerogel by allowing for categorization of specific types of hydrophobic-bound silicon into sub-types (such as the categorization of T-type hydrophobic-bound silicon into T1 species, T2 species, and T3 species). Specific details related to the NMR analysis of silica materials can be found in the article "Applications of Solid-State NMR to the Study of Organic/Inorganic Multicomponent Materials" by Geppi et al., specifically pages 7-9 (Appl. Spec. Rev. (2008), 44-1: 1-89), which is hereby incorporated by reference according to the specifically cited pages.

The characterization of hydrophobic-bound silicon in a CP/MAS 29Si NMR analysis can be based on the following chemical shift peaks: M1 (30 to 10 ppm); D1 (10 to −10 ppm), D2 (−10 to −20 ppm); T1 (−30 to −40 ppm), T2 (−40 to −50 ppm), T3 (−50 to −70 ppm); Q2 (−70 to −85 ppm), Q3 (−85 to −95 ppm), Q4 (−95 to −110 ppm). These chemical shift peaks are approximate and exemplary, and are not intended to be limiting or definitive. The precise chemical shift peaks attributable to the various silicon species within a material can depend on the specific chemical components of the material, and can generally be deciphered through routine experimentation and analysis by those in the art.

Within the context of the present disclosure, the term "hydrophobic organic content" or "hydrophobe content" or "hydrophobic content" refers to the amount of hydrophobic organic material bound to the framework in an aerogel material or composition. The hydrophobic organic content of an aerogel material or composition can be expressed as a weight percentage of the amount of hydrophobic organic material on the aerogel framework relative to the total amount of material in the aerogel material or composition. Hydrophobic organic content can be calculated by those with ordinary skill in the art based on the nature and relative concentrations of materials used in producing the aerogel material or composition. Hydrophobic organic content can also be measured using thermo-gravimetric analysis (TGA) of the subject materials, preferably in oxygen atmosphere (though TGA under alternate gas environments are also useful). Specifically, the percentage of hydrophobic organic material in an aerogel can be correlated with the percentage of weight loss in a hydrophobic aerogel material or composition when subjected to combustive heat temperatures during a TGA analysis, with adjustments being made for the loss of moisture, loss of residual solvent, and the loss of readily hydrolysable alkoxy groups during the TGA analysis. Other alternative techniques such as differential scanning calorimetry, elemental analysis (particularly, carbon), chromatographic techniques, nuclear magnetic resonance spectra and other analytical techniques known to person of skilled in the art may be used to measure and determine hydrophobic content in the aerogel compositions of the present disclosure. In certain instances, a combination of the known techniques may be useful or necessary in determining the hydrophobic content of the aerogel compositions of the present disclosure.

Aerogel materials or compositions of the present disclosure can have a hydrophobic organic content of 50 wt % or less, 40 wt % or less, 30 wt % or less, 25 wt % or less, 20 wt % or less, 15 wt % or less, 10 wt % or less, 8 wt % or less, 6 wt % or less, 5 wt % or less, 4 wt % or less, 3 wt % or less, 2 wt % or less, 1 wt % or less, or in a range between any two of these values.

The term "fuel content" refers to the total amount of combustible material in an aerogel material or composition, which can be correlated with the total percentage of weight loss in an aerogel material or composition when subjected to combustive heat temperatures during a TGA or TG-DSC analysis, with adjustments being made for the loss of moisture. The fuel content of an aerogel material or composition can include hydrophobic organic content, as well as other combustible residual alcoholic solvents, filler materials, reinforcing materials, and readily hydrolysable alkoxy groups.

Within the context of the present disclosure, the term "ormosil" encompasses the foregoing materials as well as other organically modified materials, sometimes referred to as "ormocers." Ormosils are often used as coatings where an ormosil film is cast over a substrate material through, for example, the sol-gel process. Examples of other organic-inorganic hybrid aerogels of the disclosure include, but are not limited to, silica-polyether, silica-PMMA, silica-chitosan, carbides, nitrides, and other combinations of the aforementioned organic and inorganic aerogel forming compounds. Published US Pat. App. 20050192367 (Paragraphs [0022]-[0038] and [0044]-[0058]) includes teachings of such hybrid organic-inorganic materials, and is hereby incorporated by reference according to the individually cited sections and paragraphs.

Use of the Multilayer Materials within Battery Module or Pack

Lithium-ion batteries (LIBs) are considered to be one of the most important energy storage technologies due to their high working voltage, low memory effects, and high energy density compared to traditional batteries. However, safety concerns are a significant obstacle that hinders large-scale applications of LIBs. Under abuse conditions, exothermic reactions may lead to the release of heat that can trigger subsequent unsafe reactions. The situation worsens, as the released heat from an abused cell can activate a chain of reactions, causing catastrophic thermal runaway.

With continuous improvement of LIBs in energy density, enhancing their safety is becoming increasingly urgent for the development of electrical devices e.g. electrical vehicles. The mechanisms underlying safety issues vary for each different battery chemistry. The present technology focuses on tailoring multilayer materials and corresponding configurations of those tailored materials to obtain favorable thermal and mechanical properties. The multilayer materials of the present technology provide effective heat dissipation strategies under normal as well as thermal runaway conditions, while ensuring stability of the LIB under normal operating modes (e.g., withstanding applied compressive stresses).

The multilayer materials disclosed herein are useful for separating, insulating and protecting battery cells or battery components of batteries of any configuration, e.g., pouch cells, cylindrical cells, prismatic cells, as well as packs and modules incorporating or including any such cells. The multilayer materials disclosed herein are useful in rechargeable batteries e.g. lithium-ion batteries, solid state batteries, and any other energy storage device or technology in which separation, insulation, and protection are necessary.

Passive devices such as cooling systems may be used in conjunction with the multilayer material of the present disclosure within the battery module or battery pack.

The multilayer material according to various embodiments of the present disclosure in a battery pack including a plurality of single battery cells or of modules of battery cells for separating said single battery cells or modules of battery cells thermally from one another.

In an exemplary embodiment, a battery module comprises two or more battery cells disposed in an enclosure. FIG. 10 is a schematic diagram of a prior art battery module. Battery module 1000 includes one or more battery cells 1010 having spacers 1020 positioned between the battery cells. Battery cells 1010 and spacer elements 1020 are positioned in an enclosure 1030. Enclosure 1030 has an interior surface defined by a first endplate 1030a, a second endplate 1030b, a first side wall 1030c, and a second side wall 1030d. Battery modules also have a top plate and a bottom plate (not shown in FIG. 10) which seal the enclosure. Spacer elements 1020 are typically formed from a non-conductive thermally insulative material. As shown in FIG. 10, spacer elements in a conventional battery module typically do not extend beyond the edges of the cells and/or to the walls of the enclosure. Such an arrangement may be beneficial for preventing direct heat conduction between battery cells. This arrangement, however, may not address the containment or direction of hot gases and particulate matter that can be ejected from a battery cell when the battery cell fails. As can be seen in FIG. 10, hot gasses and other material that are released from a battery cell can pass around the edges of the spacer elements and transfer heat to other cells in the module. This can promote other battery cells in the module to fail due to overheating.

In the embodiments disclosed herein, a spacer element can be disposed between each battery cell or between groups of battery cells. For example, the battery module can include groups of battery cells with spacer elements between each group of cells. A group of cells can be any number of cells, e.g., two cells, three cells, four cells, five cells, six cells, or more cells. Each group of cells between spacer elements within a battery module can have the same number of cells or the groups can have different numbers of cells. The number of cells in a group of cells between spacer elements can be selected based upon factors including the total amount of potential thermal energy released in a thermal runaway of one or more cells in the group and the amount of thermal energy that can be blocked or absorbed by the spacer element.

FIGS. 11A-B depicts an exemplary embodiment that addresses the shortcomings of the prior art. FIG. 11A depicts a top down view of a battery module 1100. FIG. 11B shows a cutaway side view of battery module 1100. Similar to a conventional battery module, battery module 1100 includes one or more battery cells 1110 having spacer elements 1120 positioned between the battery cells. Battery cells 1110 and spacer elements 1120 are positioned in an enclosure 1130. Enclosure 1130 has an interior surface defined by a first endplate 1130a, a second endplate 1130b, a first side wall 1130c, and a second side wall 1130d. Battery module 1100 also has a top plate 1140 and a bottom plate 1150 (shown in FIG. 11B) which seal the enclosure. Spacer elements 1120 are formed from a non-conductive thermally insulative material.

In battery module 1100, spacer elements 1120 are extended so that the spacer element contacts the interior surface of the enclosure. Extending the spacer element in such a configuration forms a thermal barrier between adjacent battery cells. In a specific embodiment, two or more battery cells 1110 are longitudinally oriented between the first side wall 1130c and second side wall 1130d, parallel to first endplate 1130a and second endplate 1130b. Spacer elements 1120 contact the bottom plate 1150, top plate 1140, first side wall 1130c and second side wall 1130d to form a thermal barrier between adjacent battery cells.

In an embodiment, each of the spacer elements contact one or more channels formed in the interior surface of the enclosure. FIGS. 12A and 12B depict embodiments of a battery module using spacer elements in channels to form a thermal barrier between battery cells or groups of battery cells. Battery module 1200, depicted in FIG. 12A, includes one or more battery cells 1210 having spacer elements 1220 positioned between the battery cells. Spacer elements 1220 are formed from a non-conductive thermally insulative material. Battery cells 1210 and spacer elements 1220 are positioned in an enclosure 1230. Enclosure 1230 has an interior surface defined by a first endplate 1230a, a second endplate 1230b, a first side wall 1230c, and a second side wall 1230d. Battery module 1200 also has a top plate and a bottom plate (not shown) which seal the enclosure.

To create a better seal at the interface between the spacer elements and the interior surface of the enclosure, one or more channels may be formed in and/or on the interior surface of the enclosure. In FIG. 12A, battery module 1200 includes channels 1260 formed at least on first side wall 1230a and second side wall 1230b. While only depicted on the sidewalls, it should be understood that channels may protrude from one or more of the first endplate, the second endplate, the first side wall, the second side wall, the top plate and the bottom plate. Each spacer element 1220 extends into an opposing pair of channels 1260. The spacer elements contact a portion of the channel forming a seal between the spacer element and the interior surface. A used herein, the term "seal" refers to contact between two elements (e.g., the spacer element and the channel) that inhibits hot gasses and particulate matter from being transferred from a failed battery cell to an adjacent battery cell. In an embodiment, the spacer element contacts at least the side walls of the protruding channel. The spacer element may be in contact with the channel through a pressure fit. In a pressure fit, the spacer element is slightly compressed when disposed in the channel such that a seal is formed between the spacer element and the channel.

The channel can be U-shaped (as depicted in FIG. 12A) or any other shape that is complementary with the spacer element. A U-shaped channel has opposing sidewalls and a bottom surface. In an embodiment, the spacer element may contact the opposing sidewalls of the U-shaped channel to form a seal between the spacer element and the U-shaped channel. In an embodiment, the spacer elements extend into the channel, but do not extend to the bottom surface of the channel. As depicted in FIG. 12A, a gap 1262 is present between the spacer elements and the bottom surface of the U-shaped channels. The gap may allow for variations in manufacturing of the spacer elements and the enclosure. Leaving a gap will help ensure that the spacer element properly fits in the channel during construction of the battery module.

In FIG. 12B, battery module 1200 includes channels 1260 formed in at least the first side wall 1230c and the second side wall 1230d. Each spacer element 1220 extends into an opposing pair of channels 1260. The spacer elements contact a portion of the channel forming a seal between the spacer element and the interior surface. In an embodiment, the spacer element contacts at least the side walls of the indented channel. As described before, the spacer element may be in contact with the channel through a pressure fit.

The channel 1260 can be U-shaped (as depicted in FIG. 12B) or any other shape that is complementary with the spacer element. A U-shaped channel has opposing sidewalls and a bottom surface. In an embodiment, the spacer element may contact the opposing sidewalls of the U-shaped channel to form a seal between the spacer element and the U-shaped channel. The spacer elements extend into channel 1260, but do not extend to the bottom surface of the channel. As depicted in FIG. 12B, a gap 1262 is present between the spacer elements and the bottom surface of the U-shaped channels to accommodate manufacturing variations.

The spacer elements are used to create a thermal barrier between battery cells to prevent heat from being transferred from battery cell to battery cell during normal use and also during battery cell failure. The spacer elements can form a physical barrier between battery cells or groups of battery cells by contacting the interior surface of the enclosure. In this manner separate compartments are created, each compartment holding a single battery cell or a plurality of battery cells. The compartments are defined by two spacer elements with a battery cell or cells disposed between the spacer elements. In FIG. 11A, a compartment is illustrated by dashed box 1180.

When a battery cell fails, the battery cell can undergo thermal runaway. During thermal runaway, the battery cell can reach temperatures over 90° C. At temperature above 90° C., components of the battery cell begin to degrade, causing the battery cell to eventually burst open, releasing heated gases and particles into the battery module. The formation of compartments to thermally isolate the battery cell will mitigate the transfer of heat from a failed battery cell, to a working battery cell. The high temperature and rapid release of gasses from a failed battery cell can cause an increase in pressure within the compartment. In some instances, the increase in pressure can cause a failure of the spacer elements or the enclosure itself. In an embodiment, the enclosure comprises one or more vent ports. The one or more vent ports are fluidically coupled to one or more of the compartments defined by the spacer elements. The vent ports may be an opening formed in a portion of the enclosure. Alternatively, pressure relief valves may be used as vent ports.

The vent ports may be in a side wall or top plate of the enclosure, in communication with one or more of the compartments. FIG. 13 depicts an embodiment of a top plate 1300 of an enclosure. A plurality of vent ports 1350 are formed in the top plate, each vent port aligned with a compartment. While FIG. 13 depicts vent ports on the top plate of a battery module, it should be understood that vent ports may be positioned on side walls end, endplates, or a bottom plate of an enclosure in any combination.

An alternate embodiment of a battery module is depicted in FIG. 14. Battery module 1400 includes one or more battery cells 1410 having spacer elements 1420 positioned between the battery cells. Battery cells 1410 and spacer elements 1420 are positioned in an enclosure 1430. Enclosure 1430 has an interior surface defined by a first endplate 1430a, a second endplate 1430b, a first side wall 1430c, and a second side wall 1430d. Battery module 1400 also has a top plate and a bottom plate (not shown) which seal the enclosure. An edge element 1450 is disposed along an interior surface of the enclosure.

FIG. 15 depicts an expanded view of edge element 1450 in contact with a top plate 1440 of the enclosure and spacer element 1420. An adhesive material may secure the edge element to the interior surface. Edge element 1450 is made of a material that is compressible and has an onset temperature of chemical decomposition of about 100° C. or more, about 130° C. or more, about 200° C. or more, about 230° C. or more, about 240° C. or more, about 330° C. or more, 350° C. or more, about 400° C. or more, about 415° C. or more, about 425° C. or more, about 450° C. or more, about 500° C. or more, about 550° C. or more, about 600° C. or more, about 650° C. or more, about 700° C. or more, about 750° C. or more, about 800° C. or more, or in a range between any two of these values. Edge element is preferably disposed along the side walls of the enclosure (1430c and 1430d), between the end of spacer elements 1420 and the interior surface of the enclosure. Edge elements 1450 contact spacer elements 1450 to form a seal between the spacer elements and the enclosure. In this manner, a thermal barrier is created between adjacent battery cells. The use of an appropriate edge element also helps to restrict the spread of particulate matter from a battery cell that has burst due to thermal runaway.

A number of materials can be used as the edge element. As noted above, these materials should be compressible and have an onset temperature of chemical decomposition of about 100° C. or more, about 130° C. or more, about 200° C. or more, about 230° C. or more, about 240° C. or more, about 330° C. or more, 350° C. or more, about 400° C. or more, about 415° C. or more, about 425° C. or more, about 450° C. or more, about 500° C. or more, about 550° C. or more, about 600° C. or more, about 650° C. or more, about 700° C. or more, about 750° C. or more, about 800° C. or more, or in a range between any two of these values. In one embodiment, the edge element is formed from an intumescent material. An intumescent material is a material that swells when exposed to heat. In the context of battery modules, as a battery cell begins to fail, the temperature of the battery cell rapidly increases, which can increase the temperature inside the module. This increase in temperature can cause the heat-induced swelling of the intumescent material used to form the edge element, increasing the seal between the spacer element and the interior surface of the enclosure. This increased pressure can provide increased resistant to high pressure gasses and particulate matter released if the battery cell burst open. Exemplary intumescent materials are disclosed in U.S. Pat. No. 3,513,114 to Hahn et al.; U.S. Pat. No. 5,487,946 to McGinniss et al.; U.S. Pat. No. 5,591,791 to Deogon; U.S. Pat. No. 5,723,515 to Gottfried; U.S. Pat. No. 6,790,893 to Nguyen et al.; PCT Patent Application Publication No. WO 94/17142 to Buckingham et al.; PCT Patent Application Publication No. WO 98/04639 to Janci; and PCT Patent Application Publication WO 2020/077334 to Fleetwood et al., all of which are incorporated fully herein by reference.

Other polymeric materials may also be used as material for the edge element. Generally, polymeric materials that have high-temperature stability, and some compressibility are ideal for use as an edge element material. Exemplary polymeric materials that can be used include silicone polymers (polysiloxane, fluorosilicone), FKM polymers (fluoroelastomers such as VITON), chlorosulfonated polyethylene rubber (HYPALON), hydrogenated acrylonitrile-butadiene rubber, and ethylene-propylene-diene monomer. These, and other polymers, may be in the form of a foam or an elastic material. Elastic materials may be formed in the shape of a film or gasket.

In another embodiment, an edge material may be a composite material comprised of different layers. For example, an edge material may be composed of a capacitive layer and one or more insulating layers, with a compressive layer formed on the insulating layers. In an embodiment, edge elements are formed from a multilayer material as described previously herein.

As previously described, the spacer elements are used to create a thermal barrier between battery cells to prevent heat from being transferred from battery cell to battery cell during normal use and also during battery cell failure. The spacer elements can form a physical barrier between battery cells or groups of battery cells by contacting the edge element to form a seal between the interior surface of the enclosure and the spacer elements. In this manner separate compartments are created, each compartment holding a single battery cell or plurality of battery cells. The compartments are defined by two spacer elements and the edge elements, with a battery cell or cells disposed between the spacer elements.

As previously described, the enclosure may include one or more vent ports. The one or more vent ports are fluidically coupled to one or more of the compartments defined by the spacer elements and edge elements. The vent ports may be an opening formed in a portion of the enclosure. Alternatively, the vent ports may comprise a pressure relief valve that will open at a predetermined internal pressure. In an embodiment, a plurality of vent ports is formed in the top plate, each vent port aligned with a compartment. Vent ports may also be positioned on side walls end, endplates, or a bottom plate of an enclosure in any combination.

An alternate embodiment of a battery module is depicted in FIG. 16. As discussed previously, a battery module includes an enclosure having an interior surface. The interior surface is defined by a first endplate and a second endplate extending between a first side wall and a second side wall and a top plate and a bottom plate. The battery module has two or more battery cells and spacer elements between adjacent battery cells. In this embodiment, one or more caps are used to form a seal between the spacer elements and the interior surface of the enclosure. The caps are in contact with a portion of the interior surface of the enclosure and surround at least a portion of the spacer elements.

An embodiment of a cap is shown in FIG. 16. In FIG. 16, a cap 1615 is coupled to the interior surface 1630 of the enclosure of a battery module. In this embodiment, cap 1615 is attached to the interior surface 1630 of the battery module. A space is defined within cap 1615 which can receive spacer element 1620. Preferably, the space has a width that is substantially equal to the width of the spacer element. During manufacture of the battery module, spacer elements are positioned inside of the space defined with cap 1615, as depicted in FIG. 16.

In a preferred embodiment of a cap 1615, the cap has a substantially U-shaped opening running along a first longitudinal side of the cap. As depicted in FIG. 16, spacer element 1620 fits within the U-shaped opening formed in the cap. Cap 1615 may also have one or more indents 1625, or other shapes, so that the outer surface of the cap has a shape that is complementary with the shape of a portion of the interior surface of the enclosure. In some embodiments, cap 1615 may have an opening at the bottom of the cap. Having an opening at the bottom of the cap allows the cap to be slid over the spacer element. This is a useful feature for manufacturing purposes, since the battery cell—spacer elements may be assembled inside the enclosure prior to placing the caps in place.

To create a thermal and particulate barrier between battery cells, cap 1615 may completely cover the end of one or more spacer elements. When the spacer element is coupled to the cap, the cap exerts a slight pressure on the spacer elements, forming a seal between the cap and the spacer element at the point of contact. To seal adjacent battery cells from each other, the cap may contact the bottom plate and top plate of the enclosure. Specifically, the cap may have a top surface that forms a seal with the top plate of the enclosure, and a bottom surface that forms a seal with the bottom surface of the enclosure. The cap, in this configuration, forms a full barrier between adjacent battery cells.

To create a better seal at the interface between the spacer elements and the interior surface of the enclosure, one or more channels 1660 may be formed in and/or on the interior surface of the enclosure. In FIG. 16, channels 1660 are formed at least on the first side wall and the second side wall. The channels may protrude from one or more of the first endplate, the second endplate, the first side wall, the second side wall, the top plate and the bottom plate. Cap 1615 extends into and contacts a portion of the channel forming a seal between the cap and the interior surface. The cap may be in contact with the channel through a pressure fit. In a pressure fit, the cap is slightly compressed when disposed in the channel such that a seal is formed between the cap and the channel. Alternatively, an adhesive may be used to attach the channel to the enclosure. The channel can be U-shaped (as depicted in FIG. 16) or any other shape that is complementary with the cap.

In an embodiment, cap 1615 extends fully into channel 1660 such that the cap is in contact with the sidewalls and bottom surfaces of the channel. In such an embodiment, a gap 1665 is intentionally left between the spacer element and the inner surface of the cap. The gap may allow for variations in manufacturing of the spacer elements and the enclosure. Leaving a gap will help ensure that the spacer element properly fits in the cap during construction of the battery module. Designing the module such that a gap exists between the spacer element and the interior surface of the cap, helps ensure that the gap, needed for manufacturing purposes, does not unintentionally create a pathway for hot air and particulate matter to pass from one battery cell to another.

In FIG. 17, an alternate embodiment of a configuration of a cap and spacer element is depicted. In this embodiment, spacer element 1720 fully extends into cap 1715. In an embodiment, the spacer element may contact the opposing sidewalls and a bottom surface of the cap as shown in FIG. 17. As in previous embodiment, a gap may be used to allow for variations in manufacturing of the spacer elements and the enclosure. In this particular embodiment, a gap 1765 is present between the cap 1715 and the side walls of the enclosure. Cap 1715 is coupled to the side walls by contact with channel 1760. Preferably a friction and/or pressure fit is used to couple cap 1715 to channel 1760. Use of a non-adhesive coupling of the cap to the enclosure allows the cap to be moved in order to accommodate variations in the length of the spacer element.

Cap 1715 may be made out of any suitable material. Suitable materials include injection moldable polymers. Exemplary injection molded polymers include, but are not limited to: polypropylene, acrylonitrile butadiene styrene, polyethylene, polyamide, polycarbonate, and polystyrene. Preferably, polymers having an onset temperature of chemical decomposition greater than 150° C. are used. Using a high temperature material to form the caps provides additional protection for the battery cells during a thermal runaway incident.

As previously described, the spacer elements are used to create a thermal barrier between battery cells to prevent heat from being transferred from battery cell to battery cell during normal use and also during battery cell failure. The spacer elements can form a physical barrier between battery cells or groups of battery cells by contacting the cap to form a seal between the interior surface of the enclosure and the spacer elements. In this manner separate compartments are created, each compartment holding a single battery cell or a plurality of battery cells. The compartments are defined by two spacer elements, coupled to caps, with a battery cell or cells disposed between the spacer elements.

As previously described, the enclosure may include one or more vent ports. The one or more vent ports are fluidically coupled to one or more of the compartments defined by the spacer elements and caps. The vent ports may be an opening formed in a portion of the enclosure. Alternatively, the vent ports may comprise a pressure relief valve that will open at a predetermined internal pressure. In an embodiment, a plurality of vent ports is formed in the top plate, each vent port aligned with a compartment. Vent ports may be positioned on side walls end, endplates, or a bottom plate of an enclosure in any combination.

In an embodiment, a battery module comprises: two or more battery cells and one or more spacer elements disposed between adjacent battery cells, each of the spacer elements comprising at least one thermal capacitive layer and at least one insulation layer. The spacer elements, in an embodiment, have a surface area greater than a surface area of the two or more battery cells, and wherein each of the spacer elements extend beyond the outer surface of the battery cells.

In a specific embodiment, the spacer element extends above a top surface of the battery cell. The spacer element may extend out past the end of the battery cell and into contact with the casing of the module. Alternatively, the spacer element may be bent such that a portion of the spacer element extends over the top surface of the battery cell.

In an embodiment, the thermally capacitive layer, or the thermally conductive layer, some other layer of the spacer element, or a combination of layers thereof extends from the insulation layer and into contact with the casing of the module. In an exemplary embodiment, the insulation layer has a surface area substantially equal to the surface area of the battery cells, and the thermally capacitive layer, thermally conductive layer, another layer of the spacer elements. or a combination of layers thereof extends beyond the outer surface of the battery cells. The thermally capacitive layer, thermally conductive layer, another layer of the space element or a combination of layers thereof can be disposed on an outer surface of the insulation layers or between two or more layers of insulation material. In some embodiments, the insulation layer or layers can be encapsulated, e.g., by a polymer layer or wrap, separately from the thermally capacitive layer or layers. The thermally capacitive layer, or thermally conductive layer, another layer of the spacer, or a combination of layers thereof, extends past the insulation layer and contacts the interior surface of the enclosure. During a thermal runaway event, the battery cell casing can fail, allowing hot gases and hot and/or burning particulate matter (ejecta) to be released. These materials are released from the cell and into the region of the insulation layer. Because of the high temperature of the released materials, there is a possibility that the insulation layer will be at least partially damaged or even partly destroyed, allowing the gas and hot particles to reach other cells. To prevent this, a portion of the spacer element, e.g., the thermally capacitive layer, the thermally conductive layer, another layer of the spacer, or a combination of layers thereof, is extended to contact the interior surface of the enclosure including one or more of the sidewalls, the top or the bottom of the surface. The spacer can include layers, such as the thermally capacitive layer, made from a metal or high temperature polymer that can withstand the expected temperatures of the gases and particles. The extension of a portion of the spacer element, such as the thermally capacitive layer, the thermally conductive layer, or another layer, or combinations of layers, to the interior of the enclosure, thus serves as a barrier that can prevent heat transfer, overheating, or damage of nearby battery cells.

FIG. 22 depicts an embodiment of a spacer element that includes a layer that extends beyond the dimensions of a battery cell to the enclosure. A battery module 2200 includes a plurality of battery cells 2210, separated by a spacer element 2220. Spacer element may be composed of a thermally capacitive layer or thermally conductive layer 2220b sandwiched between insulation layers 2220c and sacrificial material layer 2220a. The thermally capacitive layer or thermally conductive layer 2220b extends away from the insulation and contacts the interior surfaces of enclosure 2230, forming a barrier between adjacent battery cells 2210. Hot gases and particulate matter, ejected from a battery cell that has been partially destroyed during a thermal runaway event, will be trapped by the thermally capacitive layer or thermally conductive layers 2220b from the spacer element, making it less likely that a thermal runaway event from one battery cell will create a thermal runaway in other battery cells within the module.

Extension of a layer of the spacer element to the interior surface of the enclosure, including one or more of the sidewalls, the top or the bottom of the interior surface of the enclosure can create a "compartment" that isolates the battery cells from each other. Referring to FIG. 22, the extension of the thermally capacitive layer or the thermally conductive layer 2220b from adjacent spacers to the interior surface of enclosure 2230 forms a compartment 2250 that at least partially encloses the battery cell. Such a compartment can contain the hot gases and particulate matter ejected from a battery cell. Containment of the hot gases by compartment 2250, formed by the spacer elements, can create stress within the module because of increases in pressure within the compartment when hot gases are released by battery cell 2210. To further mitigate potential damage to the battery module, one or more vent ports 2260 may be formed in the enclosure. Vent ports can be positioned in any portion of the enclosure including the sidewalls (as depicted in FIG. 22) or the top or bottom of the enclosure. The vent ports may be openings or a pressure relief valve.

Tolerance in the manufacturing of battery modules and battery packs can vary. Therefore, it can be difficult to determine the exact length of the extended portion of the thermal capacitive layer that is needed to contact the interior wall of the enclosure. In an embodiment, the thermal capacitive layer may be bent such that a portion of the thermal capacitive layer will bend or deflect when contacted with the interior surface of the enclosure. In an embodiment, the thermal capacitive layer may be deformed, prior to installation, to form a resilient shape. For example, an end region of the portion of the thermally capacitive layer or thermally conductive layer, extending beyond the insulation layer can be curved, bent, or otherwise deformed for provide a resilient shape configured to contact an inner surface of a wall of the module and provide a barrier or seal against gasses and/or particulate matter. The resilient thermal capacitive or thermal conductive layer may be positioned to allow for movement or compression of a portion of the enclosure during manufacture of the module.

In exemplary embodiments, the spacer element can include a metal component, such as a layer of metal (e.g., stainless steel, aluminum, titanium, nickel, steel, iron, or combinations thereof) that extends from the insulation layer to provide a barrier or seal against gases and/or particulate matter. The metal component may be an extension of the thermal capacitive layer, thermal conductive layer, or may be a separate component of the spacer element. A portion of the metal component can be curved, bent, or otherwise deformed to provide a resilient shape configured to contact an inner surface of a wall of the module and provide a barrier or seal against gases and/or particulate matter. Examples of these embodiments are depicted in FIGS. 18-21. When the spacer element is installed, the extensions of the metal component (i.e., the components that extend away from the insulation layer) contact the interior surface of the enclosure and are deflected. This allows the formation of a tight seal against the interior of the enclosure without having the metal component be formed in the exact dimensions needed.

FIG. 18A depicts an embodiment of spacer element 1820 having an extended thermally capacitive layer or thermally conductive layer 1820b sandwiched between insulating layers 1820a. The insulating layers can be encapsulated, as shown, by an encapsulation layer 1820c. In this embodiment, a portion of the thermally capacitive layer or thermally conductive layer 1820b is extended beyond the insulation layer to form an extension portion 1822. An extension portion 1822 may be formed along one or more of the sides of the spacer element, for example, along the top and sides of the spacer element, as shown. A crease or fold line 1824 is formed on the extension portion to enable the extension portion to be resiliently deflected. During use the spacer element is placed between battery cells and the extension portion 1822 contacts the interior surface of the enclosure to form a seal between the spacer element and the interior surface 1830, as shown in FIG. 18B. The extension portion 1822 will deflect when contacted with the interior surface of the enclosure, allowing a seal to be formed despite variations in manufacturing dimensions.

FIG. 19A depicts an alternate embodiment of a spacer element having an extension portion. Spacer element 1900 includes two thermally capacitive layers or thermally conductive layers 1920b sandwiched between insulating layers 1920a. Each of the thermally conductive or thermally capacitive layers extends beyond the insulation layers 1920a and diverges. This creates a Y-shaped extension portion 1922 extending away from the insulation layer. As in the previous embodiment, the Y-shaped extension portion 1922 will deflect when contacted with the interior surface 1930 of the enclosure, allowing a seal to be formed between the spacer and the enclosure, as shown in FIG. 19B.

FIG. 20A depicts an alternate embodiment of a spacer element having an extension portion. Spacer element 2000 includes two thermally capacitive layers or thermally conductive layers 2020c and 2020d surrounding insulating layers 2020a. In this embodiment, the thermally capacitive or thermally conductive layers 2020c and 2020d can act as the encapsulation layers for the spacer element. As in previous embodiments, a thermally capacitive layer or thermally conductive layer 2020b can be present between the insulation layers 2020a. Each of the thermally conductive or thermally capacitive layers, 2020c and 2020d, extends beyond the insulation layers 2020a and diverges away from the insulation layer. This creates a divergent pair of extension portions 2022a and 2022b extending away from each other. Like the embodiment of FIG. 19, the extension portions 2022a and 2022b will deflect when contacted with the interior surface 2030 of the enclosure, allowing a seal to be formed between the spacer element and the enclosure, as shown in FIG. 20B.

FIG. 21A depicts a modification of the extension portion that can be applied to any of the embodiments disclosed herein, and particularly to the embodiments depicted in FIGS. 18A, 18B, 19A, 19B, 20A, and 20B. Similar to FIGS. 20A and 20B, spacer element 2100 includes two thermally capacitive layers or thermally conductive layers 2120c and 2120d surrounding insulating layers 2120a. A thermally capacitive layer or thermally conductive layer 2120b can be present between the insulation layers 2120a. Each of the thermally conductive or thermally capacitive layers, 2120c and 2120d, extends beyond the insulation layers 2120a and diverges away from the insulation layer and each other, creating a divergent pair of extension portions 2122a and 2122b extending away from each other. In this embodiment, extension portions 2122a and 2122b include rounded end portions 2124a and 2124b, respectively. The rounded end portions allow the extension portions to more easily slide against the enclosure interior surface 2130 during installation and use. Like the embodiment of FIG. 20B, the extension portions 2122a and 2122b will deflect when contacted with the interior surface 2130 of the enclosure, allowing a seal to be formed between the spacer element and the enclosure, as shown in FIG. 21B.

In an embodiment, depicted in FIG. 23, each battery cell 2310 is adjacent to a first spacer element 2320a and a second spacer element 2320b, wherein a portion 2322a of the first spacer element extends above and over a top surface of battery cell 2310. The portion 2322a of the first spacer element that extends over the top surface of the battery cell contacts an extension portion 2322b of the second spacer element. In this manner, the spacer element, or portions of the spacer element, can cover and at least partially isolate a battery cell from the other battery cells.

Passage of the hot gas and particles out of the battery cell into the spacer element region can create a large buildup of heat. Since the barrier elements are designed to keep this heat contained around the defective battery cell, and away from the other battery cells, the heat can build up in this area. The excess heat and the explosive force of the particles can affect the integrity of the enclosure, particularly the top or sidewalls of the enclosure. To protect the interior of the enclosure, the enclosure may be protected with a thermally protective layer. This layer may be formed from a thermal and flame resistant material such as mica, microporous silica, ceramic fiber, mineral wool, aerogel materials, and metals. The enclosure can also include features configured to control or direct the flow of ejecta, i.e., gases and particulate materials vented from a battery cell. These features, such as baffles, projections, channels, flaps, extensions, or combinations thereof, can be formed from or covered with thermally protective, fire resistant, or insulating materials and composites such as aerogels, aerogel composites, mica, microporous silica, ceramic fiber, mineral wool, metals, combinations thereof, or materials including these thermally protective, fire resistant, or insulating materials.

In another embodiment, spacer elements may contact separate edge elements to form a seal between the spacer element and the enclosure. FIG. 24 depicts an embodiment in which separate edge elements 2415 are placed along the enclosure wall at locations proximate to the expected location of the spacer elements 2410. The use of separate edge elements allows the portions of the enclosure proximate to the battery cells to be left open, allowing electrical connections to be made to the battery cell without having to pass through an edge element. The separate edge elements will have a width that is slightly greater than the width of the spacer elements to allow for differences in manufacturing tolerances.

FIGS. 25A-B depict an embodiment of edge element 2415 used to form a seal between a spacer element and the interior of the enclosure. In FIG. 25A, the edge element is shown positioned on the interior surface of the enclosure. The spacer element ("C2C barrier") is being positioned between adjacent battery cells. During positioning of the spacer element, one or more elastic members 2430 deflect to receive the spacer elements, as shown in FIG. 25B. The contact of the elastic members with the spacer element can form a barrier to gasses and particles ejected from a battery cell undergoing thermal runaway. As shown in FIG. 25B, there is some lateral tolerance to the position of the spacer with respect to the edge element by making the edge element wider than the spacer element. In some embodiments, the edge element includes portions extending in a direction parallel to the edge of the spacer element such that the edge element forms a seal against a side of the spacer element along the length of the edge of the spacer element.

While the edge element is depicted as a separate element that is attached to the interior wall of the enclosure, it should be understood that the edge element could be attached to, or an extension of the spacer element. In this embodiment, the elastic elements of the edge element will deflect when the spacer element is installed and the spacer elements contacts the interior surface of the enclosure.

In an embodiment, an insulation material 2450 may be positioned between separate edge elements. Insulation between edge elements and adjacent battery cells can help prevent flow of heat and particles to adjacent battery cells.

As previously discussed, edge elements can be formed from heat and flame resistant materials. Edge elements can also be composed of an intumescent material. In addition to using intumescent materials, shape memory materials can be used in place of, or in combination with, intumescent materials. Shape memory materials feature the ability to recover their original shape from a significant and seemingly plastic deformation when a particular stimulus is applied. This is known as the shape memory effect (SME). Examples of shape memory materials include, but are not limited to, alloys of copper-aluminum-nickel and nickel-titanium (e.g., nitinol).

For example, shape memory edge elements can be used to surround sections within a module. Referring to FIG. 26A and FIG. 26B, shape memory edge elements 2622 include a folded portion that flips upward (as shown in FIG. 26B) when triggered by heat. The flipped up portion blocks the heat, fire, and thermal runaway materials to prevent thermal propagation between cells. In the embodiment shown in FIGS. 26A and 26B, the shape memory edge elements are positioned such that the flipped up portion blocks a region marked A-A, such as at a location where thermal runaway is likely to happen. In addition to trapping in the thermal event in region A-A, additional heat management elements can be included. For example, within region A-A, intumescence heat isolation layers 2642 can be incorporated between cells or at any desired place within the module. These intumescence heat isolation layers 2642, when activated by a triggering heat event, can expand outward to the interior layer of the battery case to block heat and mass transfer and further the purpose of shape memory edge elements 2622 to contain the thermal runaway materials in region A-A.

In an another embodiment, instead of containing a thermal event within a region, a barrier is formed in response to a trigger temperature that blocks heat, fire and thermal runaway materials from spreading. Referring to FIG. 26C and FIG. 26D, shape memory edge elements 2623a and 2623b are positioned between two battery cells in a manner in which 2623a and 2623b flip upwards in two different directions to prevent passage of the heat, fire and thermal runaway materials.

Shape memory materials and intumescent materials can also be used together in an element to prevent the spread of heat, fire and thermal runaway materials within a module. Referring to FIG. 27A and FIG. 27B, illustrated is an embodiment in which shape memory material and intumescent material are layered to create an edge element 2722. Specifically, an intumescent gasket can be positioned between battery cells within a module. On top of the intumescent gasket a shape memory cap is attached. Upon a heat trigger event, the intumescent material expands and the shape memory cap bends outward to complete the barrier cap between the cells as shown in FIG. 27B. In another embodiment, illustrated in FIG. 27C and FIG. 27D, the shape memory material 2723 is secured to the interior layer of the module case, whereas the intumescent material 2721 is sandwiched between cells. Upon a heat trigger event, the intumescent material 2721 is free to expand and char, and the shape memory material 2723 bends downward toward the expanding intumescent material 2721 to create the barrier.

In some embodiments, shape memory materials can be used together with cooling systems, such as cooling plates. During normal charge and discharge operations, the shape memory materials (i.e., typically alloys) conduct heat away from battery cells to a cooling system, such as a cooling plate. Heat isolation layers between battery cells in a module serve as a cushioning layer and to accommodate cell volume changes during charging and discharging events. In the case of thermal runaway, shape memory materials can be used to create distant between battery cells and heat isolation layers (e.g., foams/aerogels), so that the heat can be better conducted to the cooling system (i.e., creating a reduction in the amount of heat experienced at the heat isolation layer).

For example, referring to FIG. 28A and FIG. 28B, a portion 2800 of a module is shown in which two battery cells 2810 are separated by a heat isolation layer 2820. The battery cells 2810 and heat isolation layer are in thermal contact with a cooling system (e.g., cooling plate) 2830. To protect the heat isolation layer 2820, shape memory plates 2840 are sandwich between the battery cell 2810 and the heat isolation layer 2820. The shape memory plates 2840 are also in contact with the cooling system 2830. Upon a thermal triggering event (shown in FIG. 28B), the shape memory plates 2840 curve as shown to create separation between the battery cell 2810 and the heat isolation layer 2820. The heat radiated from high temperatures (i.e., resulting from the triggering event) in the battery cells 2810 are conducted to the curved shape memory plates 2840 and then to the cooling system 2830, thereby reducing the heat transferred to the isolation layer.

In another embodiment, the shape memory material elements can be combined with a heat conducting layer. The shape memory material elements can be heat activated springs that push the conductive material away from a battery cell experiencing a heat trigger event. Referring to FIG. 29A, FIG. 29B and FIG. 29C, a portion 2900 of a module can include battery cells 2910 connected to a cooling system 2930. Sandwiched between battery cells 2910 is a heat isolation layer 2920 having protective heat conducting layers 2950 disposed on interface surfaces. Heat conducting layer 2950 can be formed from any conductive metal or alloy such as Aluminum or Copper. Disposed throughout the heat conducting layer 2950 (and as shown in FIG. 29C) are shape memory material elements 2955. Upon a thermal triggering event (shown in FIG. 29B) the shape memory elements 2955 expand (e.g., like a spring) and push the heat conducting layer 2950 away from the battery cell experiencing the heat trigger event. The heat conducting layer 2950 is pushed toward the heat isolation layer 2920, which is formed of a compressible material (e.g., foam, aerogel, etc.) which can accommodate the volume change to allow for a barrier space formation between the battery cell 2910 and the heat isolation layer 2920.

When forming a barrier between battery cells, the spacer element is positioned to prevent the direct transfer of hot gas and particles between the cells. The spacer element, in some embodiments, can still transfer heat between cells through a thermal conductive path, particularly when metal, or some other thermally conductive material is positioned in the spacer. To prevent conductive heat transfer through or around the spacer element, intentional thermal breaks may be placed in a thermally conductive material of the spacer. These thermal breaks can disrupt the thermal transfer of heat through the spacer element. Similarly, thermal breaks can be formed in the edge elements to prevent the conductive transfer of heat. In some embodiments, an additional layer of insulation material is disposed adjacent to the thermally conductive materials, e.g., between the thermally conductive materials and the adjacent cell or cells. In such embodiments, the additional layer of insulation material prevents, limits or disrupts the conductive transfer of heat through or around the spacer element.

While the methods, systems and devices disclosed above are suitable for creating barriers between battery cells, the corner regions of an enclosure can be devoid of any insulating material in some variations. In an embodiment, an insulation element may be placed on the corners of the cover/lid of the enclosure. During assembly, the insulation elements fill a portion of the corners of the enclosure, providing additional thermal barriers and/or barriers preventing flow of gasses and particulates that may be vented from cells. The insulation elements can be a compressible or rigid material. In one embodiment, the insulation elements can be in the form of a rod that is compressed when the cover is placed on the enclosure. If the rod is a compressible material, the rod will expand and fill the corner space as the top is placed on the enclosure. Alternatively, a ridge may be formed in the corners of the top, which form a seal when the top is placed on the enclosure.

The various battery modules described herein, may be used in an energy storage system. An energy storage system may include one or more battery modules. Thermal and particulate barriers in the described battery modules reduces the incidence of an entire battery module from going into thermal runaway. The disclosed embodiments, can therefore prevent catastrophic failure of an energy storage system. The disclosed battery modules can be used in an electrical storage system of a vehicle. The reduced chance of thermal runaway makes the disclosed battery modules safer for many types of vehicles, particularly automobiles, aircraft, and spacecraft.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

The invention claimed is:

1. A battery module comprising:
    an enclosure comprising an interior surface, the interior surface defined by a first endplate and a second endplate extending between a first side wall and a second side wall and a top plate and a bottom plate, and wherein the enclosure defines one or more channels on one or more of a bottom surface, a top surface, the first side wall or the second side wall of the interior surface,
    two or more battery cells disposed in an interior space of the enclosure; and
    one or more spacer elements disposed between adjacent battery cells, each of the spacer elements comprising at least one thermal capacitive layer and at least one insulation layer, wherein the thermally capacitive layer contacts at least one of a bottom surface, a top surface, the first side wall or the second side wall at least; and
    wherein a portion of each of the spacer elements extends away from the insulation layer and contacts the one or more channels on one or more of the bottom surface, the top surface, the first side wall or the second side wall of the interior surface of the enclosure such that a thermal barrier is formed between the adjacent battery cells.

2. The module of claim 1, wherein the two or more battery cells are oriented longitudinally parallel to the end plates, and wherein the spacer elements contact at least one of the bottom surface, top surface, first side wall and second side wall to form the thermal barrier between adjacent battery cells.

3. The module of claim 1, wherein the one or more channels protrude from one or more of the first endplate, the second endplate, the first side wall, the second side wall, the top plate and the bottom plate.

4. The module of claim 1, wherein the one or more channels are indentations in one or more of the first endplate, the second endplate, the first side wall, the second side wall, the top plate and the bottom plate.

5. The module of claim 1, wherein each of the spacer elements contact a portion of one or more of the channels forming a seal between the spacer element and the interior surface.

6. The module of claim 1, wherein the one or more channels are substantially U-shaped having opposing sidewalls and a bottom surface.

7. The module of claim 6, wherein the spacer elements contact the sidewalls of the U-shaped channels.

8. The module of claim 7, wherein a gap is present between the spacer elements and the bottom surface of the U-shaped channels.

9. The module of claim 1, wherein the insulation layer has a thermal conductivity through a thickness dimension of said insulation layer of less than about 50 mW/m-K at 25° C. and less than about 60 mW/m-K at 600° C.

10. The module of claim 9, wherein the insulation layer comprises an aerogel.

11. The module of any one of claim 1, wherein the one or more spacer elements further comprise an exterior portion covering the at least one thermal capacitive layer and at least one insulation layer, wherein the exterior portion comprises at least one sacrificial layer and at least one encapsulating material layer.

12. The module of claim 11, wherein the at least one sacrificial material layer comprises a compressible pad having a 25% compression force deflection at about 27 kPa to about 55 kPa.

13. The module of claim 12, wherein the at least one encapsulating material layer comprises a polymer.

14. The module of claim 1, wherein the one or more spacer elements and the interior surface of the enclosure together are configured to define a plurality of separate compartments, wherein one battery cell is disposed in each compartment.

15. The module of claim 14, wherein at least a portion of the enclosure comprises one or more vent ports, the one or more vent ports fluidically coupled to one or more of the plurality of separate compartments.

16. The module of claim 15, wherein one or more of the vent ports are pressure relief valves.

17. The module of claim 15, wherein one or more of the vent ports comprise an opening formed in a portion of the enclosure.

18. The module of any one of claims 15-17, wherein one or more of the vent ports is positioned in a side wall or top plate of the enclosure, in communication with one or more of the compartments.

* * * * *